(12) United States Patent
Nelson et al.

(10) Patent No.: US 7,595,878 B2
(45) Date of Patent: Sep. 29, 2009

(54) SPECTROSCOPIC METHODS FOR COMPONENT PARTICLE ANALYSIS

(75) Inventors: Matthew P. Nelson, Harrison City, PA (US); Patrick Treado, Pittsburgh, PA (US); Jason Attanucci, Pittsburgh, PA (US)

(73) Assignee: ChemImage Corporation, Pittsburgh, PA (US)

( * ) Notice: Subject to any disclaimer, the term of this patent is extended or adjusted under 35 U.S.C. 154(b) by 563 days.

(21) Appl. No.: 11/091,126

(22) Filed: Mar. 28, 2005

(65) Prior Publication Data

US 2006/0019409 A1 Jan. 26, 2006

Related U.S. Application Data

(63) Continuation-in-part of application No. 11/000,778, filed on Nov. 30, 2004, now Pat. No. 7,379,179, and a continuation-in-part of application No. 10/773,077, filed on Feb. 5, 2004, now Pat. No. 7,061,606, which is a continuation of application No. 09/976,391, filed on Oct. 12, 2001, now Pat. No. 6,734,962.

(60) Provisional application No. 60/584,696, filed on Jun. 30, 2004, provisional application No. 60/239,969, filed on Oct. 13, 2000.

(51) Int. Cl.
*G06K 9/52* (2006.01)
*G06K 9/62* (2006.01)
*G01N 15/02* (2006.01)
*G01N 15/14* (2006.01)
*G01N 15/04* (2006.01)
*G01N 15/06* (2006.01)

(52) U.S. Cl. .............. 356/335; 356/601; 382/165; 382/191; 382/203; 382/224; 382/225

(58) Field of Classification Search ............. 356/335, 356/601, 612
See application file for complete search history.

(56) References Cited

U.S. PATENT DOCUMENTS

| | | | | | |
|---|---|---|---|---|---|
| 5,377,003 | A | * | 12/1994 | Lewis et al. | 356/300 |
| 5,379,065 | A | * | 1/1995 | Cutts | 348/269 |
| 5,504,332 | A | * | 4/1996 | Richmond et al. | 250/339.12 |
| 5,546,475 | A | * | 8/1996 | Bolle et al. | 382/190 |
| 5,841,577 | A | * | 11/1998 | Wachman et al. | 359/386 |
| 5,880,830 | A | * | 3/1999 | Schechter | 356/318 |
| 6,058,322 | A | * | 5/2000 | Nishikawa et al. | 600/408 |

(Continued)

OTHER PUBLICATIONS

Treado, et al., Near-Infrared Acousto-optic Filtered Spectroscopic Microscopy: A Solid-State Approach to Chemical Imaging, 1992, Applied Spectroscopy, vol. 46, No. 4.*

(Continued)

*Primary Examiner*—Gregory J. Toatley, Jr.
*Assistant Examiner*—Bryan Giglio
(74) *Attorney, Agent, or Firm*—Morgan Lewis & Bockius LLP

(57) ABSTRACT

The invention relates to methods of assessing one or more geometric properties of a particle of a substance using an infrared spectroscopic property of the substance. The method is useful, for example, for assessing particle sizes and size distributions in mixtures containing both particles of the substance and other materials.

23 Claims, 65 Drawing Sheets
(9 of 65 Drawing Sheet(s) Filed in Color)

| Object | Area (μm²) | Perimeter (μm) | Feret 1 (μm) | Feret 2 (μm) | Max. Chord (μm) | Shape | Aspect |
|---|---|---|---|---|---|---|---|
| 1 | 21.38 | 21.58 | 6.16 | 4.62 | 7.71 | 0.58 | 1.33 |
| 2 | 2.38 | 6.16 | 1.54 | 1.54 | 3.08 | 0.79 | 1.00 |
| 3 | 30.88 | 24.66 | 6.16 | 6.16 | 7.71 | 0.64 | 1.00 |
| 4 | 2.38 | 6.16 | 1.54 | 1.54 | 3.08 | 0.79 | 1.00 |
| 5 | 21.38 | 21.58 | 4.62 | 6.16 | 6.16 | 0.58 | 0.75 |
| 6 | 14484.56 | 1078.84 | 186.49 | 158.74 | 195.73 | 0.16 | 1.17 |
| 7 | 76.01 | 43.15 | 10.79 | 10.79 | 13.87 | 0.51 | 1.00 |
| Mean | 2091.28 | 171.73 | 31.04 | 27.08 | 33.91 | 0.58 | 1.04 |
| Stnd. Dev. | 5464.98 | 400.19 | 68.62 | 58.14 | 71.45 | 0.21 | 0.18 |

U.S. PATENT DOCUMENTS

| | | | | |
|---|---|---|---|---|
| 6,081,612 | A | * | 6/2000 | Gutkowicz-Krusin et al. ............... 382/128 |
| 6,091,843 | A | * | 7/2000 | Horesh et al. ............... 382/133 |
| 6,316,772 | B1 | * | 11/2001 | Egelberg ............... 250/339.11 |
| 2006/0282223 | A1 | * | 12/2006 | Lewis et al. ............... 702/19 |
| 2008/0032412 | A1 | * | 2/2008 | Lewis et al. ............... 436/164 |

OTHER PUBLICATIONS

Colarusso, et al., Infrared Spectroscopic Imaging: From Planetary to Cellular Systems, 1998, Applied Spectroscopy, vol. 52, No. 3, p. 106A-120A.*

Ortiz De Solorzano, et al., Segmentation of Confocal Microscope Images of Cell Nuclei in Thick Tissue Sections, Mar. 1999, Journal of Microscopy, vol. 193, Pt. 3, p. 212-226.*

Adiga, et al., Efficient Cell Segmentation Tool for Confocal Microscopy Tissue Images and Quantitative Evaluation of Fish Signals, 1999, Microscopy Research and Technique, vol. 44. p. 49-68.*

Hazel, Geoffrey G., Object-level processing of spectral imagery for detection of targets and changes using spatial-spectral-temporal techniques, 2001 Proceedings of the SPIE, vol. 4381, p. 381-390.*

Ghassemian, H., and Landgrebe, D. A., Object-Oriented Feature Extraction Method For Image Data, Jun. 1988, IEEE Control Systems Magazine, p. 42-48.*

Aston, Edward A., Multialgorithm solution for automated multispectral target detection, 1999, Opt. Eng., vol. 38, No. 4, p. 717-724.*

Benz, U.C, Hofmann, P., Willhauck, G., Lingenfelder, I., Heynen, M., Multi-resolution, object-oriented fuzzy analysis of remote sensing data for GIS-ready information, ISPRS Journal of Photogrammetry & Remote Sensing, Jan. 2004, vol. 58, p. 239-258.*

* cited by examiner

| Object | Area (μm²) | Perimeter (μm) | Feret 1 (μm) | Feret 2 (μm) | Max. Chord (μm) | Shape | Aspect |
|---|---|---|---|---|---|---|---|
| 1 | 6.67 | 17.50 | 5.38 | 2.42 | 5.38 | 0.27 | 2.22 |
| 2 | 20.83 | 23.42 | 6.73 | 4.71 | 6.73 | 0.48 | 1.43 |
| 3 | 0.49 | 3.23 | 0.81 | 0.81 | 0.94 | 0.59 | 1.00 |
| 4 | 0.27 | 2.69 | 0.67 | 0.67 | 0.67 | 0.47 | 1.00 |
| 5 | 6.56 | 15.61 | 2.83 | 3.77 | 4.44 | 0.34 | 0.75 |
| 6 | 22.56 | 30.15 | 6.46 | 7.27 | 8.48 | 0.31 | 0.89 |
| 7 | 12.17 | 17.50 | 4.17 | 4.31 | 5.52 | 0.50 | 0.97 |
| 8 | 2.45 | 11.58 | 2.15 | 2.56 | 2.96 | 0.23 | 0.84 |
| 9 | 0.58 | 3.50 | 0.81 | 0.94 | 1.08 | 0.59 | 0.86 |
| 10 | 0.43 | 3.50 | 0.81 | 0.94 | 1.08 | 0.45 | 0.86 |
| 11 | 0.13 | 1.62 | 0.40 | 0.40 | 0.54 | 0.61 | 1.00 |
| 12 | 0.54 | 4.31 | 0.94 | 1.21 | 1.35 | 0.37 | 0.78 |
| 13 | 1.70 | 7.81 | 1.21 | 2.42 | 2.42 | 0.35 | 0.50 |
| 14 | 18.21 | 40.38 | 7.27 | 6.33 | 7.94 | 0.14 | 1.15 |
| 15 | 9.24 | 16.42 | 4.04 | 3.77 | 4.31 | 0.43 | 1.07 |
| 16 | 43.50 | 58.42 | 6.73 | 12.79 | 14.27 | 0.16 | 0.53 |
| 17 | 0.02 | 0.54 | 0.13 | 0.13 | 0.27 | 0.79 | 1.00 |
| 18 | 1.85 | 7.81 | 1.75 | 2.15 | 2.42 | 0.38 | 0.81 |
| 19 | 0.07 | 1.35 | 0.40 | 0.27 | 0.40 | 0.50 | 1.50 |
| 20 | 0.25 | 2.42 | 0.67 | 0.54 | 0.67 | 0.54 | 1.25 |
| 21 | 1.65 | 6.19 | 1.21 | 1.88 | 2.02 | 0.54 | 0.64 |
| 22 | 0.11 | 1.62 | 0.40 | 0.40 | 0.54 | 0.52 | 1.00 |
| 23 | 5.42 | 16.15 | 3.63 | 3.37 | 4.31 | 0.26 | 1.08 |
| 24 | 0.07 | 1.35 | 0.40 | 0.27 | 0.40 | 0.50 | 1.50 |
| 25 | 18.37 | 21.54 | 6.06 | 4.44 | 6.06 | 0.50 | 1.36 |
| 26 | 0.78 | 4.58 | 1.48 | 0.81 | 1.62 | 0.47 | 1.83 |
| 27 | 0.71 | 4.58 | 1.08 | 1.21 | 1.35 | 0.42 | 0.89 |
| 28 | 0.47 | 3.50 | 0.67 | 1.08 | 1.08 | 0.48 | 0.63 |
| 29 | 1.12 | 5.92 | 1.35 | 1.48 | 1.75 | 0.40 | 0.91 |
| 30 | 0.04 | 0.81 | 0.27 | 0.13 | 0.27 | 0.70 | 2.00 |
| 31 | 2.48 | 7.00 | 1.75 | 1.75 | 2.29 | 0.64 | 1.00 |
| Mean | 5.80 | 11.06 | 2.34 | 2.43 | 3.02 | 0.45 | 1.07 |
| Stnd. Dev. | 9.73 | 12.99 | 2.30 | 2.67 | 3.16 | 0.15 | 0.41 |

Fig. 12C

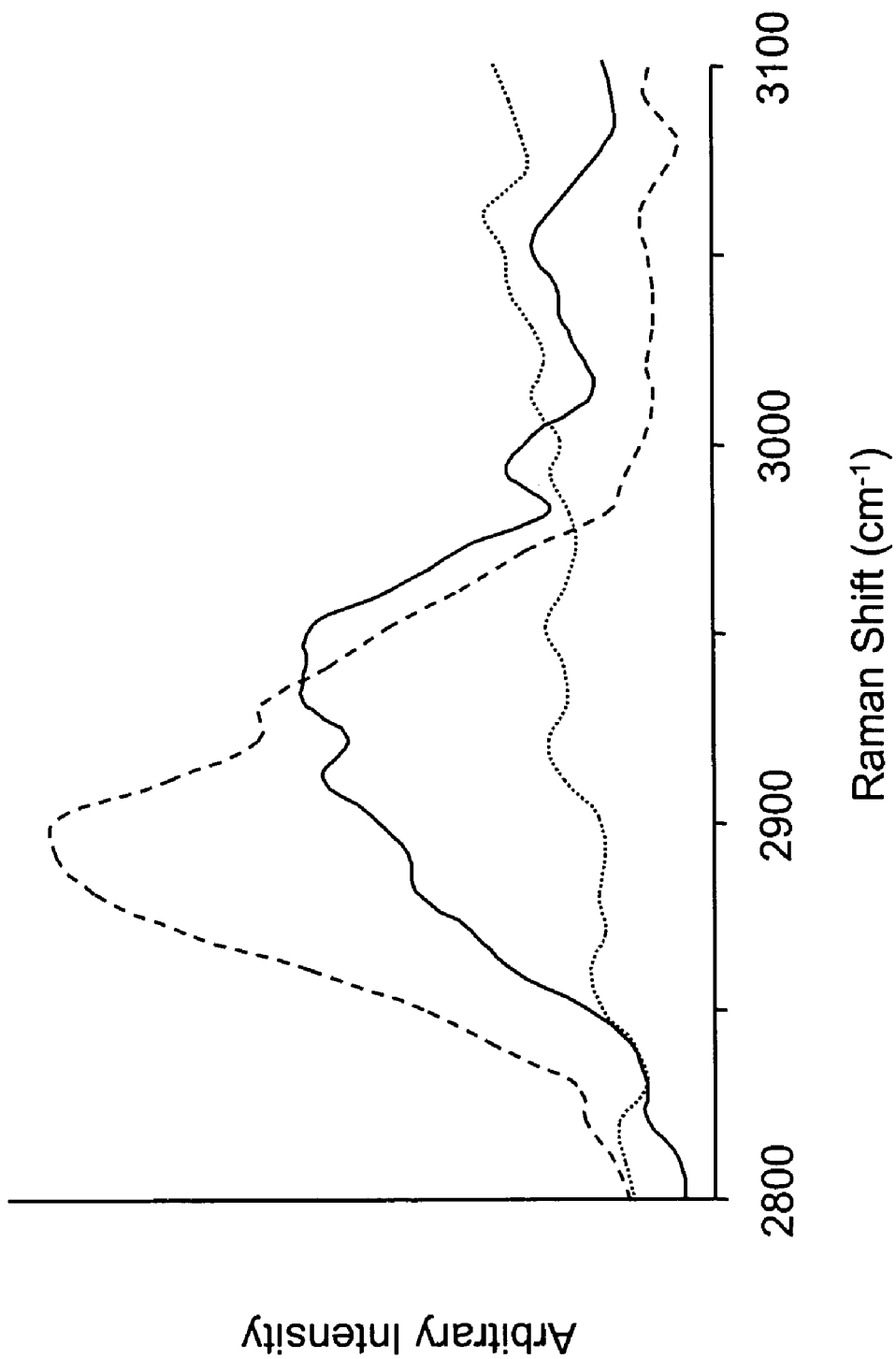

| Object | Area (µm²) | Perimeter (µm) | Feret 1 (µm) | Feret 2 (µm) | Max. Chord (µm) | Shape | Aspect |
|---|---|---|---|---|---|---|---|
| 1 | 21.38 | 21.58 | 6.16 | 4.62 | 7.71 | 0.58 | 1.33 |
| 2 | 2.38 | 6.16 | 1.54 | 1.54 | 3.08 | 0.79 | 1.00 |
| 3 | 30.88 | 24.66 | 6.16 | 6.16 | 7.71 | 0.64 | 1.00 |
| 4 | 2.38 | 6.16 | 1.54 | 1.54 | 3.08 | 0.79 | 1.00 |
| 5 | 21.38 | 21.58 | 4.62 | 6.16 | 6.16 | 0.58 | 0.75 |
| 6 | 14484.56 | 1078.84 | 186.49 | 158.74 | 195.73 | 0.16 | 1.17 |
| 7 | 76.01 | 43.15 | 10.79 | 10.79 | 13.87 | 0.51 | 1.00 |
| Mean | 2091.28 | 171.73 | 31.04 | 27.08 | 33.91 | 0.58 | 1.04 |
| Stnd. Dev. | 5464.98 | 400.19 | 68.62 | 58.14 | 71.45 | 0.21 | 0.18 |

Fig. 15C

| Object | Area (µm²) | Perimeter (µm) | Feret 1 (µm) | Feret 2 (µm) | Max. Chord (µm) | Shape | Aspect |
|---|---|---|---|---|---|---|---|
| 1 | 1496.44 | 197.27 | 47.78 | 50.86 | 61.65 | 0.48 | 0.94 |
| 2 | 187.65 | 64.73 | 16.95 | 15.41 | 18.49 | 0.56 | 1.10 |
| 3 | 978.62 | 191.11 | 58.57 | 29.28 | 58.57 | 0.34 | 2.00 |
| 4 | 147.27 | 64.73 | 13.87 | 18.49 | 20.04 | 0.44 | 0.75 |
| 5 | 624.70 | 126.38 | 38.53 | 21.58 | 38.53 | 0.49 | 1.79 |
| 6 | 323.04 | 80.14 | 20.04 | 20.04 | 24.66 | 0.63 | 1.00 |
| Mean | 626.29 | 120.73 | 32.62 | 25.94 | 36.99 | 0.49 | 1.26 |
| Stnd. Dev. | 528.23 | 61.26 | 18.40 | 13.06 | 19.27 | 0.10 | 0.51 |

Fig. 16C

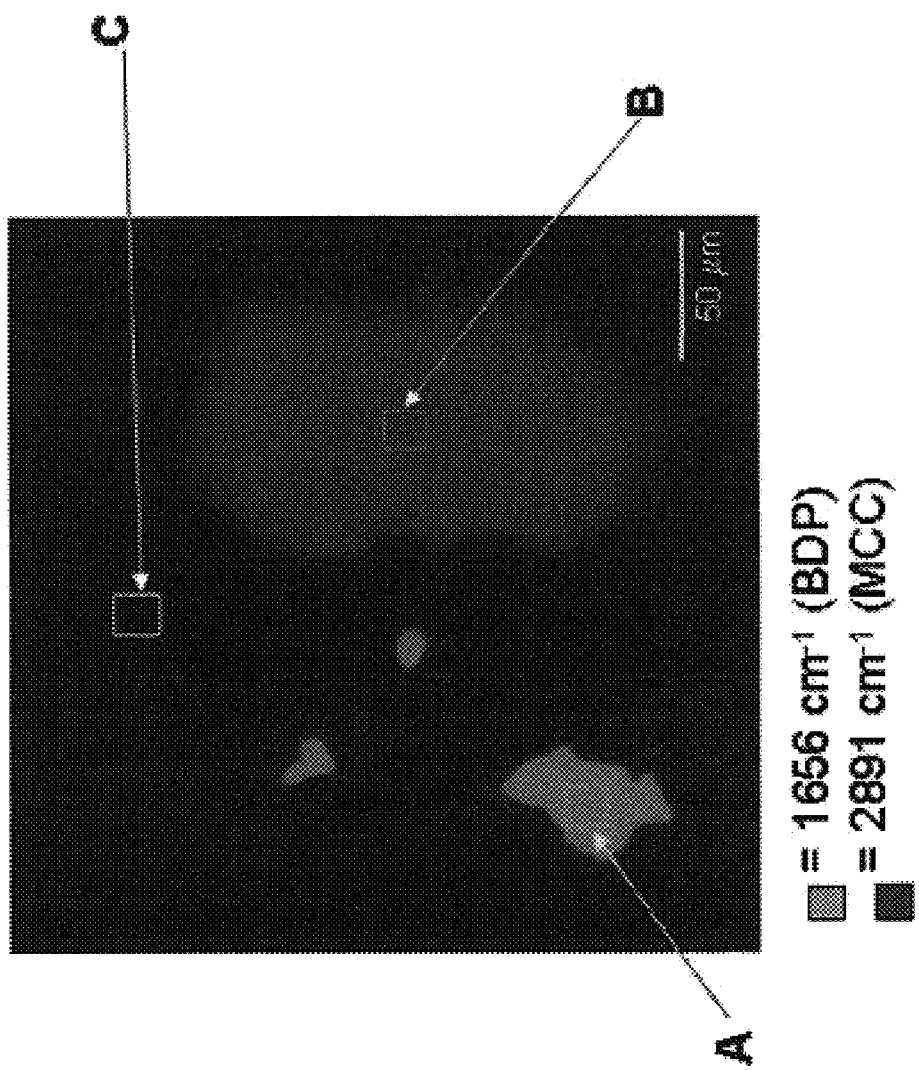

| Object | Area (μm²) | Perimeter (μm) | Feret 1 (μm) | Feret 2 (μm) | Max. Chord (μm) | Shape | Aspect |
|---|---|---|---|---|---|---|---|
| 1 | 2.00 | 6.00 | 1.00 | 2.00 | 2.00 | 0.70 | 0.50 |
| 2 | 1213.00 | 286.00 | 44.00 | 66.00 | 71.00 | 0.19 | 0.67 |
| 3 | 1.00 | 4.00 | 1.00 | 1.00 | 2.00 | 0.79 | 1.00 |
| 4 | 4860.00 | 412.00 | 56.00 | 119.00 | 120.00 | 0.36 | 0.47 |
| Mean | 1519.00 | 177.00 | 25.50 | 47.00 | 48.75 | 0.51 | 0.66 |
| Stnd. Dev. | 2299.39 | 205.16 | 28.71 | 56.82 | 57.57 | 0.28 | 0.24 |

Fig. 18C

| Object | Area (µm²) | Perimeter (µm) | Feret 1 (µm) | Feret 2 (µm) | Max. Chord (µm) | Shape | Aspect |
|---|---|---|---|---|---|---|---|
| 1 | 94.00 | 50.00 | 13.00 | 12.00 | 14.00 | 0.47 | 1.08 |
| 2 | 7.00 | 12.00 | 3.00 | 3.00 | 3.00 | 0.61 | 1.00 |
| 3 | 59.00 | 34.00 | 10.00 | 7.00 | 10.00 | 0.64 | 1.43 |
| 4 | 476.00 | 122.00 | 25.00 | 35.00 | 38.00 | 0.40 | 0.71 |
| 5 | 5.00 | 10.00 | 2.00 | 3.00 | 4.00 | 0.63 | 0.67 |
| Mean | 128.20 | 45.60 | 10.60 | 12.00 | 13.80 | 0.55 | 0.98 |
| Stnd. Dev. | 197.98 | 45.79 | 9.29 | 13.38 | 14.25 | 0.11 | 0.31 |

Fig. 19C

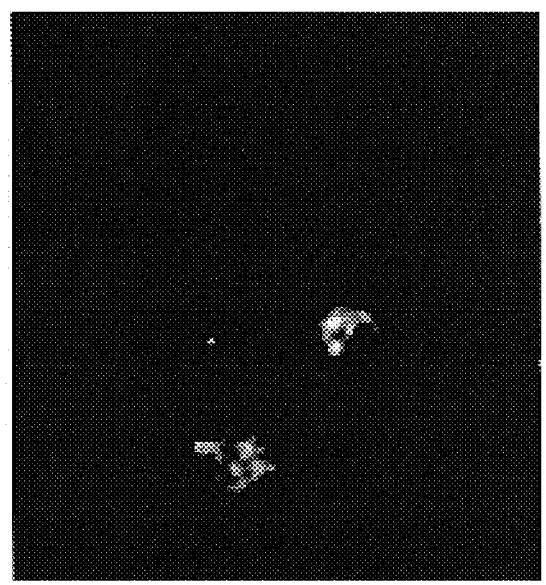
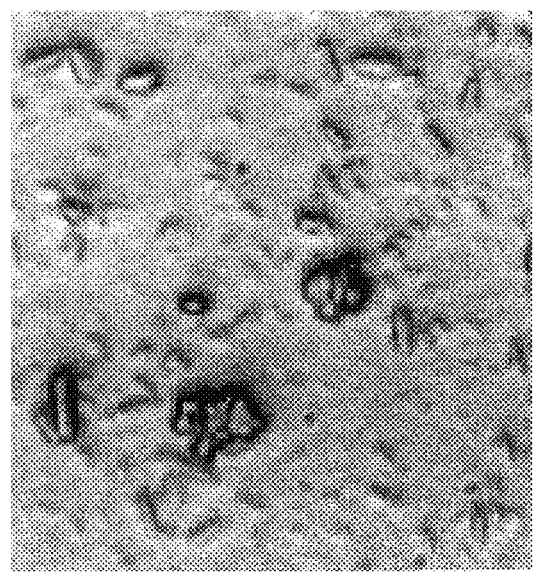
Fig. 23A
Fig. 23B
Fig. 23C

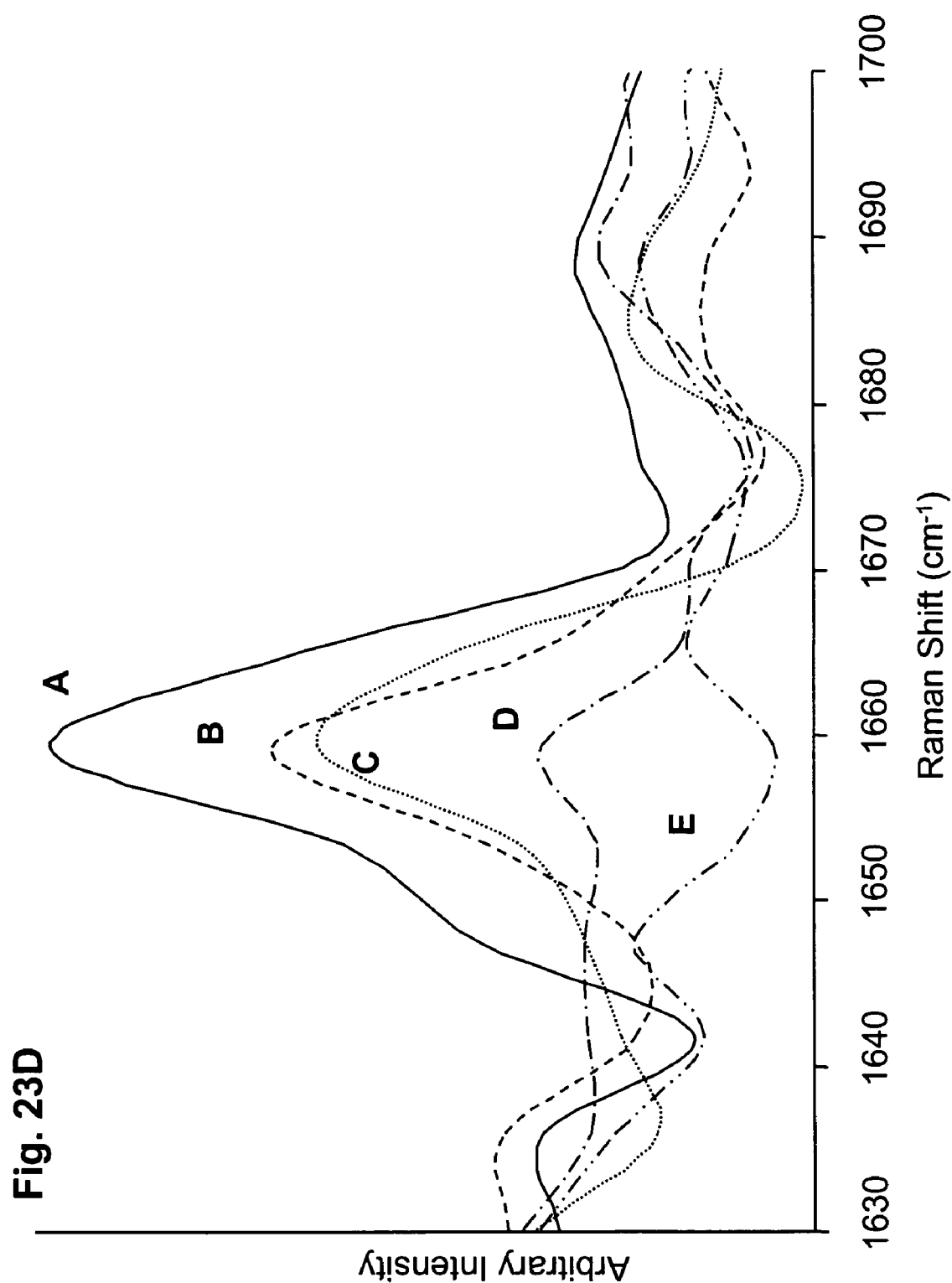

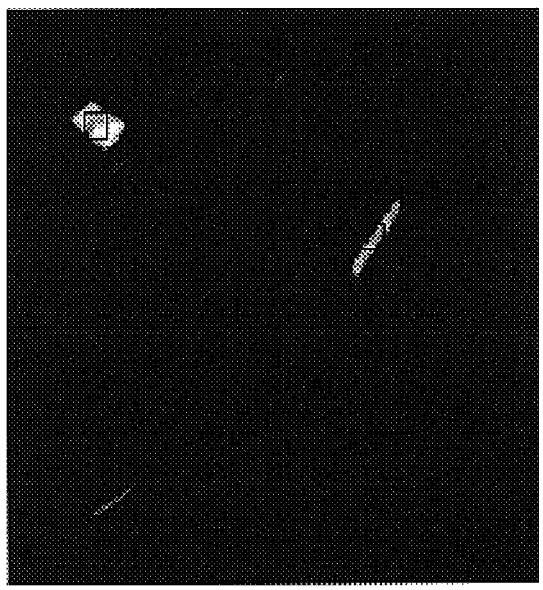
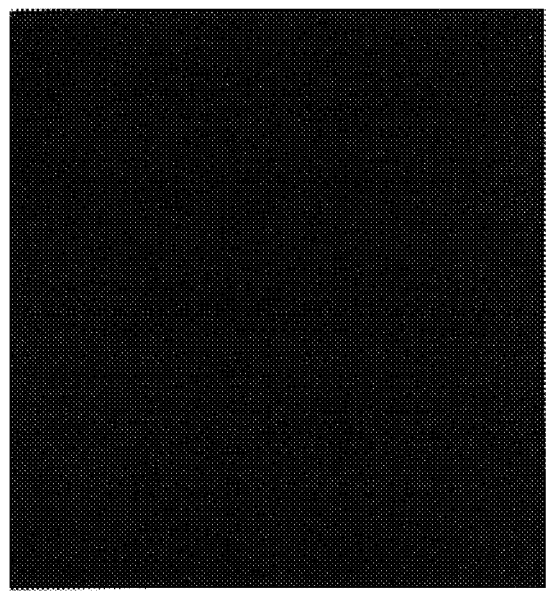
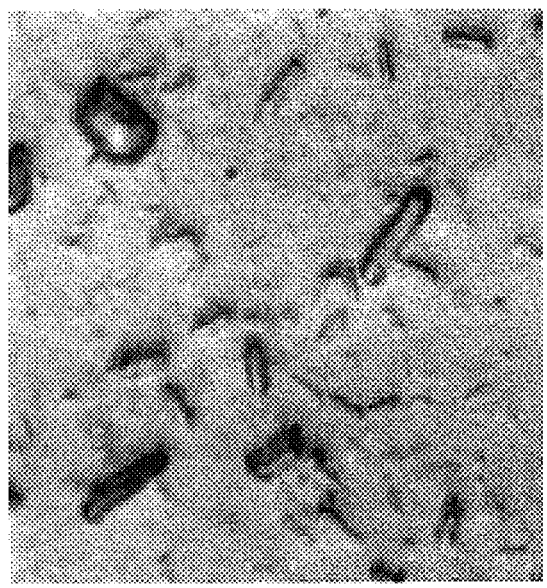
Fig. 24A
Fig. 24B
Fig. 24C

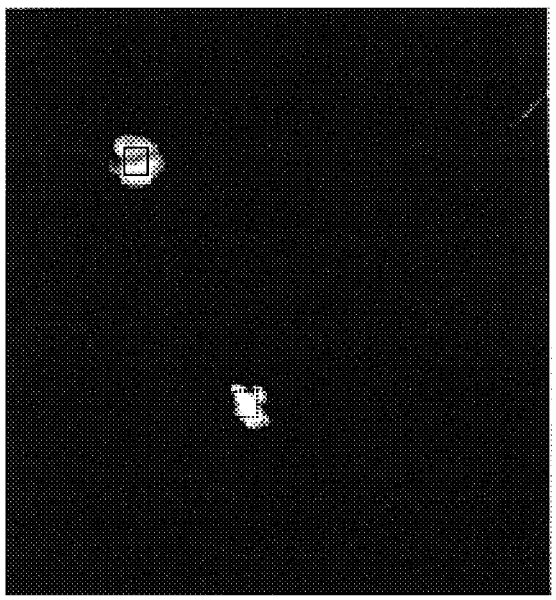
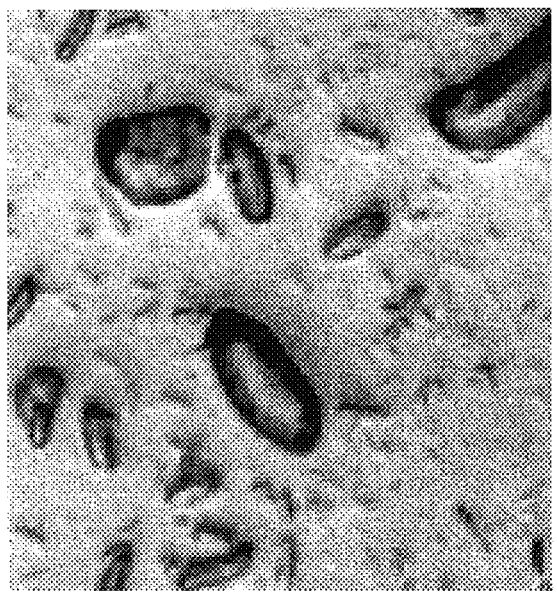
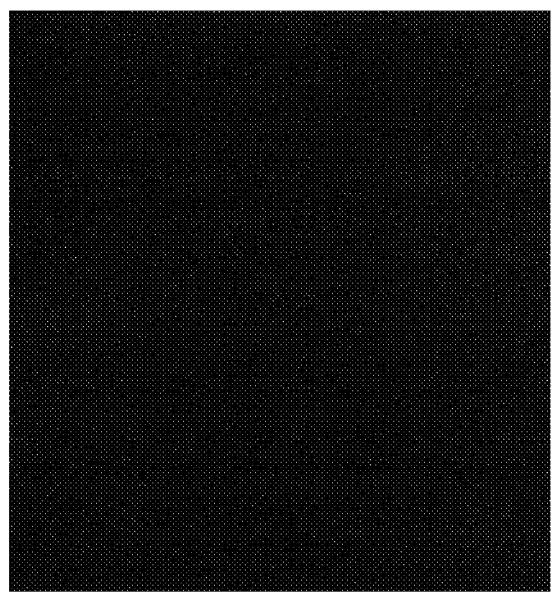
Fig. 25A
Fig. 25B
Fig. 25C

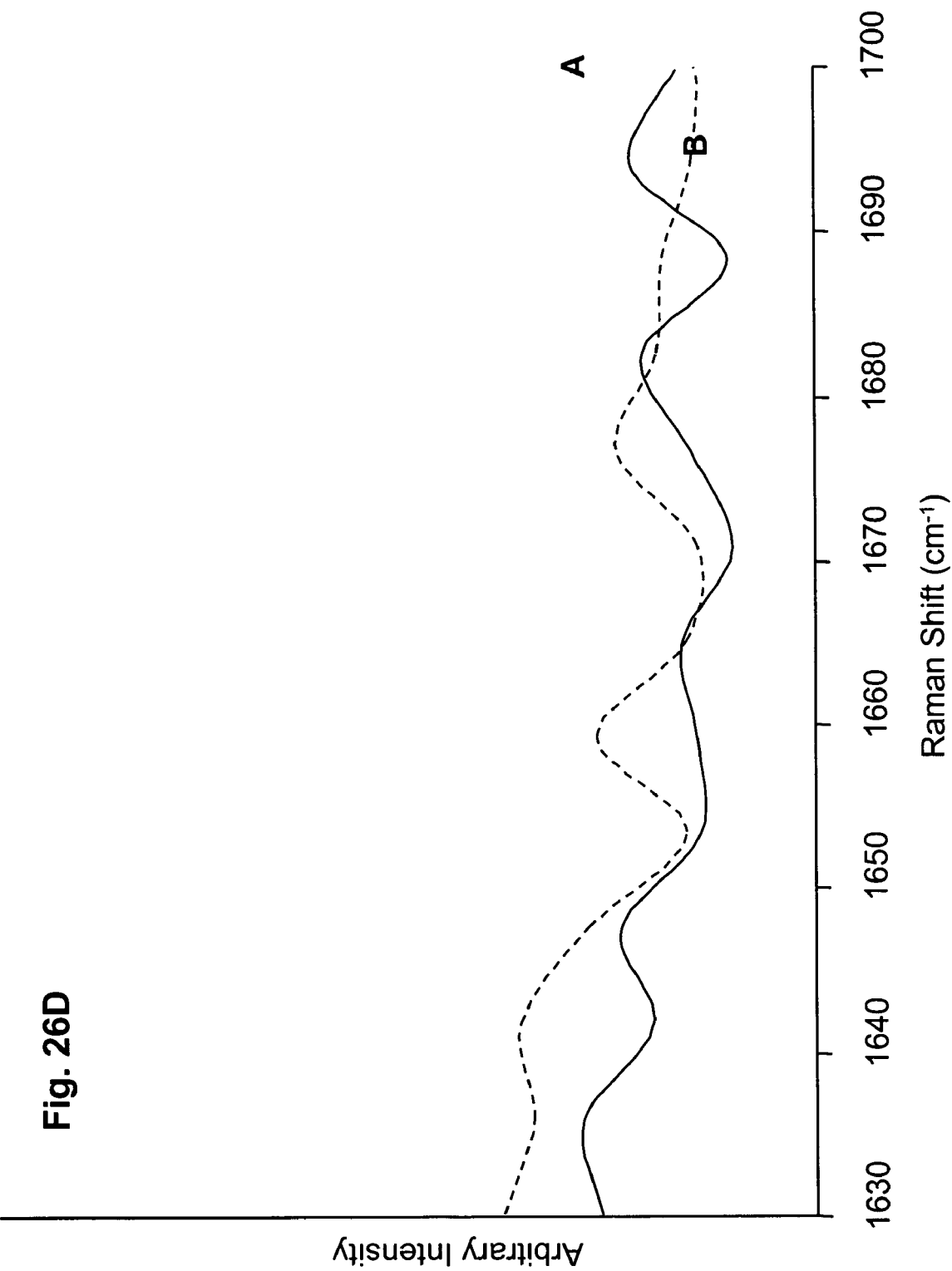

Fig. 27D

| ROI 1 | | | | | | | |
|---|---|---|---|---|---|---|---|
| Object | Area (μm²) | Perimeter (μm) | Feret 1 (μm) | Feret 2 (μm) | Max. Chord (μm) | Shape | Aspect |
| 1 | 0.61 | 3.43 | 0.62 | 1.09 | 1.09 | 0.65 | 0.57 |
| 2 | 0.54 | 3.28 | 0.78 | 0.94 | 0.94 | 0.63 | 0.83 |
| 3 | 26.68 | 36.37 | 6.40 | 7.65 | 8.43 | 0.25 | 0.84 |
| 4 | 0.19 | 2.03 | 0.62 | 0.47 | 0.62 | 0.59 | 1.33 |
| 5 | 2.46 | 10.15 | 1.72 | 2.65 | 2.97 | 0.30 | 0.65 |
| mean | 6.10 | 11.05 | 2.03 | 2.56 | 2.81 | 0.48 | 0.84 |
| stnd. dev. | 11.54 | 14.51 | 2.49 | 2.96 | 3.27 | 0.19 | 0.30 |
| ROI 2 | | | | | | | |
| Object | Area | Perimeter | Feret 1 | Feret 2 | Max. Chord | Shape | Aspect |
| 1 | 0.22 | 2.03 | 0.62 | 0.47 | 0.62 | 0.67 | 1.33 |
| 2 | 7.19 | 13.42 | 3.43 | 3.12 | 3.75 | 0.50 | 1.10 |
| 3 | 0.37 | 2.81 | 0.78 | 0.62 | 0.94 | 0.58 | 1.25 |
| 4 | 10.62 | 16.23 | 3.59 | 3.90 | 4.68 | 0.51 | 0.92 |
| mean | 4.60 | 8.62 | 2.11 | 2.03 | 2.50 | 0.56 | 1.15 |
| stnd. dev. | 5.17 | 7.26 | 1.62 | 1.74 | 2.02 | 0.08 | 0.18 |
| ROI 3 | | | | | | | |
| Object | Area | Perimeter | Feret 1 | Feret 2 | Max. Chord | Shape | Aspect |
| 1 | 0.51 | 4.06 | 0.47 | 1.56 | 1.56 | 0.39 | 0.30 |
| 2 | 0.71 | 3.90 | 1.09 | 0.94 | 1.09 | 0.58 | 1.17 |
| 3 | 0.37 | 2.81 | 0.78 | 0.62 | 0.78 | 0.58 | 1.25 |
| 4 | 0.05 | 0.94 | 0.31 | 0.16 | 0.31 | 0.70 | 2.00 |
| 5 | 1.41 | 6.40 | 1.56 | 1.40 | 1.56 | 0.43 | 1.11 |
| 6 | 0.05 | 0.94 | 0.16 | 0.31 | 0.31 | 0.70 | 0.50 |
| 7 | 1.22 | 5.93 | 1.56 | 1.25 | 1.56 | 0.44 | 1.25 |
| 8 | 1.17 | 4.68 | 1.25 | 1.09 | 1.40 | 0.67 | 1.14 |
| 9 | 5.07 | 17.01 | 2.65 | 4.06 | 4.53 | 0.22 | 0.65 |
| mean | 1.17 | 5.19 | 1.09 | 1.27 | 1.46 | 0.52 | 1.04 |
| stnd. dev. | 1.54 | 4.83 | 0.78 | 1.15 | 1.26 | 0.16 | 0.50 |
| Overall | | | | | | | |
| mean | 2.40 | 6.34 | 1.36 | 1.53 | 1.79 | 0.47 | 0.94 |
| stnd. dev. | 2.97 | 4.86 | 0.94 | 1.16 | 1.33 | 0.20 | 0.48 |

| Particle | NIST-Traceable Value | ChemImage Array Method Value: Brightfield/Raman Overlay |
|---|---|---|
| PS 1 | 0.705±0.007 | 0.71±0.01 |
| PS 2 | 5.1±0.5 | N.A.* |
| PS 3 | 2.062±0.022 | 2.1±0.01 |
| PS 4 | 10±0.59 | 10.34±0.06 |
| PS 5 | 31.1±1.7 | 30.99±1.2 |
| PS 6 | 1.031±0.012 | 1.05±0.01 |

Fig. 29D

SPECTROSCOPIC METHODS FOR COMPONENT PARTICLE ANALYSIS

CROSS-REFERENCES TO RELATED APPLICATIONS

This application is a continuation-in-part of U.S. application Ser. No. 11/000,778 filed 30 Nov. 2004, now U.S. Pat. No. 7,379,179 a continuation-in-part of U.S. application Ser. No. 10/773,077 filed 5 Feb. 2004, now U.S. Pat. No. 7,061,606 which is a continuation of U.S. application Ser. No. 09/976,391 filed 12 Oct. 2001 (now U.S. Pat. No. 6,734,962), and is entitled to priority pursuant to 35 U.S.C. §119(e) to U.S. provisional patent application 60/584,696, which was filed on 30 Jun. 2004, and to U.S. provisional patent application 60/239,969, which was filed on 13 Oct. 2000.

STATEMENT REGARDING FEDERALLY SPONSORED RESEARCH OR DEVELOPMENT

This work was supported in part by a contract from the National Institute of Standards and Technology (NIST contract no. 70NANB8H4021) and the U.S. Government may therefore have certain rights in this invention.

BACKGROUND OF THE INVENTION

The invention relates generally to the field of hyperspectral analysis of particle size, morphology, and spatial distribution.

Surfaces form the interface between different physical and chemical entities, and the physical and chemical processes that occur at surfaces often control the bulk behavior of materials. For example, the rate of dissolution of drug particles in a biological fluid (e.g., stomach, intestinal, bronchial, or alveolar fluid in a human) can strongly influence the rate of uptake of the drug into an animal. Differences in particle size distribution between two otherwise identical compositions of the same drug can lead to significant differences in the pharmacological properties of the two compositions. Further by way of example, the surface area of a solid chemical catalyst can strongly influence the number and density of sites available for catalyzing a chemical reaction, greatly influencing the properties of the catalyst during the reaction. For these and other reasons, manufacturers often try to closely control particle size and shape. Associations between and among particles can also affect the pharmacological properties of substances in the particles, such as the ability of a substance to dissolve or become active in a biological system.

Numerous methods of analyzing particle sizes and distributions of particle sizes are known in the art, including at least optical and electron microscopy, laser diffraction, physical size exclusion, dynamic light scattering, polarized light scattering, mass spectrometric, sedimentation, focused beam backscattered light reflectance, impedance, radiofrequency migration, Doppler scattering, and other analytical techniques. Each of these techniques has a variety of limitations that preclude its use in certain situations. However, all of these techniques share a critical limitation that prevent effective use of the techniques for a wide variety of samples for which particle analysis would be valuable—namely, none of the prior art techniques is able to distinguish two particles that differ only in chemical composition. Put another way, a first particle having substantially the same size, shape, and weight as a second particle cannot be distinguished from the second particle in these methods. Furthermore, many prior art particle characterization methods depend on serial particle-by-particle analysis and are not suitable for analysis of multiple particles in parallel. The present invention overcomes these limitations.

BRIEF SUMMARY OF THE INVENTION

The invention relates to devices and methods for assessing a geometric property of a particle of a substance in a sample, such as a sample in a microscopic field. Crudely simplified, the method comprises irradiating the sample, generating a chemical image of the sample to identify one or more particles of the substance, and using one or more image analysis algorithms to assess the geometric property for the substance. The chemical image can, for example, be a Raman, near infrared (NIR), or fluorescent image of the sample. It is important the spectroscopic method used to generate the chemical image can differentiate the substance of interest from other materials that are or may be present in the sample. By way of example, after illuminating the sample, one can generate a chemical image based on Raman-shifted radiation scattered by the particle at one or more Raman shift values characteristic of the substance. Alternatively, the chemical image of the sample can be collected by confocal reflectance NIR imaging at one or more focal planes within the sample. Geometric properties of the particles can be used to assess the size of individual particles, the size distribution of particles in a population, association of particles in a sample, or some combination of these.

The methods described herein can be used to make two- or three-dimensional chemical images of particles of interest, regardless of the presence of other particles or compounds in the sample. The methods can be used to simultaneously determine geometric properties of multiple particles composed of the same or different materials in the sample. The methods can be used to generate time-resolved (e.g., video) chemical images of particles.

In one embodiment, the particle is immobilized prior to generating the chemical image and determining the geometrical property(ies). With immobile particles or particles suspended in a solid or in a viscous liquid phase, immobilization can be unnecessary. Particles can be immobilized by allowing them to settle or dry on a surface. Particles can also be immobilized by freezing or otherwise solidifying a liquid suspension of the particles on a surface.

The methods described herein are useful in a wide variety of applications, such as in assessing drug particle sizes. By way of example, the sizes of aerosolized or liquid-suspended solid particles can be assessed, as can the sizes of one liquid phase dispersed in another.

The invention includes devices for performing such chemical imaging methods. For example, in one embodiment, the device uses NIR optimized liquid crystal (LC) imaging spectrometer technology for wavelength selection. The NIR optimized refractive microscope is used in conjunction with infinity-corrected objectives to form the NIR image on the detector with or without the use of a tube lens. An integrated parfocal analog color CCD detector provides real-time sample positioning and focusing. The color image and the NIR image can be fused using image handling software. In one configuration, the NIR microscope is used as a volumetric imaging instrument by imaging substantially parallel focal planes through the sample, (i.e., collecting images at varying focal depths) and reconstructing a volumetric image of the sample in software. In another embodiment, the sample position is fixed and wavelength-dependent depth of penetration is used in conjunction with a refractive tube lens to achieve a well characterized chromatic effect. For example, the output of the microscope can be coupled to a NIR spectrometer either via direct optical coupling or via a fiber optic.

The invention also includes a chemical imaging addition method in which the sample is seeded with a material of known composition, structure, and/or concentration and the methods described herein are performed to generate a chemical (e.g., NIR) image suitable for qualitative and quantitative analysis.

Suitable optic platforms for performing the methods described herein include microscopes, fiberscopes, macrolens systems, and telescopes, for example.

BRIEF SUMMARY OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

FIG. 3, consisting of FIGS. 3A, 3B, 3C, and 3D, depicts RCI results for a single field of view on the dried 1E1 nasal spray sample.

FIG. 10 consists of FIGS. 10A and 10B.

FIG. 12 consists of FIG. 12A, FIG. 12B and a particle size distribution (PSD) chart (FIG. 12C).

FIG. 14, consisting of FIGS. 14A, 14B, 14C, 14D, and 14E, depicts results obtained from RCI of a mixture of BDP and MCC (no water added). FIGS. 14D and 14E are Raman spectra obtained by Raman scattering analysis of regions A (solid line), B (dashed line), and C (dotted line) of FIG. 14C.

FIG. 15 consists of FIGS. 15A and 15B and a PSD data table (FIG. 15C).

FIG. 16 consists of FIGS. 16A and 16B and a PSD data table (FIG. 16C).

FIG. 17, consisting of FIGS. 17A, 17B, 17C, 17D, and 17E, depicts results obtained from RCI of a mixture of BDP and MCC with water added thereto. FIG. 17C is a Raman chemical image of the mixture, in which areas A (corresponding to BDP), B (corresponding to MCC), and C (corresponding to the background) are indicated.

FIG. 18 consists of FIGS. 18A and 18B and a PSD data table (FIG. 18C).

FIG. 19 consists of FIGS. 19A and 19B and a PSD data table (FIG. 19C).

FIG. 20, comprising

FIG. 21, consisting of FIGS. 21A, 21B, 21C, 21D, and 21E, depicts results obtained from RCI of a sample of BECONASE AQ™.

FIG. 22 consisting of FIGS. 22A, 22B, 22C, 22D, and 22E, depicts results obtained from RCI of a sample of BECONASE AQ™.

FIG. 23, consisting of FIGS. 23A, 23B, 23C, 23D, and 23E, depicts results obtained from RCI of a sample of BECONASE AQ™. FIGS. 23A and 23B depict brightfield reflectance and polarized light micrographs, respectively. FIG. 23C is a Raman chemical image of the sample assessed at a Raman shift value characteristic of BDP. FIG. 23D depicts Raman spectra assessed in several boxed regions of FIG. 23B, including region A, corresponding to BECONASE AQ™.

FIG. 24, consisting of FIGS. 24A, 24B, 24C, and 24D, depicts results obtained from RCI of a sample of a placebo formulated like BECONASE AQ™, but without BDP. FIGS. 24A and 24B depict brightfield reflectance and polarized light micrographs, respectively. FIG. 24C is a Raman chemical image of the sample assessed at a Raman shift value characteristic of BDP.

FIG. 25, consisting of FIGS. 25A, 25B, 25C, and 25D, depicts results obtained from RCI of a sample of a placebo formulated like BECONASE AQ™, but without BDP. FIGS. 25A and 25B depict brightfield reflectance and polarized light micrographs, respectively. FIG. 25C is a Raman chemical image of the sample assessed at a Raman shift value characteristic of BDP.

FIG. 26, consisting of FIGS. 26A, 26B, 26C, and 26D, depicts results obtained from RCI of a sample of a placebo formulated like BECONASE AQ™, but without BDP. FIG. 26D depicts Raman spectra assessed in several boxed regions of FIG. 26B.

FIG. 27 consists of FIGS. 27A, 27B, and 27C and a PSD table (FIG. 27D).

FIG. 29 consists of FIGS. 29A, 29B, and 29C and a particle size standard table (FIG. 29D).

FIG. 32 consists of FIGS. 32A, 32B, 32C, and 32D.

FIG. 33 consists of FIGS. 33A, 33B, and 33C.

FIG. 36 comprises FIGS. 36A, 36B, 36C, 36D, 36E, and 36F. FIGS. 36C and 36D are NIR and Raman chemical images of the boxed portion of FIG. 36B, in which aspirin- and lactose-containing regions were differentiated by NIR imaging. FIGS. 36B and 36C were made using the CONDOR™ device described herein, and FIG. 36D was made using the FALCON™ device described herein.

DETAILED DESCRIPTION OF THE INVENTION

Figure 1:
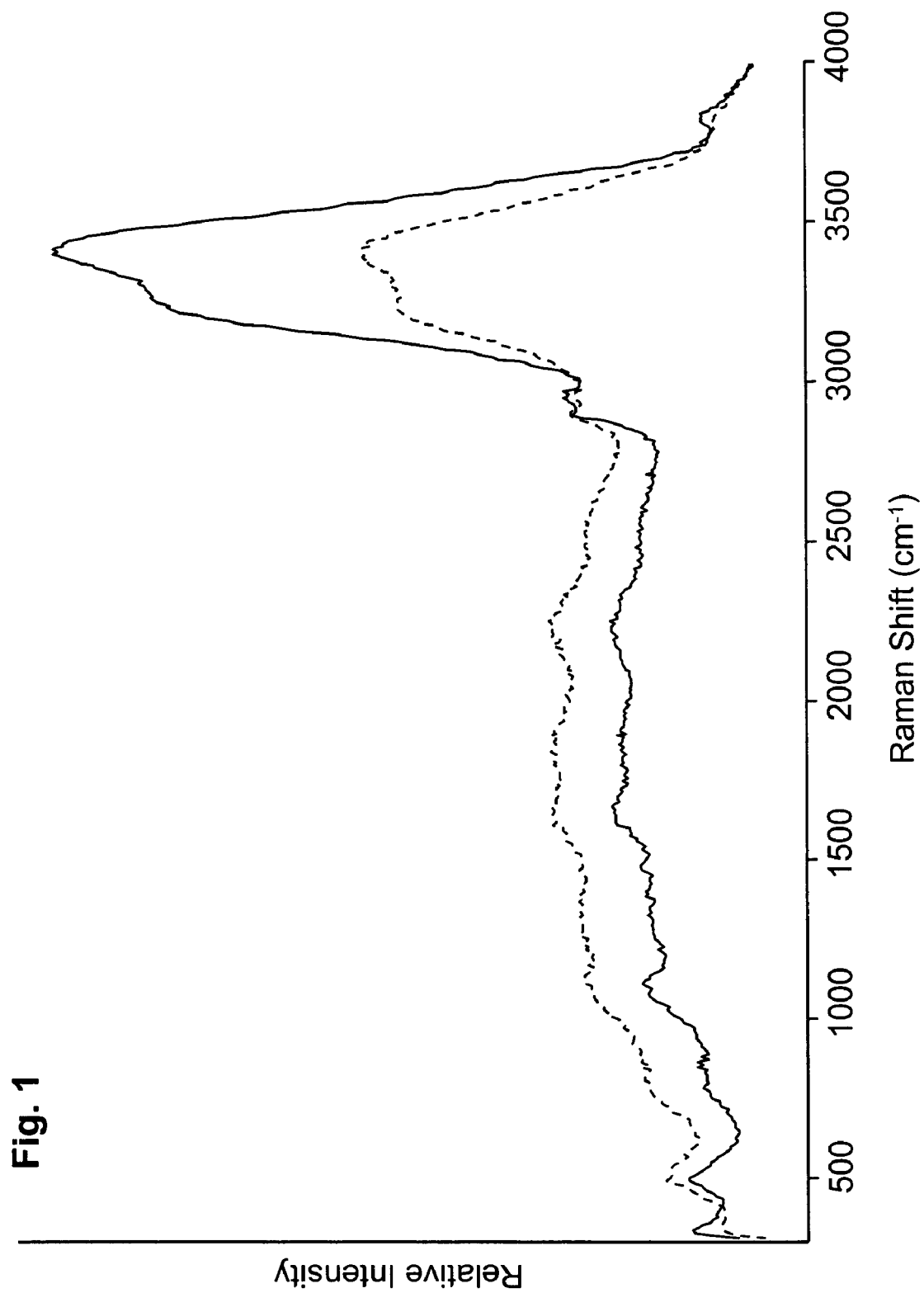
FIG. 1 depicts Raman spectra acquired from nasal spray samples 1E1 (solid line) and 3E1 (dashed line) in aqueous solution.

The invention relates to methods of assessing one or more geometric properties of one or more particles of a substance in a sample using a chemical image of the sample to identify and characterize the particle(s). The methods are useful, for example, for assessing particle sizes and size distributions in mixtures containing both particles of the substance and other materials. The methods can also be used to assess association between compounds and particles in a sample, such as agglomeration of particles of different substances and inclusion of multiple substances in a single particle.

The present invention is directed to overcoming one or more of the limitations inherent to current methods for the determination of geometric properties, such as particle size distribution (PSD), for complex mixtures like inhalable pharmaceutical products. Restrictions associated with prior art methods for determining PSDs cannot generate information for particular molecular species in complex drug formulations.

The methods described herein relate to methods of assessing geometric properties (e.g., PSD) of particles of a particular substance (e.g., a single chemical compound) in a composition. The methods are not affected by the presence of particles of other substances (e.g., pharmaceutical excipients or contaminants) in the composition. Very briefly, the methods comprise immobilizing the particles (if necessary), acquiring chemical imaging data characteristic of the substance of interest (e.g., Raman, near infrared (NIR), or fluorescent chemical image data), and processing that data using image processing techniques to describe a geometric property of the particles. Use of image processing techniques to quantify geometric properties of particles in an image provides more precise and specific information than is obtained by subjective observation of a microscopic field, for instance, and permits detailed analysis of the particles in the field. The methods described herein have the advantage of being able to determine the identity and geometric properties of multiple particles substantially simultaneously, even if the particles are particles of one or more substances.

Definitions

As used herein, each of the following terms has the meaning associated with it in this section.

A "particle of a substance" is an entity having a phase boundary with one or more surrounding entities, wherein the entity comprises the substance. Examples of a particle of a substance include a solid phase of the substance surrounded by a liquid or gaseous phase and a first liquid phase that comprises the substance and is surrounded by a second liquid phase that substantially does not comprise the substance. A particle can consist entirely or essentially of the substance, or the particle can comprise other materials.

"Association" between and among particles refers to agglomeration, bonding, or any other close physical (including electrostatic) interaction of two or more particles, whether permanent or short-lived.

A particle is "effectively immobilized" if it is maintained in a location and an orientation that do not substantially change during the period of Raman scattering analysis described herein.

The terms "optical" and "spectroscopic" are used interchangeably herein to refer to properties of materials (and to methods of assessing such properties). The term "spectroscopic" is generally understood to refer to the interaction of electromagnetic radiation, electrons, or neutrons with the materials. The term "optical" typically refers to an interaction with electromagnetic radiation. For example, although electron microscopy is not always commonly considered a "spectroscopic" or "optical" method, the two terms are used inclusively herein to encompass electron microscopy and other methods of assessing interaction of a material with visible, ultraviolet, or infrared light, with neutrons, with electrons, or with other radiation.

"Spectral resolution" means the ability of a radiation detection system to resolve two spectral peaks.

Two images are combined "in an aligned manner" when the combined image corresponds at every point to essentially the same point in each of the two individual images. Thus, two images of a microscopic field that includes a circle, a square, and a star are combined in an aligned manner when each of the circle, square, and star of the two images of the field overlap essentially precisely in the combined image.

"Quantification" of a geometric property of a particle means assessment of the value of the property with a greater precision than is possible by mere visual observation and estimation of the property at the same level of magnification.

Detailed description

The invention relates to a method of assessing a geometric property of a particle of a substance in a microscopic field, or to multiple particles of the same or different substances. The method comprises irradiating a particle and generating a chemical image of a portion of the field containing the particle (or of the whole field) at one or more wavelengths characteristic of the substance. Imaging processing techniques can be used to quantify one or more geometric properties of the particle based on the chemical image. Such quantified information permits calculation of geometric properties with far greater precision than is possible by casual visual analysis of the image alone. By way of example, the chemical image can be an image of Raman-shifted light scattered from the field and having a wavelength characteristic of Raman-shifted light scattered by the substance or of near infrared (NIR) light reflected by the substance. Alternatively, chemical image can include multiple characteristic wavelengths (or a characteristic spectrum of wavelengths) for the substance. The geometric property can be determined from the chemical image. Because chemical image data (e.g., Raman scattering intensities and shift values or NIR absorbance/reflectance properties) are characteristic of the compound elastically scattering, transmitting, or reflecting the incident radiation, geometric properties of particles of differing composition can be assessed in mixtures of such particles. Furthermore, by generating a chemical image of an entire field of view, geometric properties of substantially all particles in the field can be assessed substantially simultaneously.

In one embodiment, the devices and methods described herein can be used to non-destructively assess semiconductor material defects for the purpose of increasing manufacturing yields. For example, the methods have been used as described herein to inspect tellurium inclusions in CdZnTe compound semiconductor materials. In another embodiment, the devices and methods described herein can be used to assess one or more geometric properties of drug- or excipient-containing particles in a pharmaceutical composition such as an powdered or tabletted pharmaceutical composition.

NIR Spectroscopy

NIR spectroscopy is a mature, non-contact, non-destructive analytical characterization tool that has wide applicability to a broad range of materials. The NIR region of the electromagnetic spectrum encompasses radiation with wavelengths of 0.78 to 2.5 micrometers (i.e., radiation with wavenumbers of 12,800 to 4,000 inverse centimeters, i.e., 12,800 to 4,000 $cm^{-1}$). NIR spectra result from the overtone and combination bands of fundamental mid-infrared (MIR) bands.

NIR-based spectroscopy can be used to rapidly obtain both qualitative and quantitative compositional information about the molecular makeup of a material. Optical imaging (e.g., digital optical imaging) yields spatial information about a material, such as the morphology, topography, and location in an imaged field. By combining the spatial information obtained by optical imaging and the compositional information obtained by NIR spectroscopy, a chemical image can be generated in which the chemical makeup of a material in a field of view can be mapped in two or three (if desired) spatial dimensions. This combination, designated NIR chemical imaging, combines NIR spectroscopy and optical imaging for molecule-specific analysis of materials. An NIR chemical imaging microscope apparatus useful for materials characterization is described herein.

NIR microscopes can be used to obtain NIR absorption, emission, transmittance, reflectance, or elastic scattering data at a single wavelength or over a spectrum of wavelengths, typically for samples ranging in size between 1 and 1000 micrometers. NIR microscopes are typically equipped with a visible light camera for visual location of a region of interest on a sample. After focusing the microscope on the desired location, the sample is illuminated with NIR radiation from a spectrometer, such as a Fourier transform (FT) spectrometer. Reflective optics are used to direct the transmitted, reflected, or elastically scattered light from the sample to a NIR detector. NIR absorption data (e.g., a spectrum) can be collected in transmittance, scattering, or reflectance mode.

NIR imaging cameras have been used by other prior to this disclosure. By using optical filters (e.g., cold filters) to block visible wavelengths (ca. 0.4 to 0.78 micrometers), charge-coupled devices (CCDs, such as those used in digital cameras and camcorders) can be used to sense NIR light to wavelengths around 1100 nanometers. Other regions of the NIR spectrum can be viewed using devices such as indium gallium arsenide (InGaAs; ca. 0.9 to 1.7 micrometers) and indium antimonide (InSb; ca. 1.0 to 5.0 micrometers) focal plane array (FPA) detectors. Integrated wavelength NIR imaging allow study of relative light intensities of materials over broad ranges of the NIR spectrum. However, useful chemical image information is unattainable without some type of discrete wavelength filtering device.

The use of dielectric interference filters in combination with NIR FPAs is one method in which NIR chemical information can be obtained from a sample. To form an NIR chemical image, a NIR light beam is defocused to illuminate a wide field of view and the reflected, transmitted, or elastically scattered light from the illuminated area is imaged onto a two-dimensional NIR detector. A selection of discrete dielectric interference filters (provided in a filter wheel or in a linearly- or circularly-variable format) can be positioned in front of a broadband NIR light source, or in front of the NIR FPA (i.e., between the illuminated area and the FPA) in order to collect NIR wavelength-resolved images. Typically, the use of several fixed bandpass filters is required to access the entire NIR spectrum. The spatial resolution of the NIR image approaches that of the optical microscope, and spectral resolution of several nanometers has been demonstrated. Key limitations of the dielectric filter approach include the need for a multitude of discrete filters to provide appreciable free spectral range, and the reliance on moving mechanical parts in continuously tunable dielectric interference filters as a requirement to form wavelength-resolved images. Although moving mechanical assemblies can be engineered, they add significant cost and complexity to NIR chemical imaging systems. Alternatives to moving mechanical assemblies can be more cost effective and provide performance advantages.

Acousto-optic tunable filters (AOTFs) have been employed in NIR imaging spectrometers with substantially no moving parts. The AOTF is a solid-state device that is capable of filtering wavelengths from the UV to the mid-IR bands, depending on the choice of the filter's crystal material. Operation of an AOTF is based on interaction of light with a traveling acoustic sound wave in an anisotropic crystal medium. Incident light is diffracted with a narrow spectral bandpass when a radio frequency signal is applied to the device. By changing the applied radio frequency (which can be under computer control, for example), the spectral passband can be tuned rapidly and without moving parts.

AOTFs have limitations that limit their usefulness for NIR chemical imaging. For example, AOTF imaging performance is degraded appreciably from diffraction-limited conditions due to dispersion effects and image shifting effects. Furthermore, AOTFs exhibit temperature instability and non-linear properties that complicate their use in imaging spectrometers.

NIR microspectroscopic imaging performed since the development of the first NIR microprobes has involved spatial scanning of samples beneath an NIR microscope in order to construct an NIR "map" of a surface. In point-by-point scanning methods performed using an NIR microscope, the NIR light beam is focused onto the surface of a sample or apertured to illuminate a small region of a sample and a spectrum is collected from each spatial position. Images are obtained by rastering the sample through the focused or apertured NIR light beam and the spectra recorded are then reconstructed to form an image. Although point scanning can be used to produce an image based on NIR contrast, long experimental times are required, because the duration of data collection is proportional to the number of image pixels. As a result, point-scanned images exhibit low image definition, which limits usefulness of the technique for routine assessment of material morphology. The spatial resolution of a point-scanned image is limited by the size of the NIR illumination spot on the sample (i.e., not less than 1 micrometer) and by the rastering mechanism, which requires the use of moving mechanical parts that are challenging to operate reproducibly.

The NIR chemical imaging devices and methods described herein exhibit high spatial and spectral resolution, the spatial resolution being essentially diffraction-limited and the spectral resolution being limited substantially only by the resolution of the spectrometer used to resolve the light provided to the sample (or collected from the sample, depending on the configuration of the device used). Favorable spectral resolution can be achieved, for instance, using a liquid crystal (LC) imaging spectrometer.

In general, LC devices provide diffraction-limited spatial resolution. The spectral resolution of the LC imaging spectrometer is comparable to that achieved using dispersive monochromator and Fourier transform interferometers. In addition, LC technology provides high out-of-band rejection, broad free spectral range, moderate transmittance, high overall light throughput (i.e., etendue or geometric capacity to transmit radiation), and highly reproducible random access computer controlled tuning.

LC imaging spectrometers allow NIR chemical images of samples to be recorded at discrete wavelengths (i.e., photon energies). A spectrum can be generated for thousands of spatial locations on a sample surface by tuning the LC imaging spectrometer over a range of wavelengths and collecting NIR images at each of the locations. Contrast can be generated in the images based on the relative amounts of NIR absorption, transmittance, reflectance, or elastic scattering that is generated by the different species located throughout the sample. An image generated in this manner is one embodiment of a chemical image disclosed herein. Since a high quality NIR spectrum can be generated for each pixel location, a wide variety of chemometric analysis tools, both univariate and multivariate, can be applied to the NIR image data to extract pertinent information. The resulting image can be displayed in numerous formats, including tabulated numeric data, two- and three-dimensional graphs, and static and time-resolved video images.

Correlative multivariate routines can be applied to chemical images collected from samples intentionally seeded with a known standard material. This approach incorporates calibration standards within an image field of view and permits quantitative chemical image analysis. Digital image analysis procedures can also be applied to high image quality chemical images to perform routine particle analysis in two or three spatial dimensions. Volumetric (i.e., three-dimensional) chemical image analysis can be performed using numerical deconvolution computational strategies, for example.

Raman Spectroscopy

Raman spectroscopy provides information about the vibrational state of molecules. Many molecules have atomic bonds capable of existing in a number of vibrational states. Such a molecule is able to absorb incident radiation that matches a transition between two of its allowed vibrational states and to subsequently emit the radiation. Most often, absorbed radiation is re-radiated at the same wavelength, a process designated Rayleigh or elastic scattering. In some instances, the re-radiated radiation can contain slightly more or slightly less energy than the absorbed radiation (depending on the allowable vibrational states and the initial and final vibrational states of the molecule). The result of the energy difference between the incident and re-radiated radiation is manifested as a shift in the wavelength between the incident and re-radiated radiation, and the degree of difference is designated the Raman shift (RS), measured in units of wavenumber (inverse length). If the incident light is substantially monochromatic (single wavelength) as it is when using a laser source, the scattered light which differs in frequency can be more easily distinguished from the Rayleigh scattered light.

Because Raman spectroscopy is based on irradiation of a sample and detection of scattered radiation, it can be employed non-invasively and non-destructively, such that it is suitable for analysis of biological samples in situ. Thus, little or no sample preparation is required. In addition, water exhibits very little Raman scattering, and Raman spectroscopy techniques can be readily performed in aqueous environments.

The Raman spectrum of a material can reveal the molecular composition of the material, including the specific functional groups present in organic and inorganic molecules. Raman spectroscopy is useful for detection of pharmaceutical and other chemical agents because most, if not all, of these agents exhibit characteristic 'fingerprint' Raman spectra, subject to various selection rules, by which the agent can be identified. Raman peak position, peak shape, and adherence to selection rules can be used to determine molecular identity and to determine conformational information (e.g., crystalline phase, degree of order, strain, grain size) for solid materials.

In the past several years, a number of key technologies have been introduced into wide use that have enabled scientists to largely overcome the problems inherent to Raman spectroscopy. These technologies include high efficiency solid-state lasers, efficient laser rejection filters, and silicon CCD detectors. In general, the wavelength and bandwidth of light used to illuminate the sample is not critical, so long as the other optical elements of the system operate in the same spectral range as the light source.

In order to detect Raman scattered light and to accurately determine the Raman shift of that light, the sample should be irradiated with substantially monochromatic light, such as light having a bandwidth not greater than about 1.3 nanometers, and preferably not greater than 1.0, 0.50, or 0.25 nanometer. Suitable sources include various lasers and polychromatic light source-monochromator combinations. It is recognized that the bandwidth of the irradiating light, the resolution of the wavelength resolving element(s), and the spectral range of the detector determine how well a spectral feature can be observed, detected, or distinguished from other spectral features. The combined properties of these elements (i.e., the light source, the filter, grating, or other mechanism used to distinguish Raman scattered light by wavelength) define the spectral resolution of the Raman signal detection system. The known relationships of these elements enable the skilled artisan to select appropriate components in readily calculable ways. Limitations in spectral resolution of the system (e.g., limitations relating to the bandwidth of irradiating light, grating groove density, slit width, interferometer stepping, and other factors) can limit the ability to resolve, detect, or distinguish spectral features. The skilled artisan understands that and how the separation and shape of Raman scattering signals can determine the acceptable limits of spectral resolution for the system for any of the Raman spectral features described herein.

Chemical Imaging

Spectroscopic methods can be used in chemical imaging (also known as spectroscopic imaging) techniques through the use of imaging spectrometers such as liquid crystal imaging spectrometers. The development of this technology in recent years has enabled widefield spectroscopic imaging to develop and mature. Chemical imaging is a versatile technique suitable for analysis of complex heterogeneous materials. Applications of chemical imaging range from the analysis of polymer blends, defect status analysis in semiconductor materials, inclusions in human breast tissue, characterization of corrosion samples and detection, classification and identification of biological and chemical warfare agents. Chemical imaging provides a potential solution for obtaining both qualitative and quantitative image information about molecular composition and morphology materials allowing a more accurate and more rapid analysis than traditional imaging or 'wet' chemical methods.

Ordinary optical imagery of the sample can be obtained using a mirror, beamsplitter, or prism arrangement inserted into the turret wheel of the microscope by collecting an image with an analog or digital color or monochrome charge-coupled device (CCD) or CMOS detector.

Chemical image data can be collected using the Raman-based or NIR-based spectroscopic methods described herein. Alternatively, chemical image data can be generated using other spectroscopic methods such as such as luminescence or absorbance, reflectance, or transmittance spectroscopy or energy dispersive spectrometry. Raman and NIR-based chemical imaging methods are preferred, owing to the significant amount of chemical identity information that can ordinarily be extracted from Raman scattering and NIR absorbance/transmission/elastic scattering characteristics of a material. However, substantially any spectroscopic method that can distinguish a material of interest from other materials in a sample can be used in the methods described herein.

Optical image data and chemical image data can be fused, using software for example. In spectroscopic imaging mode, the magnified spectroscopic image is coupled through a liquid crystal imaging spectrometer and collected on a detector appropriate for the selected chemical imaging method (e.g., a Si CCD detector for RCI). A central processing unit, such a PENTIUM(™, Intel Corporation) processor-based computer, is used for spectroscopic image collection and processing. The optical image detector (e.g., an analog color CCD), the chemical image detector (e.g., a Si CCD), an automated XYZ translational microscope stage (controlled by way of a controller), and a liquid crystal imaging spectrometer (controlled by way of a liquid crystal imaging spectrometer controller) can be cooperatively operated with commercial software, such as the CHEMAQUIRE(™; ChemImage Corporation, Pittsburgh, Pa.) or CHEMIMAGE XPERT(™; ChemImage Corporation, Pittsburgh, Pa.) software packages, either alone or in conjunction with image processing software such as the CHEMANALYZE(™; ChemImage Corporation, Pittsburgh, Pa.) software package.

Although chemical imaging and visible light cameras often generate images having differing contrast, the sample fields of view can be matched using one or both of optical and software manipulations. The chemical and optical images can be compared or fused using overlay and correlation techniques to produce a near-real time view of both detector outputs on a single computer display. Comparative and integrated views of the sample can enhance understanding of sample morphology and architecture. By comparing the optical and chemical images, useful information can be acquired about the chemical composition, structure, and concentration of samples.

Dispersive spectroscopy data can be collected simultaneously with collection of chemical imaging data. By introducing a polarization sensitive beam splitting element in the optical path prior to the liquid crystal imaging spectrometer, a portion of the signal from the sample may be coupled to a remote dispersive spectrometer. The signal can be coupled directly (i.e., by direct optical coupling) or using a fiber optic cable, for example. Conventional spectroscopic tools can thereby be used to gather spectra for traditional, high-speed spectral analysis. The spectrometers can be any of a fixed filter spectrometer, a grating-based spectrometer, a Fourier transform spectrometer, and an acousto-optic spectrometer, for example.

Preferably, liquid crystal (LC) imaging spectrometer technology is used for chemical image wavelength selection. The LC imaging spectrometer can, for example, be one of a Lyot liquid crystal tunable filter (LCTF), an Evans Split-Element LCTF, a Solc LCTF, a ferroelectric LCTF, a liquid crystal Fabry Perot (LCFP), a hybrid filter that combines two or more of the above-mentioned LC filter types, and one of the above mentioned filter types in combination with fixed bandpass and bandreject filters, which can be of the dielectric, rugate, holographic, color absorption, acousto-optic or polarization filter types.

A chemical imaging microscope can be used as a volumetric imaging instrument by moving the sample through focus in the Z-axial dimension, collecting images in- and out-of-focus, and reconstructing a volumetric image of the sample in software. For samples having some volume (e.g., bulk materials, surfaces, interfaces, interphases), volumetric chemical imaging has been shown to be useful for failure analysis, product development, and routine quality monitoring. Quantitative analysis can be performed simultaneously with volumetric analysis. Volumetric imaging can be performed in a non-contact mode without modifying the sample using numerical confocal techniques, which require that the sample be imaged at discrete focal planes. The resulting images are processed, reconstructed, and visualized. Computational optical sectioning reconstruction techniques based on a variety of strategies have been demonstrated, including nearest neighbors and iterative deconvolution, and substantially any of these known methods can be used in connection with the devices and methods described herein.

An alternative to combining sample positioning with computation reconstruction is to employ a tube lens in the image formation path of the microscope which introduces chromatic aberration. As a result the sample can be interrogated as a function of sample depth by operating the LC imaging spectrometer and collecting images at different wavelengths which penetrate to differing degrees into bulk materials. These wavelength-dependent (i.e., depth-dependent) images can be reconstructed to form volumetric images of materials without requiring the sample to be moved by applying computational optical sectioning reconstruction algorithms.

A chemical imaging addition method (CIAM) can be used to calibrate or otherwise analyze samples. CIAMs involve seeding a sample with a material of known composition, structure, and/or concentration and thereafter generating a chemical image suitable for qualitative and quantitative analysis. A standard calibration curve can be constructed, which is a plot of analytical response for a particular technique as a function of known analyte concentration. By measuring the analytical response from an unknown sample, an estimate of the analyte concentration can then be interpolated or extrapolated from the calibration curve. For example, when the analytical response is linearly (i.e., direct proportionally) related to concentration, the concentration of the unknown analyte can be determined by plotting the analytical response from a series of standards and interpolating or extrapolating the unknown concentration from the line. When an analyte exhibits a linear analytical response to increasing concentration, addition of known amounts of the analyte to a sample that contains an unknown amount of the analyte permits determination of the amount of analyte present prior to the additions (i.e., in the original sample). Similar methods can be used to determine an unknown analyte concentration by comparison with a curve that fits analytic responses that are not directly proportional to standard analyte concentrations. The primary advantage of CIAMs is that the matrix remains constant for all samples.

CIAMs can be used for qualitative and quantitative analysis. CIAMs can use one or more spatially isolated analyte standards to calibrate the chemical imaging response obtained from portions of a sample at which the standard is not present. Chemical imaging can generate in parallel thousands of linearly independent, spatially-resolved spectra of analytes in a sample that may or may not include complex matrices. These spectra can be processed to generate unique contrast intrinsic to a desired analyte species without the use of stains, dyes, or contrast agents. Calibration using a standard can be used to correlate the contrast with the amount of the analyte present.

CIAMs can involve several data processing steps, typically including, but not limited to:

1. Ratiometric correction, performed by dividing the sample chemical image by the background chemical image to produce a result having a floating point data type.

2. Normalizing the divided image by dividing each intensity value at every pixel in the image by the vector norm for its corresponding pixel spectrum. The vector norm is the square root of the sum of the squares of pixel intensity values for each pixel spectrum. Normalization is applied for qualitative analysis of chemical images. For quantitative analysis, normalization is not employed, but can instead rely on the use of partial least squares regression (PLSR) techniques.

3. Correlation analysis, including Euclidian distance and cosine correlation analysis (CCA), which are established multivariate image analysis techniques that assess similarity in spectral image data while simultaneously suppressing background effects. More specifically, CCA assesses chemical heterogeneity without the need for training sets, identifies differences in spectral shape and efficiently provides chemical image-based contrast that is independent of absolute intensity. The CCA algorithm treats each pixel spectrum as a projected vector in n-dimensional space, where n is the number of wavelengths sampled in the image. An orthonormal basis set of vectors is chosen as the set of reference vectors and the cosine of the angles between each pixel spectrum vector and the reference vectors are calculated. The intensity values displayed in the resulting CCA images are these cosine values, where a cosine value of 1 indicates the pixel spectrum and reference spectrum are identical, and a cosine value of 0 indicates the pixel spectrum and the reference spectrum are orthogonal (no correlation). The dimensions of the resulting CCA image is the same as the original image because the orthonormal basis set provides n reference vectors, resulting in n CCA images.

4. Principal component analysis (PCA) is a data space dimensionality-reduction technique. A least squares fit is drawn through the maximum variance in the n-dimensional data set. The vector resulting from this least squares fit is termed the first principal component (PC) or the first loading. After subtracting the variance explained from the first PC, the operation is repeated and the second principal component is calculated. This process is repeated until some percentage (normally 95% or greater) of the total variance in the data space is explained. PC score images can then be visualized to reveal orthogonal information including sample information, as well as instrument response, including noise. Reconstruction of spectral dimension data can be performed, guided by cluster analysis, including without PCs that describe material or instrument parameters that one desires to amplify or suppress, depending on the needs of the sensing application.

Until recently, seamless integration of spectral analysis, chemometric analysis and digital image analysis has not been commercially available. Individual communities have independently developed advanced software applicable to their specific requirements. For example, digital imaging software packages that treat single-frame gray-scale images and spectral processing programs that apply chemometric techniques have both reached a relatively mature state. One limitation to the development of chemical imaging, however, has been the lack of integrated software that combines enough of the features of each of these individual disciplines to have practical utility.

Historically, practitioners of chemical imaging were forced to develop their own software routines to perform each of the key steps of the data analysis. Typically, routines were prototyped using packages that supported scripting capability, such as Matlab, IDL, Grams or LabView. These packages, while flexible, are limited by steep learning curves, computational inefficiencies, and the need for individual practitioners to develop their own graphical user interface (GUI). Today, commercially available software does exist that provides efficient data processing and the ease of use of a simple GUI.

Software that meets these goals must address the entirety of the chemical imaging process. The chemical imaging analysis cycle illustrates the steps needed to successfully extract information from chemical images and to tap the full potential provided by chemical imaging systems. The cycle begins with the selection of sample measurement strategies and continues through to the presentation of a measurement solution. The first step is the collection of images. The related software must accommodate the full complement of chemical image acquisition configurations, including support of various spectroscopic techniques, the associated spectrometers and imaging detectors, and the sampling flexibility required by differing sample sizes and collection times. Ideally, even relatively disparate instrument designs can have one intuitive GUI to facilitate ease of use and ease of adoption.

The second step in the analysis cycle is data preprocessing. In general, preprocessing steps attempt to minimize contributions from chemical imaging instrument response that are not related to variations in the chemical composition of the imaged sample. Some of the functionalities needed include: correction for detector response, including variations in detector quantum efficiency, bad detector pixels and cosmic events; variation in source illumination intensity across the sample; and gross differentiation between spectral lineshapes based on baseline fitting and subtraction. Examples of tools available for preprocessing include ratiometric correction of detector pixel response; spectral operations such as Fourier filters and other spectral filters, normalization, mean centering, baseline correction, and smoothing; spatial operations such as cosmic filtering, low-pass filters, high-pass filters, and a number of other spatial filters.

Once instrument response has been suppressed, qualitative processing can be employed. Qualitative chemical image analysis attempts to address a simple question, "What is present and how is it distributed?" Many chemometric tools fall under this category. A partial list includes: correlation techniques such as cosine correlation and Euclidean distance correlation; classification techniques such as principal components analysis, cluster analysis, discriminant analysis, and multi-way analysis; and spectral deconvolution techniques such as SIMPLISMA, linear spectral unmixing and multivariate curve resolution.

Quantitative analysis deals with the development of concentration map images. Just as in quantitative spectral analysis, a number of multivariate chemometric techniques can be used to build the calibration models. In applying quantitative chemical imaging, all of the challenges experienced in non-imaging spectral analysis are present in quantitative chemical imaging, such as the selection of the calibration set and the verification of the model. However, in chemical imaging additional challenges exist, such as variations in sample thickness and the variability of multiple detector elements, to name a few. Depending on the quality of the models developed, the results can range from semi-quantitative concentration maps to rigorous quantitative measurements.

Results obtained from preprocessing, qualitative analysis and quantitative analysis must be visualized. Software tools must provide scaling, automapping, pseudo-color image representation, surface maps, volumetric representation, and multiple modes of presentation such as single image frame views, montage views, and animation of multidimensional chemical images, as well as a variety of digital image analysis algorithms for look up table (LUT) manipulation and contrast enhancement.

Once digital chemical images have been generated, traditional digital image analysis can be applied. For example, Spatial Analysis and Chemical Image Measurement involve binarization of the high bit depth (typically 32 bits/pixel) chemical image using threshold and segmentation strategies. Once binary images have been generated, analysis tools can examine a number of image domain features such as size, location, alignment, shape factors, domain count, domain density, and classification of domains based on any of the selected features. Results of these calculations can be used to develop key quantitative image parameters that can be used to characterize materials.

The final category of tools, Automated Image Processing, involves the automation of key steps or of the entire chemical image analysis process. For example, the detection of well defined features in an image can be completely automated and the results of these automated analyses can be tabulated based on any number of criteria (particle size, shape, chemical composition, etc). Automated chemical imaging platforms have been developed that can run for hours in an unsupervised fashion.

This invention incorporates a comprehensive analysis approach that allows user's to carefully plan experiments and optimize instrument parameters and should allow the maximum amount of information to be extracted from chemical images so that the user can make intelligent decisions.

Raman-Based Chemical Imaging System

Raman chemical imaging (RCI) combines Raman spectroscopy with digital imaging for molecular-specific analysis of materials. This technology allows images of samples to be constructed by recording Raman scattered light at discrete wavelengths emanating from defined locations in an illuminated sample. A spectrum is generated corresponding to millions of spatial locations at the sample surface by tuning the liquid crystal imaging Raman spectrometer over a range of wavelengths and collecting images intermittently. Depending on the materials, depth-related information can also be obtained by using different excitation wavelengths or by capturing Raman chemical images at incremental planes of focus. Contrast is generated in the images based on the relative amounts of Raman scatter that is generated by the different species located throughout the sample. Since a Raman spectrum is generated for each pixel location, univariate and/or multivariate (i.e., chemometric) analysis tools such as correlation analysis, Principal Component Analysis (PCA), and factor rotation, including Multivariate Curve Resolution (MCR), can be applied to the image data to extract pertinent information.

A spatial resolving power of approximately 250 nanometers has been demonstrated for Raman chemical imaging using laser illumination at visible wavelengths. This is almost two orders of magnitude better than infrared imaging that is typically limited to a spatial resolution of about 20 microns, owing to diffraction. In addition, image definition (based on the total number of imaging pixels) can be very high for RCI based on liquid crystal optics because high pixel density detectors (often 1 million or more detector elements per detector) can be used. The wavelength of light used for illumination is not critical and can be in the range from 220 to 1100 nanometer.

An apparatus for Raman chemical imaging has been described by Treado in U.S. Pat. No. 6,002,476, and in U.S. patent application Ser. No. 09/619,371, filed 19 Jul. 2000, which are incorporated herein by reference. Other descriptions of Raman chemical imaging are U.S. patent application Ser. No. 09/800,953, filed 7 Mar. 2001; U.S. patent application Ser. No. 09/976,391, filed 21 Oct. 2001; U.S. patent application Ser. No. 10/185,090, filed 27 Jun. 2002; U.S. patent application Ser. No. 10/184,580 filed 27 Jun. 2002; U.S. provisional patent application 60/144,518, filed 19 Jul. 1999; U.S. provisional patent application 60/347,806, filed 10 Jan. 2002; U.S. provisional patent application 60/144,518, filed 19 Jul. 1999; U.S. provisional patent application 60/187,560, filed 28 Mar. 2000; U.S. provisional patent application 60/239,969, filed 13 Nov. 2000; U.S. provisional patent application 60/301,708 filed, 28 Jun. 2001; and U.S. provisional patent application 60/422,604, filed 21 Nov. 2002. Each of the foregoing patents and applications is incorporated herein by reference.

RCI instrument configurations can include platforms based on a RCI microscope, for example. An example of a commercially available device which is suitable for use in the methods described herein is a laboratory or transportable field Raman microscope such as the FALCON Raman microscope (™; ChemImage Corporation, Pittsburgh, Pa.).

An RCI microscope such as the FALCON™ system described above combines in a single platform a solid state laser for sample excitation, a refractive optical microscope base, which is equipped with infinity-corrected microscope objectives, an automated XYZ translational microscope stage, and a quartz tungsten halogen (QTH) lamp and/or a mercury (Hg) lamp. Also a part of the microscope system is an analog color charge-coupled device (CCD) detector for ordinary optical image collection and digital image collection, a liquid crystal imaging spectrometer for spectroscopic image wavelength selection, a thermoelectrically cooled (TE) Si CCD detector for Raman chemical image capture, and a remote, dispersive monochromator equipped with a CCD detector for dispersive spectral collection.

NIR-Based Chemical Imaging System

The NIR chemical imaging microscope combines in a single platform a NIR optimized refractive optical microscope base, which is equipped with NIR optimized infinity-corrected microscope objectives, an automated XYZ translational microscope stage and quartz tungsten halogen (QTH) lamps to secure and illuminate samples for NIR spectroscopy and imaging, an analog color charge-coupled device (CCD) detector for ordinary optical image collection and digital image collection, a NIR LC imaging spectrometer for NIR chemical image wavelength selection and a room temperature or optionally cooled NIR FPA for NIR image capture.

Figure 35:
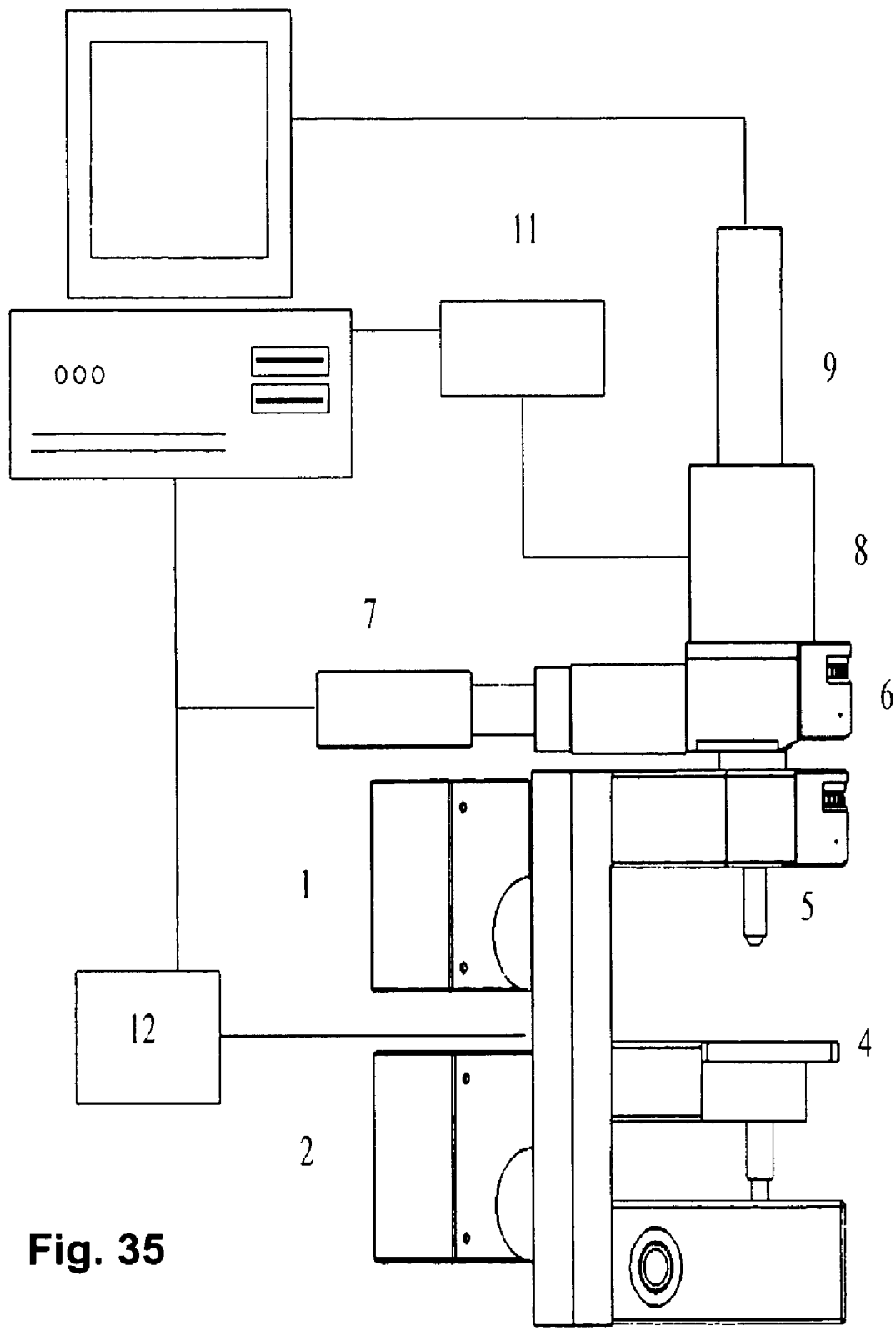
FIG. 35 is a schematic diagram of a near-infrared (NIR) chemical imaging microscope.

FIG. 35 is a schematic diagram of the NIR chemical imaging microscope. NIR illumination is directed to the sample in a reflected light configuration using a QTH source or other broadband white light source, including metal halide or Xe arc lamps 1 or a transmitted light configuration using QTH or suitable NIR source 2 of an NIR optimized refractive optical microscope platform 3. The reflected or transmitted NIR light is collected from the sample positioned on the automated XYZ translational microscope stage 4 through an infinity-corrected NIR optimized microscope objective 5.

Ordinary optical imagery of the sample can be obtained using a mirror or beamsplitter or prism arrangement inserted into turret 6 and collecting an image with an analog or digital color or monochrome charge-coupled device (CCD) or CMOS detector 7. In NIR chemical imaging mode, the magnified NIR image is coupled through a NIR LC imaging spectrometer 8 and collected on a room temperature or cooled NIR focal plane array (FPA) detector 9. The FPA is typically comprised of indium gallium arsenide (InGaAs), but may be comprised of other NIR sensitive materials, including platinum silicide (PtSi), indium antimonide (InSb) or mercury cadmium telluride (HgCdTe). Using a beamsplitting element inserted into turret 6, NIR and ordinary optical imagery can be collected with an analog monochrome or color CCD detector 7 and NIR FPA 9 simultaneously.

A central processing unit 10, typically a Pentium computer, is used for NIR chemical image collection and processing. The analog color CCD 7, NIR FPA 9, automated XYZ translational microscope stage 4 controlled via a controller 12 and NIR LC imaging spectrometer 8 (through LC imaging spectrometer controller 11) are operated with commercial software, such as Acquisition Manager (ChemImage Corporation, Pittsburg, Pa.; previously known as ChemIcon, Inc.) in conjunction with ChemImage (ChemImage Corporation, Pittsburg, Pa.; previously known as ChemIcon, Inc.).

By introducing a polarization sensitive beam splitting element in the optical path prior to the NIR LC imaging spectrometer 8 (not shown in schematic diagram), a portion of the NIR light from the sample may be coupled to a remote NIR spectrometer (also not shown in schematic diagram).

Preferably, NIR optimized liquid crystal (LC) imaging spectrometer technology is used for wavelength selection. The LC imaging spectrometer may be of the following types: Lyot liquid crystal tunable filter (LCTF); Evans Split-Element LCTF; Solc LCTF; Ferroelectric LCTF; Liquid crystal Fabry Perot (LCFP); or a hybrid filter technology comprised of a combination of the above-mentioned LC filter types or the above mentioned filter types in combination with fixed bandpass and bandreject filters comprised of dielectric, rugate, holographic, color absorption, acousto-optic or polarization types.

One novel component of this invention, is that a NIR optimized refractive microscope is used in conjunction with infinity-corrected objectives to form the NIR image on the detector without the use of a tube lens. The microscope can be optimized for NIR operation through inherent design of objective and associated anti-reflective coatings, condenser and light source. To simultaneously provide high numerical apertures the objective should be refractive. To minimize chromatic aberration, maximize throughput and reduce cost the conventional tube lens can be eliminated, while having the NIR objective form the NIR image directly onto the NIR focal plane array (FPA) detector, typically of the InGaAs type. The FPA can also be comprised of Si, SiGe, PtSi, InSb, HgCdTe, PdSi, Ge, analog vidicon types. The FPA output is digitized using an analog or digital frame grabber approach.

An integrated parfocal analog CCD detector provides real-time sample positioning and focusing. An analog video camera sensitive to visible radiation, typically a color or monochrome CCD detector, but may be comprised of a CMOS type, is positioned parfocal with the NIR FPA detector to facilitate sample positioning and focusing without requiring direct viewing of the sample through conventional eyepieces. The video camera output is typically digitized using a frame grabber approach.

Particle Analysis Method

Analysis of particles of a composition identifiable by chemical imaging analysis is performed by collecting chemical image data from sample particles, such as substantially immobilized sample particles. From the spectroscopic imaging data, a chemical image is generated at one or more spectroscopic values characteristic of the component of interest to yield a two- or three-dimensional image of the spatial distribution of the component. By way of example, suitable spectroscopic values include Raman shift values, NIR absorption wavelengths, or NIR reflectance wavelengths. The image is subjected to any of a variety of known univariate and/or multivariate image processing techniques that are known in the art in order to determine at least one geometric property of the component particles. Such geometric properties can be used to describe the properties of the component particles in the sample.

If desired, an optical or spectroscopic image of the field of view is made at substantially the same time as the chemical image data are collected (or at least near enough in time that the particles in the field have not substantially moved). A dispersive chemical image of the entire field can also be collected. Because the geometric property(ies) are calculated from chemical image data at a spectroscopic value (e.g., the wavenumber corresponding to a characteristic Raman shift value or a wavelength of NIR radiation characteristically reflected by the substance) characteristic of the substance of interest (or at two or more such characteristic values), the presence of other substances or particles in the sample does not affect assessment of the particles of interest, at least so long as the other substance(s) or particle(s) do not exhibit the same or indistinguishable spectral properties. Two substances with similar spectral properties can be distinguished, for example, by concentrating analysis on a region of the corresponding spectrum in which the two substances differ more than in other regions of the spectrum. An optical or spectroscopic image of the field can indicate the presence, extent, and geometric properties of particles of components other than the substance of interest in the composition that is analyzed.

The present methods have the advantage, relative to prior optical microscopy methods, that spectral information that can unambiguously identify the composition of particles can be collected simultaneously with optical information relating to particle size and shape. Furthermore, because the spectral methods described herein can be used to collect spectral information characteristic of multiple compounds, prior optically-based methods of assessing particle geometry can be applied on a compound-by-compound basis to a sample containing a mixture of compounds. The spectral methods described herein can distinguish a particle of a first pure substance from a particle of a second pure substance, and can also distinguish these particles from particles of mixed composition. The methods can also be used to map the relative amounts of multi-component particles in different regions of a single particle (e.g., a particle formed by agglomeration of multiple particles of differing composition).

Sample Immobilization

In one embodiment, the present invention requires effective immobilization of the substance of interest on a substrate having properties conducive to the relevant chemical imaging method to be used (e.g., a Raman inactive substrate when Raman chemical imaging is to be performed). Such a substrate should preferably be flat, resistant to damage or modification upon illumination, resistant to thermal expansion, relatively spectrally inactive, and non-interferent with the radiation scattered from, absorbed by, or reflected from the sample.

For Raman chemical imaging applications, an appropriate choice of substrate is an aluminum-coated glass microscope slide. Suitable substrates for NIR and other spectroscopic modalities are also known in the art. Ordinary glass microscope slides can also be used, at least with certain laser illumination wavelengths that are apparent to skilled artisans and/or readily empirically determined. Powdered or aerosolized particles or particles suspended in a liquid can be applied to surface of such a slide and any liquid in the composition can be allowed to dry. Alternatively, compositions in which the particles of interest are suspended in a fluid can be frozen on the surface of a slide (e.g., by cooling the slide and spraying an aerosolized particle suspension thereon). As another alternative, a composition comprising particles of interest can be suspended in a polymer resin that is thereafter cured to immobilize the particles. The resin can be cured in place or sliced after curing. Monolithic solids (e.g., tablets, caplets, and lozenges) can be simply placed on a surface or secured in place.

If a liquid preparation of particles (e.g., solid particles suspended in liquid or a particulate liquid phase suspended in a continuous liquid phase) is to be analyzed, the preparation can be immobilized by maintaining a thin layer of the liquid under conditions (e.g., high humidity for aqueous preparations) in which the liquid will not evaporate. Alternatively, liquid samples can be sandwiched between transparent glass or plastic slides, optionally having a spacer interposed between the slides to yield a liquid layer of defined thickness.

Chemical imaging can also be performed on non-immobilized particles. With non-immobilized particles, it is important to take into account the time required for chemical image data analysis and to limit the period of data acquisition to a period in which movement of the particles is either minimal or recorded. In instances in which chemical imaging data can be rapidly collected (e.g., when Raman scattered light is collected at one or a small number of RS values), particle motion can be disregarded. In such instances, serial collection of chemical image data sets can be used to assess dynamic changes (e.g., agglomeration, evaporation, precipitation, or adhesion) in a sample of particles. In instances in which a greater amount of chemical image data is to be collected and particle movement may be significant during the period of data collection, one or more techniques for correlating the location of moving particles with data collection must be used (e.g., optical sighting methods). Such methods are known in the art.

RCI Data Collection

RCI data can be collected using known methods. For example, a commercially available FALCON RCI microscope(™; ChemImage Corporation, Pittsburgh, Pa.) can be used according to the manufacturer's instructions.

In order to ensure proper peak positions in dispersive Raman and RCI data, the RCI instrument should be calibrated using a NIST-accepted calibration standard for Raman spectrometers. A common standard is acetaminophen. If the identity(ies) of components of the sample other than the substance of interest are known, then Raman spectral data for each of those components can be generated. This information permits identification of appropriate portions of the Raman spectrum to scan during RCI data acquisition to avoid overlapping Raman scattering peaks.

Typically, a Raman peak that both is distinctive of the substance of interest and exhibits an acceptable signal-to-noise ratio will be selected. Multiple Raman shift values characteristic of the substance can be assessed, as can the shape of a Raman spectral region that may include multiple Raman peaks. If the sample includes unknown components, then the entire Raman spectrum can be scanned during RCI data acquisition, so that the contributions of any contaminants to the data can be assessed.

In order to collect RCI data, substantially immobilized particles are brought into focus under the microscope and the appropriate data collection parameters for the instrument are set. Raman chemical image(s) are collected. Brightfield and other supporting optical imagery can also be acquired at this time to provide complimentary spatial/birefringence information in addition to the RCI data.

NIR Chemical Image Data Collection

NIR chemical image data can be collected using known methods. For example, a commercially available FALCON (™; ChemImage Corporation, Pittsburgh, Pa.) chemical imaging microscope can be used according to the manufacturer's instructions.

In order to ensure proper peak positions in NIR chemical image data, the instrument should be calibrated using a calibration standard having known NIR absorption, elastic scattering, or reflection peaks. If the identity(ies) of components of the sample other than the substance of interest are known, then NIR spectral data for each of those components can be generated. This information permits identification of appropriate portions of the infrared spectrum to scan during chemical image data acquisition to avoid overlapping peaks.

Typically, an NIR spectral peak that both is distinctive of the substance of interest and exhibits an acceptable signal-to-noise ratio will be selected. Multiple wavelength values characteristic of the substance can be assessed, as can the shape of an NIR absorption or reflection spectral region that may include multiple peaks. If the sample includes unknown components, then the entire NIR or infrared spectrum can be scanned during data acquisition, so that the contributions of any contaminants to the data can be assessed.

In order to collect NIR spectral data, substantially immobilized particles are brought into focus under the microscope and appropriate data collection parameters for the instrument are set. NIR chemical image(s) are collected. Brightfield and other supporting optical imagery can also be acquired at this time to provide complimentary spatial/birefringence information in addition to the NIR data.

Data Processing

Acquired chemical images are subjected to one or more univariate and/or multivariate image processing strategies. Many image processing strategies are described in the art, and selection of one or more such strategies is within the level of ordinary skill in this field. Various software packages are also commercially available which are able to translate two- and three-dimensional chemical data sets geometric properties for particles. An example of suitable software for use with the FALCON™ chemical imaging microscope system is the CHEMIMAGE XPERT™ software package available from ChemImage Corporation (Pittsburgh, Pa.).

A useful method for creating an easily-manipulated image which can be used for geometric property determination is creation from chemical imaging data of one or more binary image frames, each corresponding to a particular characteristic spectral value and/or a particular plane of focus. For example, software can be used to assign a value of "1" to pixels that contain spatial/spectral information characteristic of the substance of interest and a value of "0" to pixels containing spatial/spectral information not characteristic of the substance. Once chemical images have been binarized, appropriate particle sizing software is applied to the processed data to determine molecule-specific particle sizes.

Typical geometrical parameters that are used to describe particle size based on two-dimensional data include the following: Area (cross-sectional area of particle); Perimeter (boundary length of particle); Feret diameter 1 (horizontal distance across particle); Feret diameter 2 (vertical distance across particle—i.e., Feret diameter along axis perpendicular to Feret diameter 1); Max chord length (maximum distance across particle); Shape factor (i.e., the value of the formula (4×pi×Area)/Perimeter^2); Aspect ratio (Feret diameter 1/Feret diameter 2).

Typical geometrical parameters that are used to describe particle size based on three-dimensional data include the following: Volume (volume of the particle); Surface area (surface of the particle); Feret diameters (three, orthogonal to one another); Maximum chord length (maximum distance across particle); various shape factors, and various measures of aspect ratios or sphericity of the particle.

These geometrical parameters can be determined using the methods described herein or calculated from geometrical parameters that can be determined using such methods.

The dimensional limits of the particle analysis methods described herein are defined by the chemical imaging system being used. Currently, the minimum spatial differentiation limit of the ChemImage FALCON™ chemical imaging microscope is believed to be about 200-250 nanometers, meaning that geometrical properties of particles smaller than this could not be effectively assessed using that system. The theoretical lower limit to the size of particles that can be assessed using these methods is on the order of the diffraction limit of the incident light (taking into account known deconvolution techniques, which may lower the limit further). The methods described herein can be readily applied to any new instrument having a lower spatial differentiation limit than the FALCON™ device.

Multiple Particle Analyses

If the composition being analyzed comprises particles having distinguishable spectral properties, then the particle analytical methods described herein can be used to assess geometric properties of all of the spectrally-distinguishable types of particles in the composition. By way of example, if an aerosolized pharmaceutical composition contains two particle types that can be differentiated by their Raman scattering peaks, then RCI data can be collected at two or more Raman shift values—one Raman shift value characteristic of one particle type, and another Raman shift value characteristic of the other particle type. The two particle types can be differentiated by assessing multiple Raman scattering properties (e.g., scattering at multiple RS values) characteristic of each of the particles. This RCI data set will include information sufficient to describe geometric properties of both particle types.

Combinations of spectral properties can be used to describe geometric properties of particles that cannot be identified by a single characteristic spectral characteristic. By way of example, if the composition described in the previous paragraph contains a third particle type which can be differentiated from all other components of the composition by a characteristic fluorescence peak, then geometric properties of that third particle type can be assessed by analysis of fluorescent imaging data obtained for the characteristically-fluorescing particle. Combinations of spectroscopic properties of a material (e.g., absorbance of visible, infrared, or near-infrared light; reflectance or polarization properties; shape or texture deduced from a microscopy technique such as scanning electron microscopy; Raman scattering behavior, such as a characteristic Raman shift value; or elemental content, such as assessed using energy dispersive spectroscopy) can also be used to identify a particle type.

If all particle types except one in a composition can be characterized by a single spectroscopic characteristic, then all particles that do not exhibit that characteristic can be presumed to be the remaining particle type, and optical microscopy data can be used in combination with chemical imaging data to assess one or more geometric properties of the remaining particle type. In some instances, the chemical identity of particles other than those of a particular compound is not important and need not be determined, other than to confirm the absence of the particular compound in those particles.

EXAMPLES

The invention is now described with reference to the following Examples. These Examples are provided for the purpose of illustration only, and the invention is not limited to these Examples, but rather encompasses all variations which are evident as a result of the teaching provided herein.

Example 1

RCI Assessment of Nasal Spray Preparation

In this example, a nasal spray preparation was used which contained beclomethasone dipropionate (BDP) as an active pharmaceutical agent and the following components as inactive agents: microcrystalline cellulose (MCC); carboxymethylcellulose sodium (CMC); dextrose; benzalkonium chloride; POLYSORBATE 80™; and phenylethyl alcohol.

Figure 2:
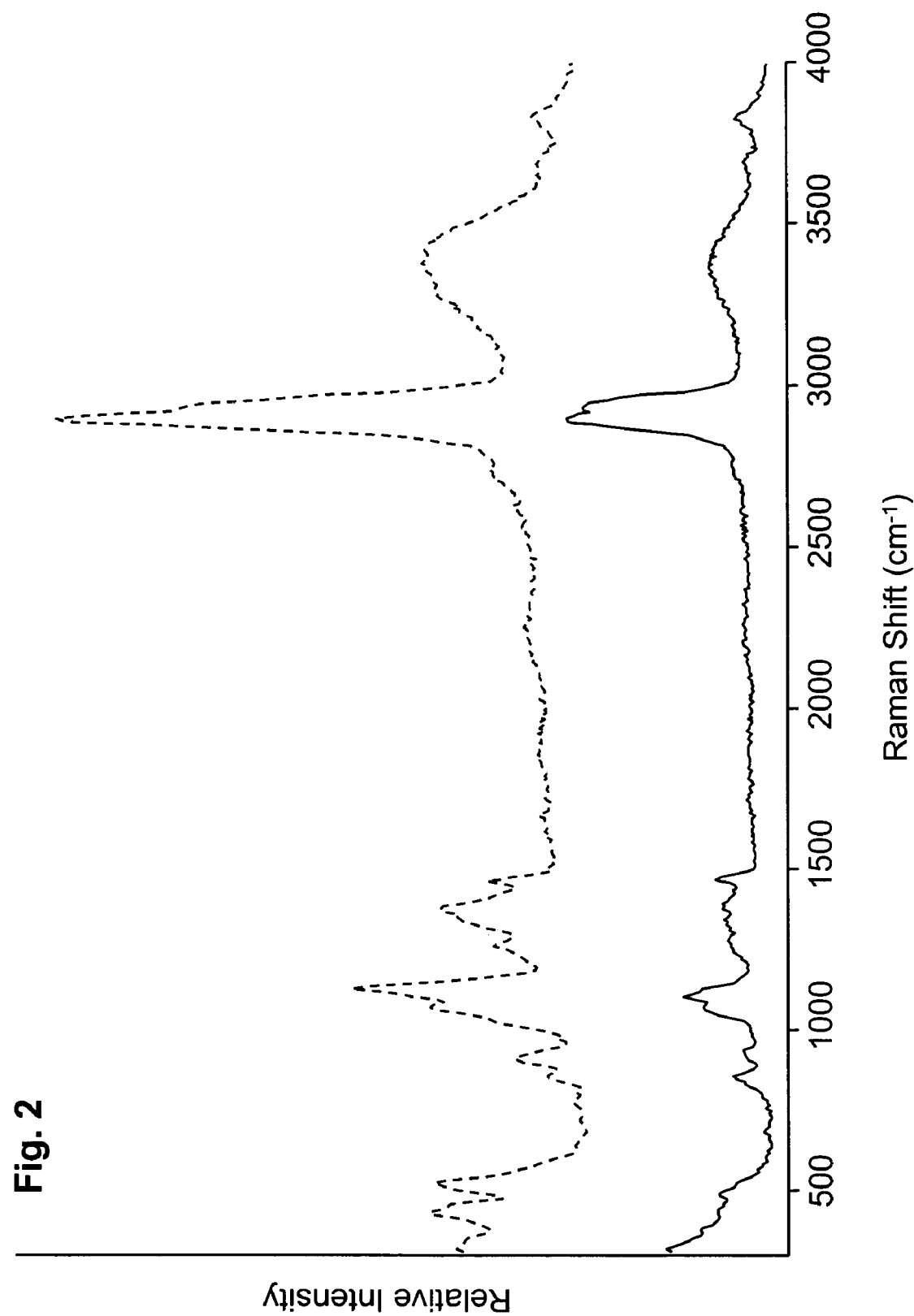
FIG. 2 depicts Raman spectra acquired from nasal spray samples 1E1 (solid line) and 3E1 (dashed line) after the samples were allowed to dry on a glass microscope slide.
Figure 3B:
FIG. 3B depicts a polarized light micrograph of the sample.
Figure 3A:
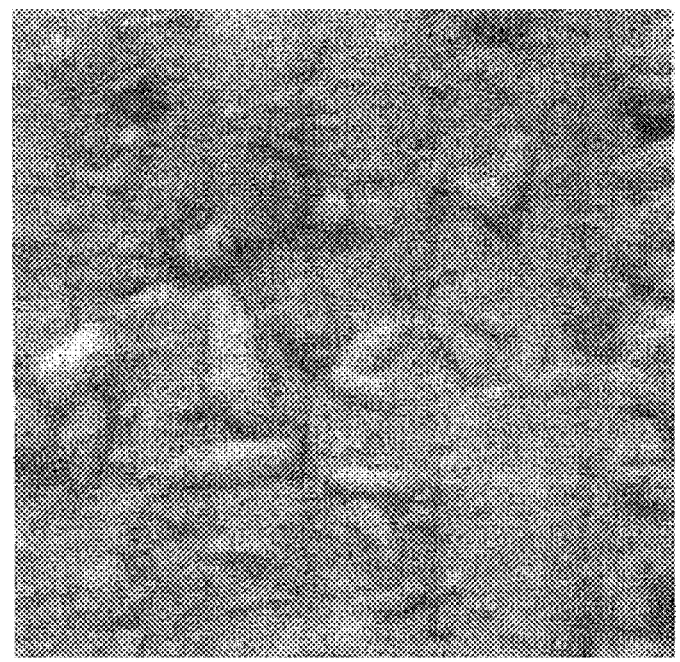
FIG. 3A depicts a brightfield reflectance micrograph of the sample.
Figure 3C:
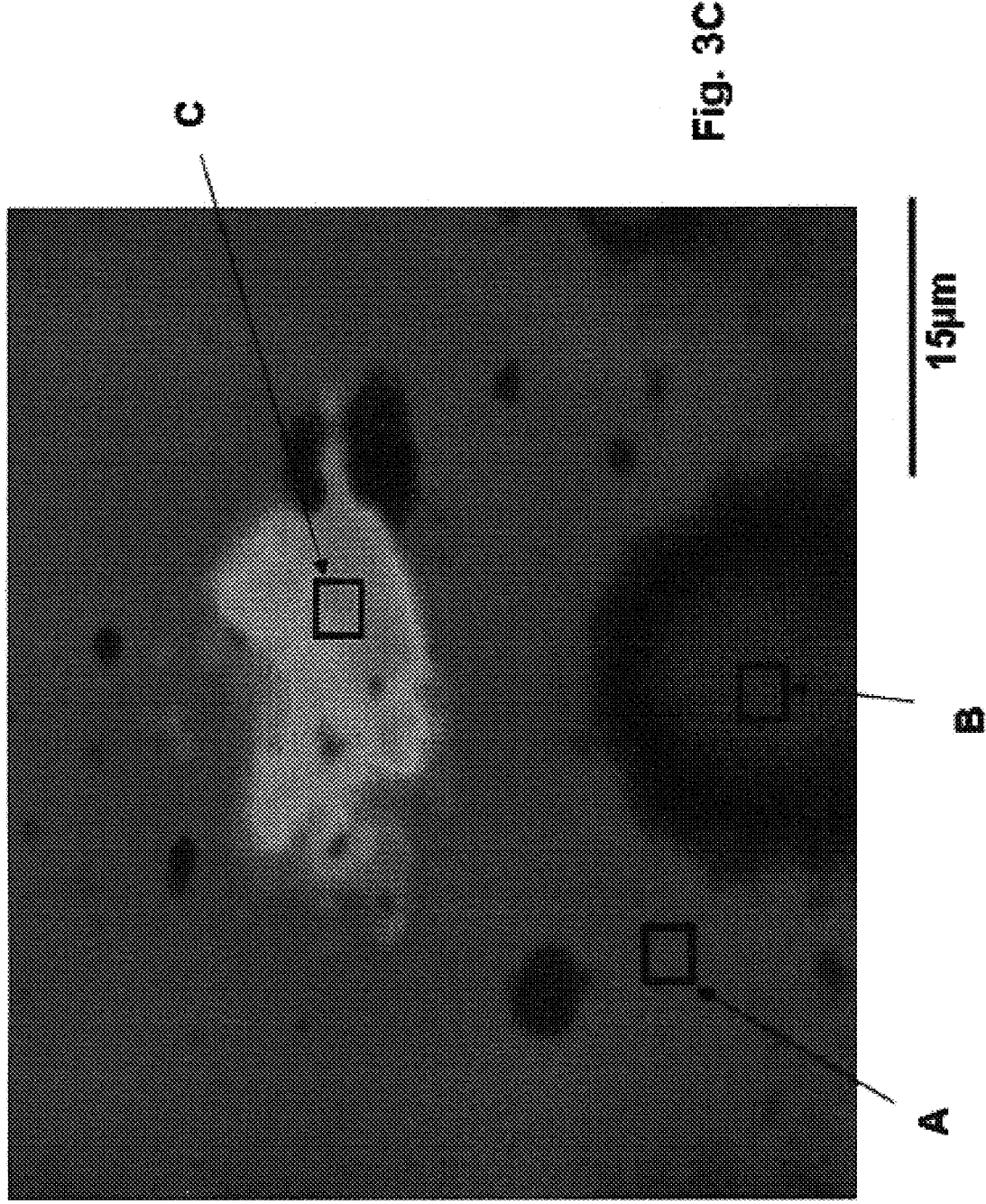
FIG. 3C depicts a Raman chemical image of the sample.
Figure 3D:
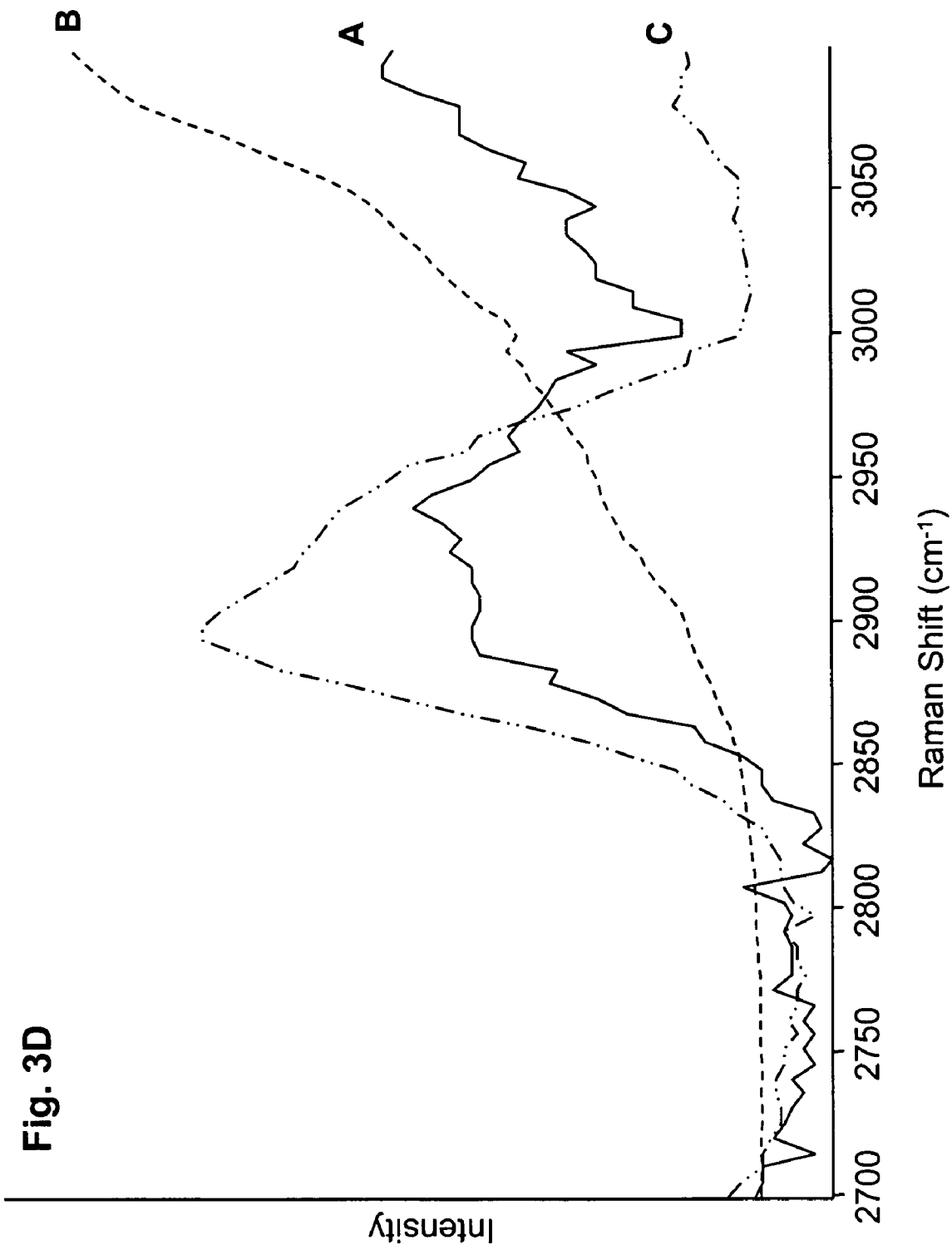
FIG. 3D depicts Raman spectra corresponding to portions A (solid line in FIG. 3D), B (dashed line in FIG. 3D), and C (alternating solid and dashed line in FIG. 3D) of FIG. 3C.
Figure 4:
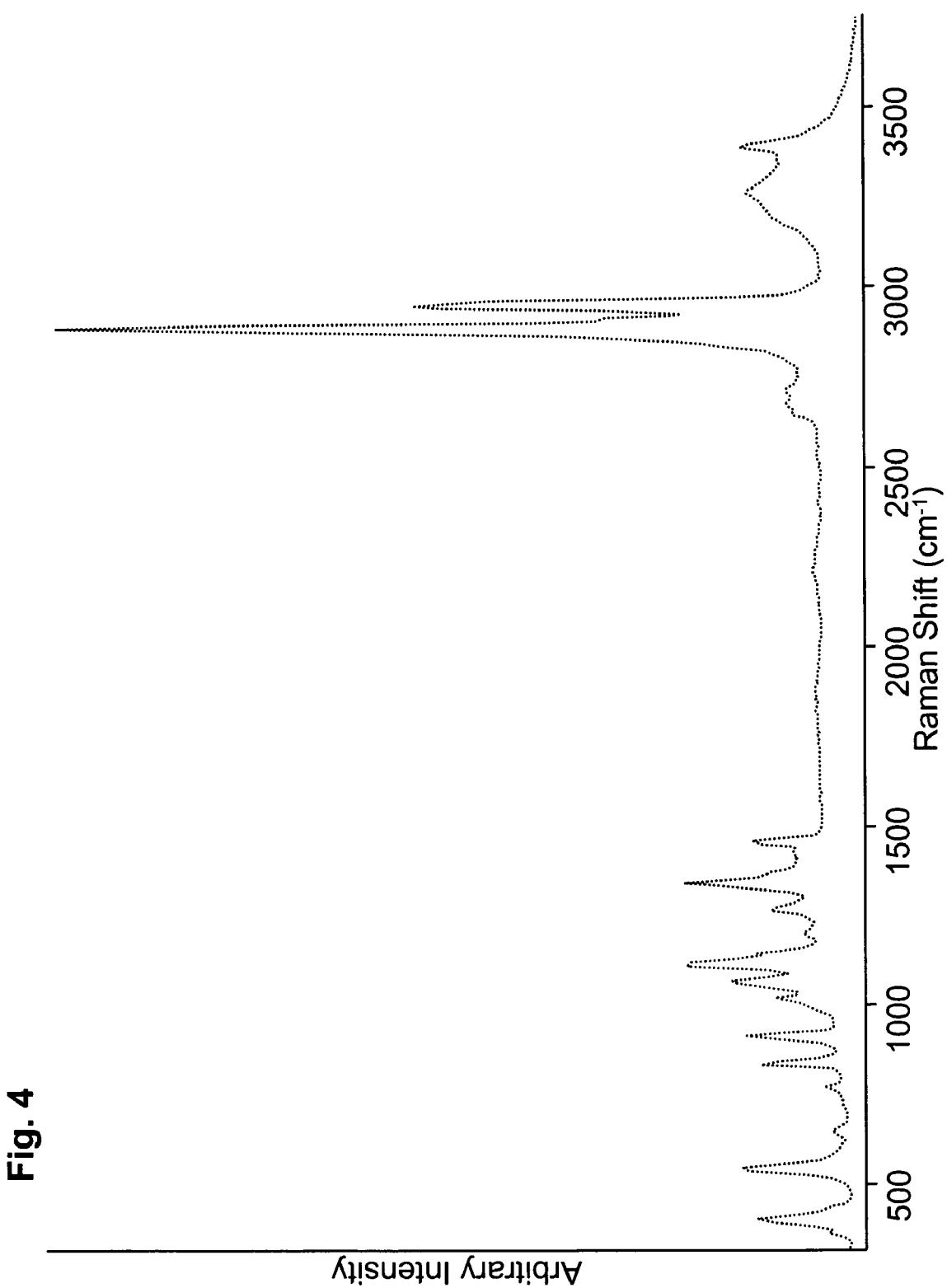
FIG. 4 depicts a dispersive Raman spectrum of dextrose illuminated with 0.4 Watt, 532 nanometer laser light, using a 50×, 0.8 numerical aperture objective, a 25 micrometer entrance slit, a 0.5 meter spectrometer with 150 grooves per millimeter, and a 6 second CCD exposure with 5 accumulations.
Figure 5:
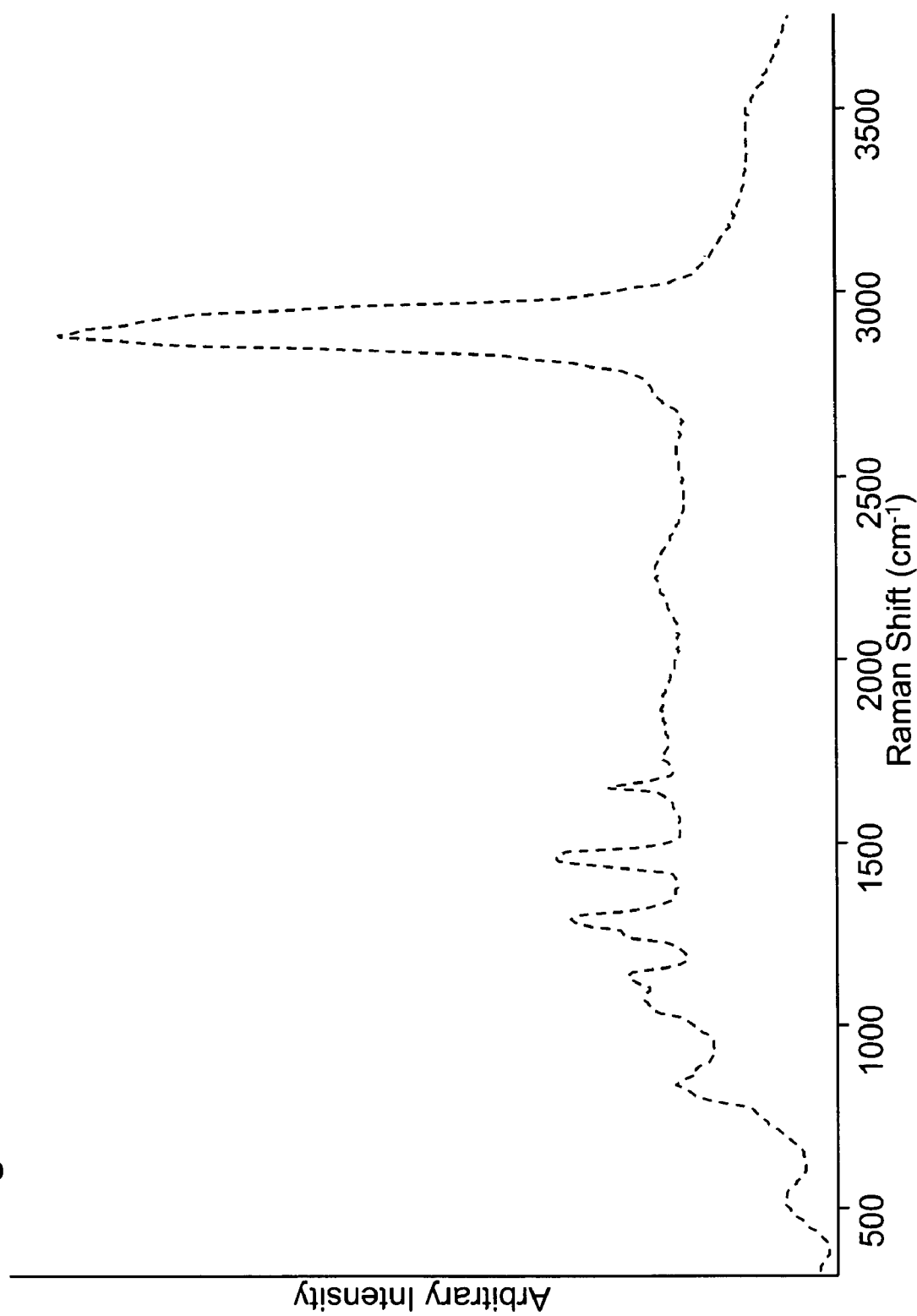
FIG. 5 depicts a dispersive Raman spectrum of POLYSORBATE 80 generated using the same spectrometer and settings as in FIG. 4.
Figure 6:
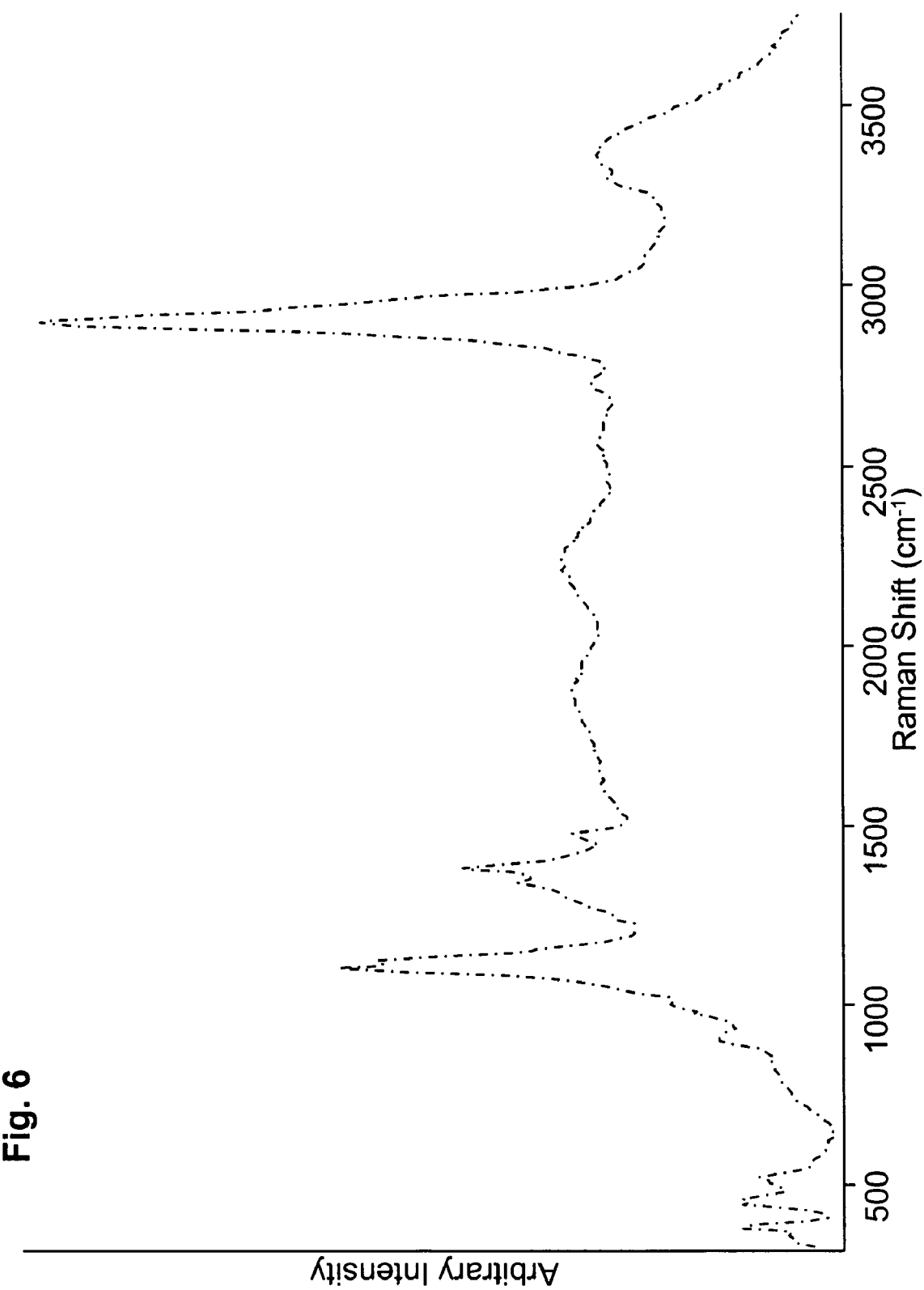
FIG. 6 depicts a dispersive Raman spectrum of microcrystalline cellulose (MCC) generated using the same spectrometer and settings as in FIG. 4.
Figure 7:
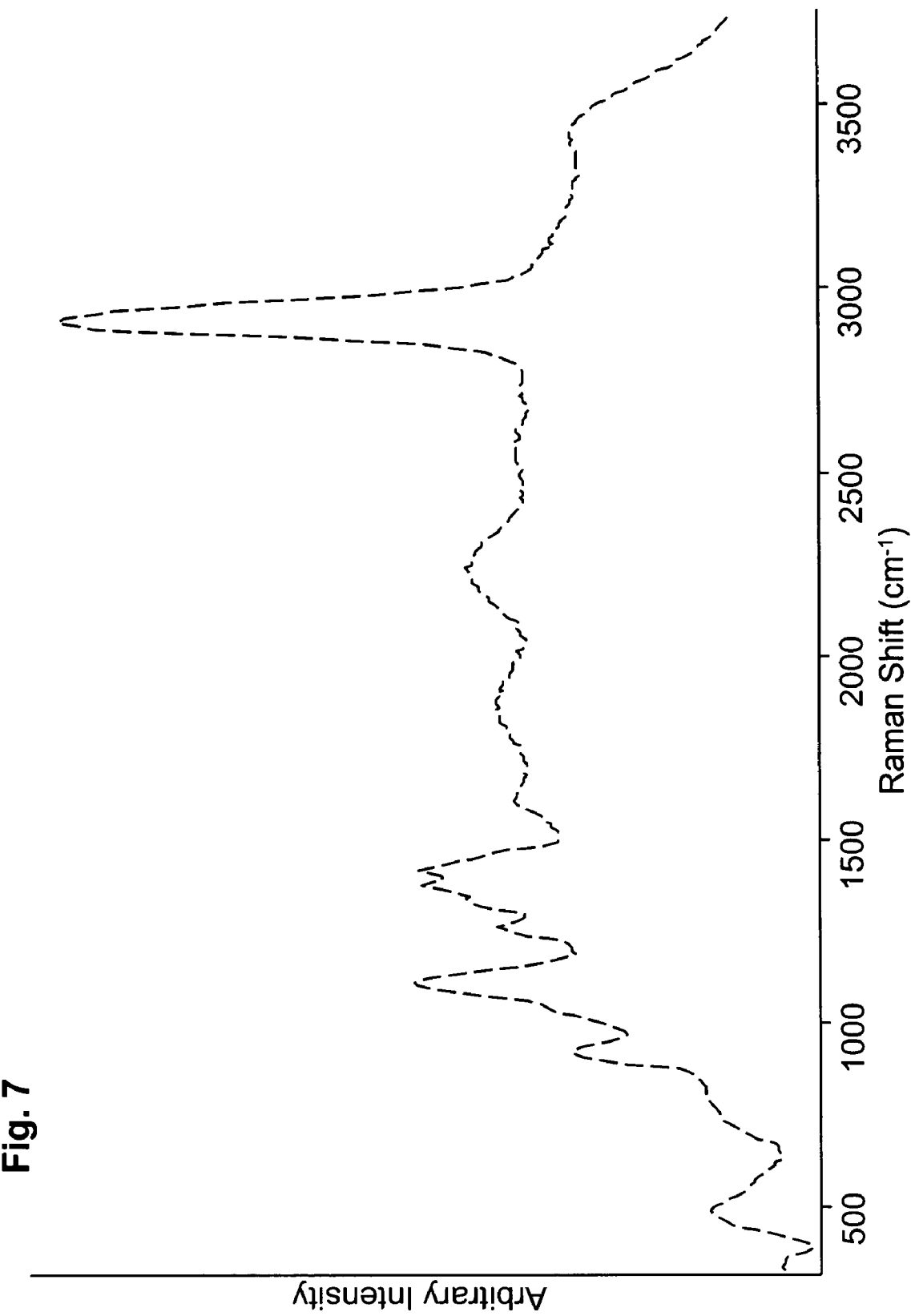
FIG. 7 depicts a dispersive Raman spectrum of carboxymethylcellulose sodium (CMC) generated using the same spectrometer and settings as in FIG. 4.
Figure 8:
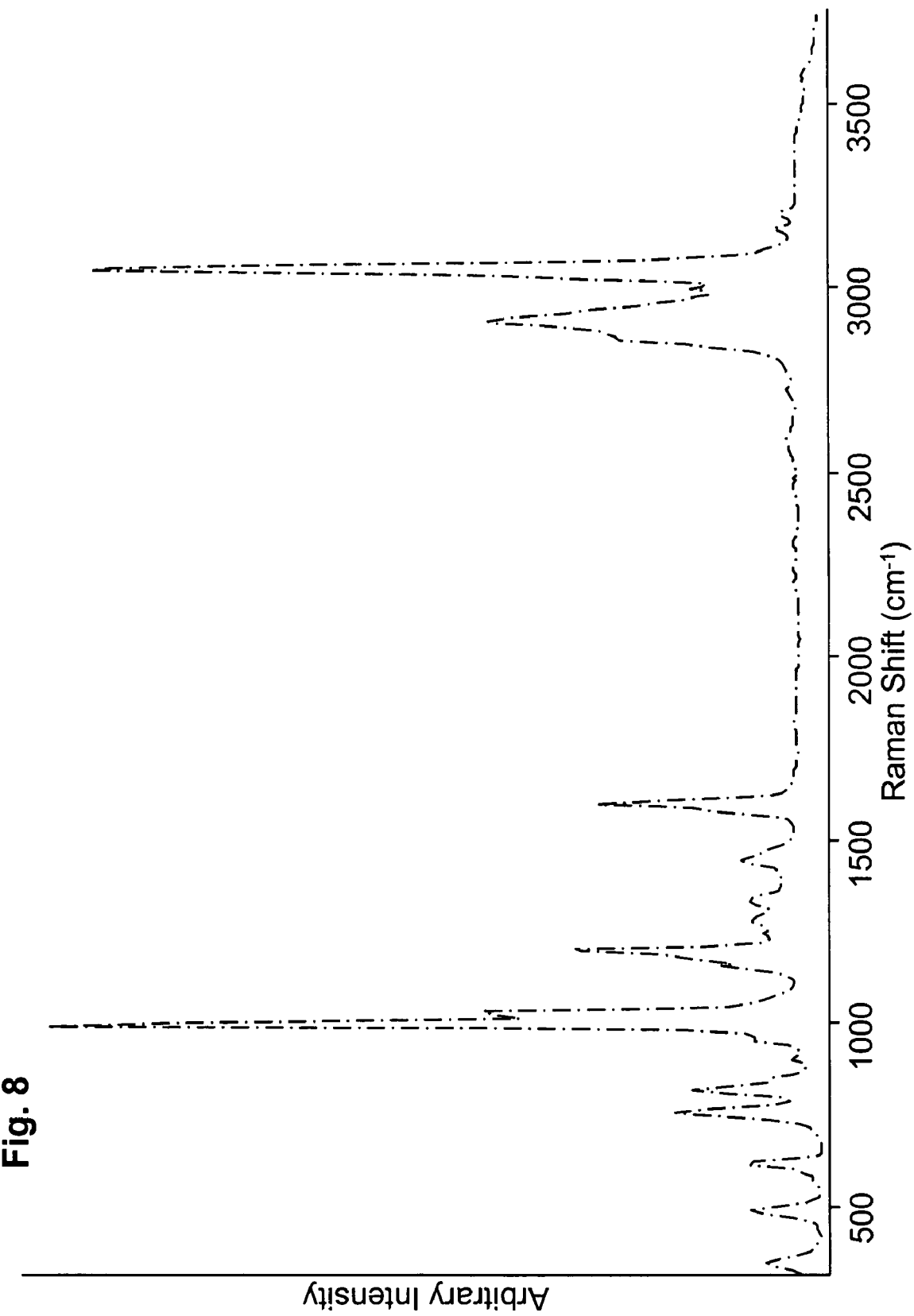
FIG. 8 depicts a dispersive Raman spectrum of phenylethyl alcohol generated using the same spectrometer and settings as in FIG. 4.
Figure 9:
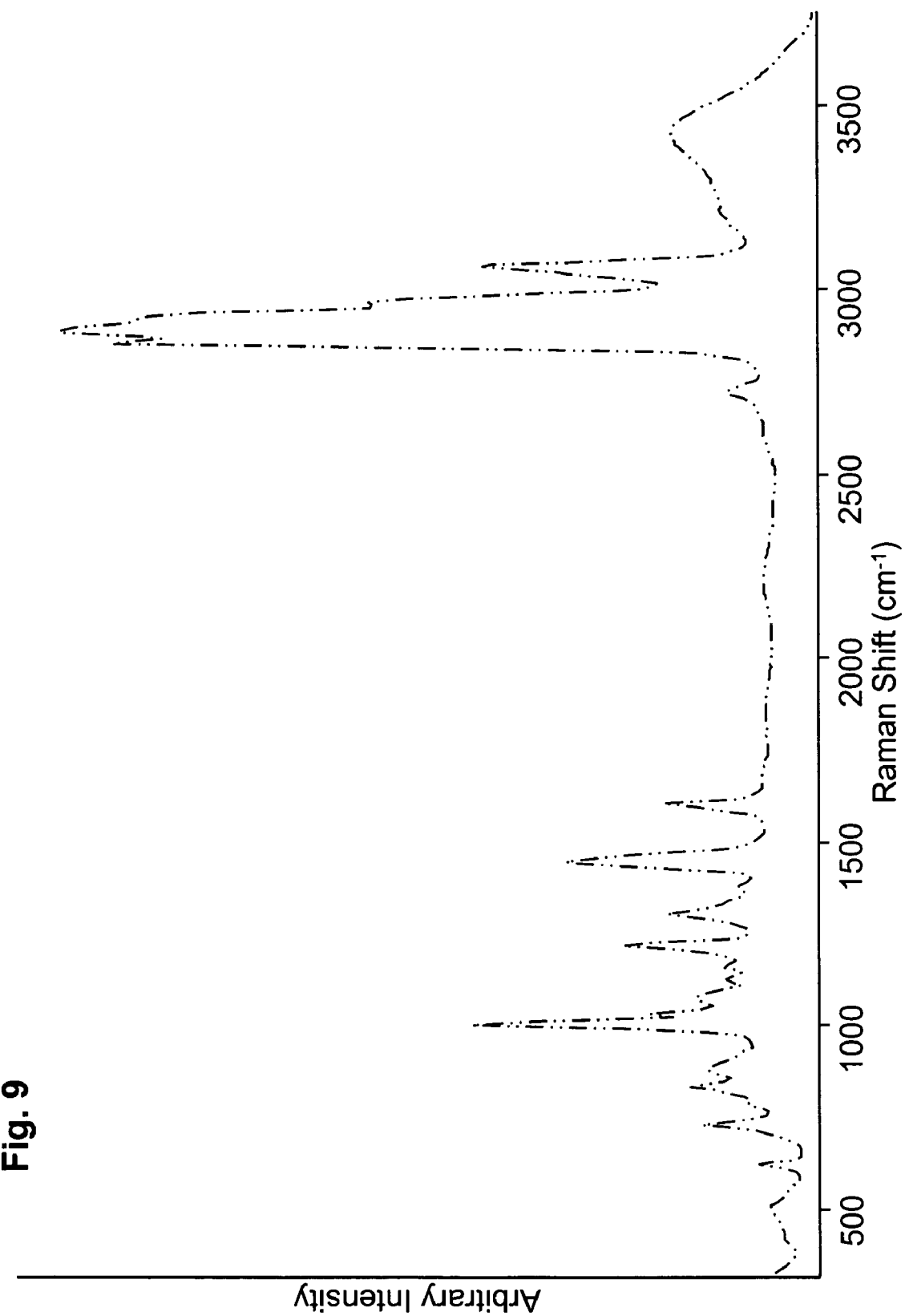
FIG. 9 depicts a dispersive Raman spectrum of benzalkonium chloride generated using the same spectrometer and settings as in FIG. 4.
Figure 10A:
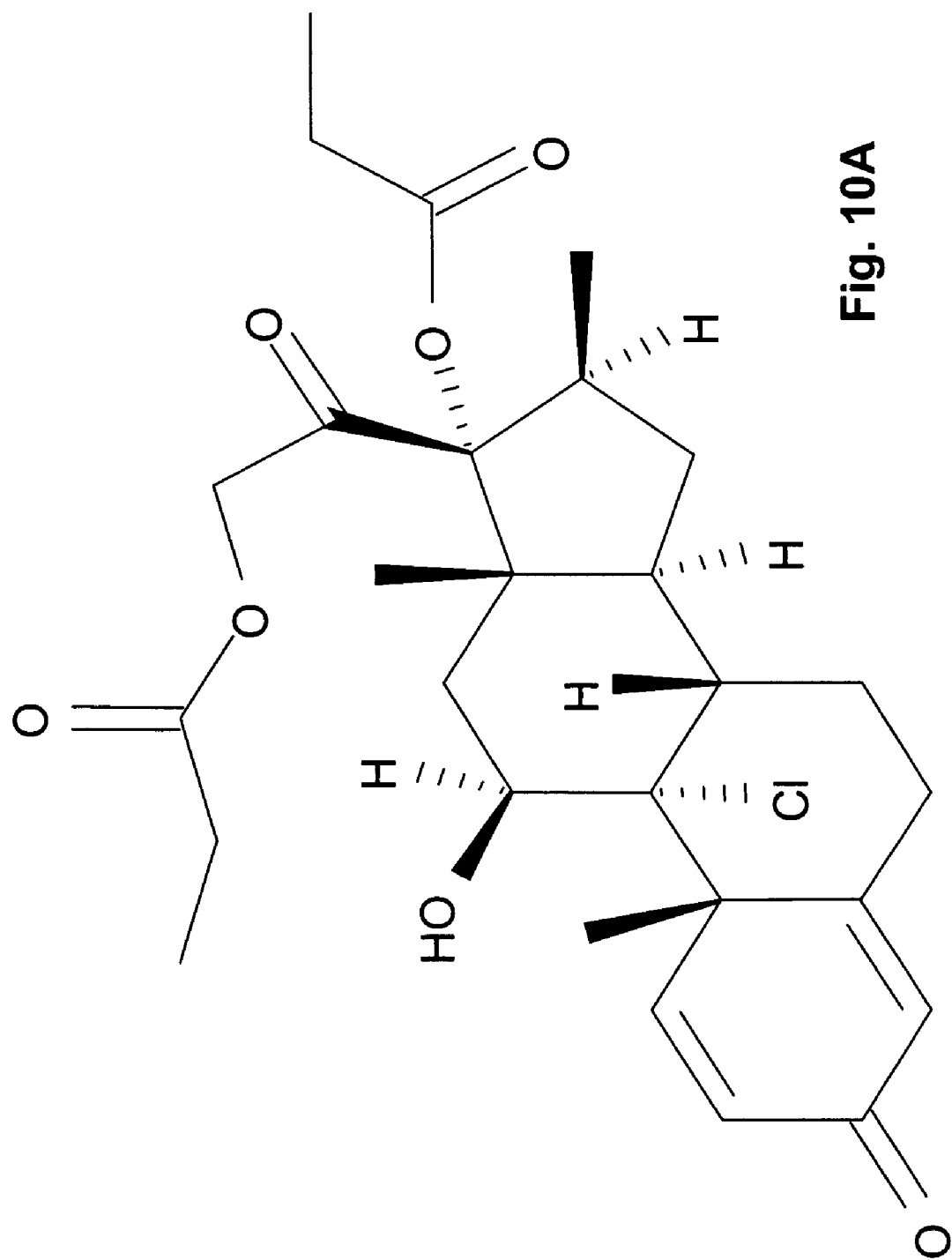
FIG. 10A depicts the chemical structure of beclomethasone dipropionate (BDP).
Figure 10B:
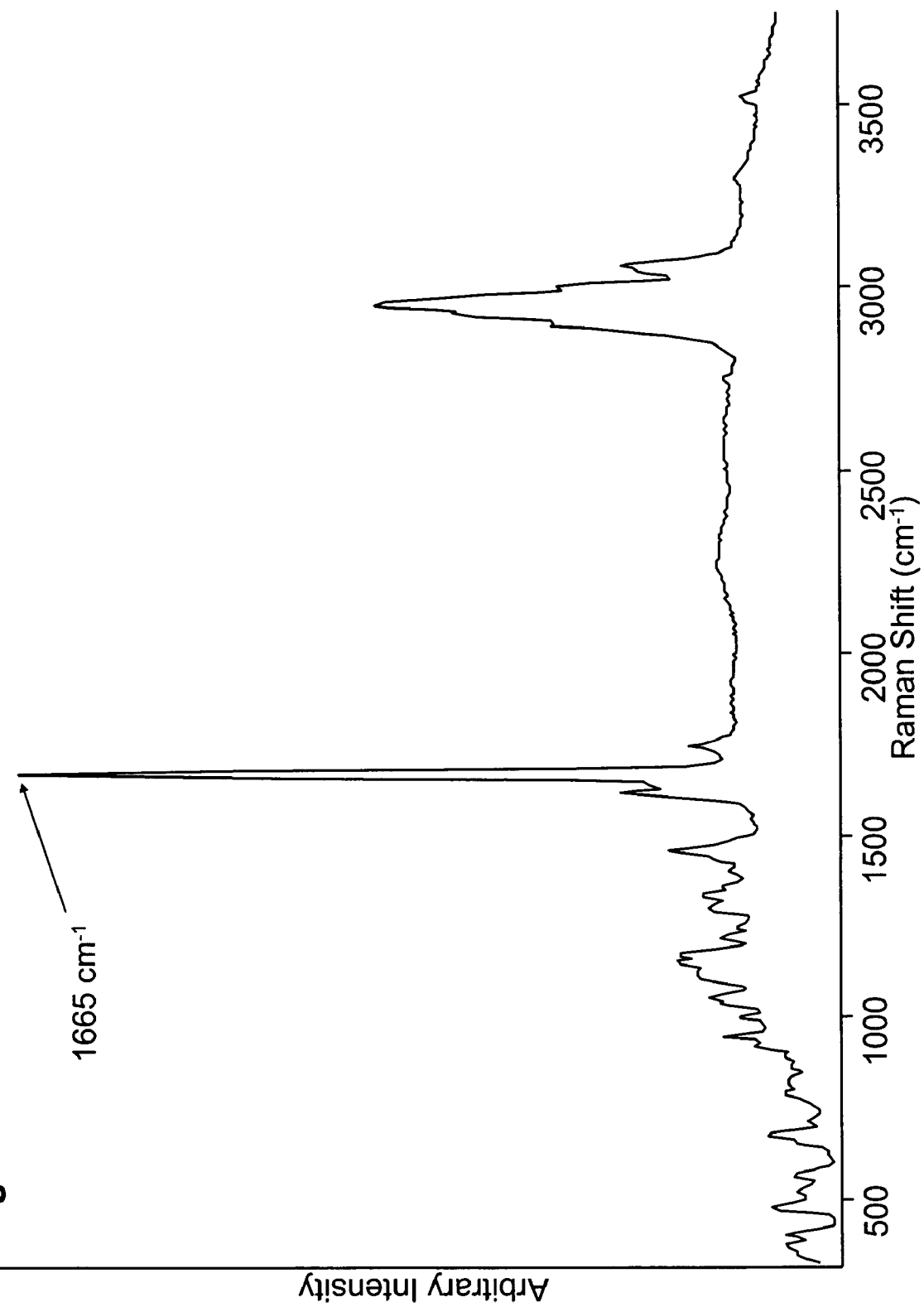
FIG. 10B depicts a dispersive Raman spectrum of BDP generated using the same spectrometer and settings as in FIG. 4.

FIGS. 1 and 2 depict Raman spectra obtained using two batches (designated 1E1 and 3E1) of the nasal spray preparation. The Raman spectra shown in FIG. 1 were obtained after applying the batches to individual slides and assessing the spectra while the preparation remained wet. The spectra in FIG. 2 were obtained after applying the same batches to individual slides and assessing the spectra after the preparation had dried. The improved peak sharpness discernable in the spectra of FIG. 2 is believed to be attributable, at least in part, to the greater immobilization of the components of the dried preparations.

FIG. 3 depicts brightfield and polarized light micrographs (FIGS. 3A and 3B, respectively) and a Raman chemical image (FIG. 3C) of the dried batch 1E1 on a slide. The Raman spectra of regions A, B, and C of FIG. 3C are shown in FIG. 3D and indicate that components of the preparation can be distinguished by their Raman spectral properties.

Figure 11:
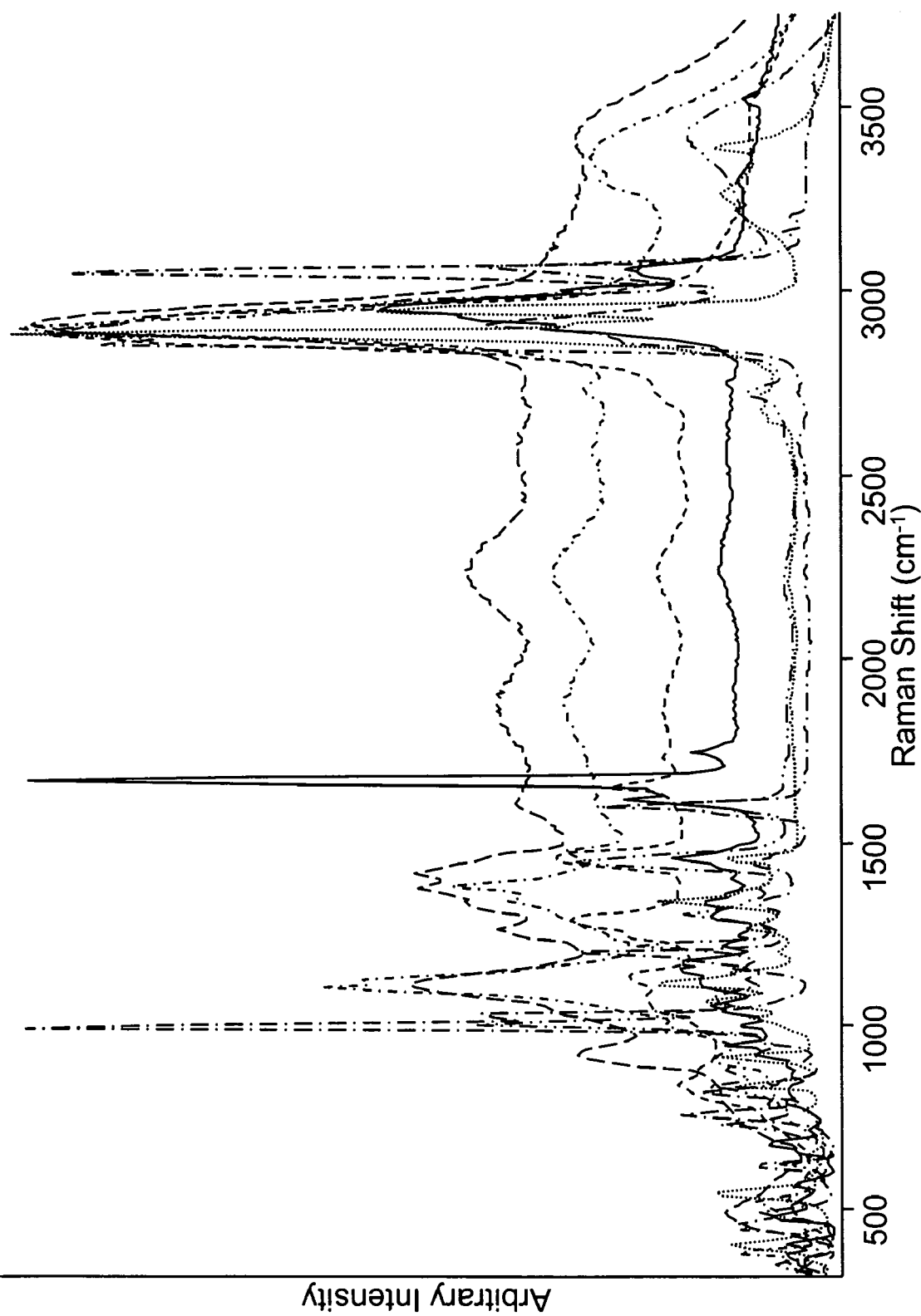
FIG. 11 is the overlaid Raman spectra of FIGS. 4-10, wherein the spectra are indicated with the same line styles as in FIGS. 4-10.

FIGS. 4 through 11 depict Raman spectra obtained for each component of the nasal spray preparation, assessed as individual pure components. In FIG. 11, the Raman spectra of the pure components are overlaid to show that each component has at least one Raman spectral property by which it can be distinguished from the other components of the sample.

Figure 12B:
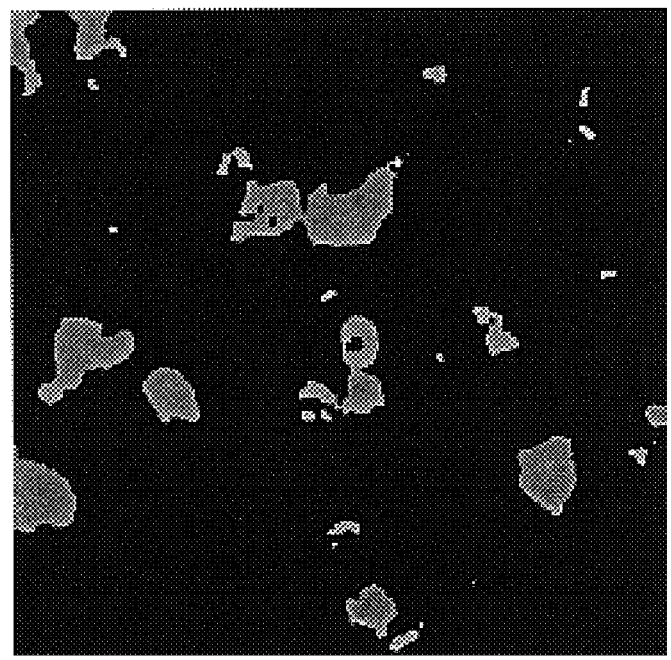
FIG. 12B is a binarized image of FIG. 12A. The PSD chart was prepared by software analysis of the binarized image of FIG. 12B.
Figure 12A:
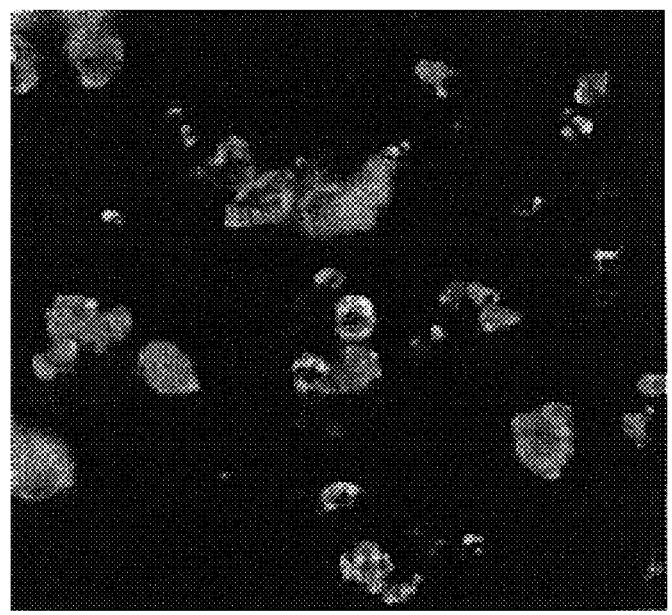
FIG. 12A depicts a polarized light micrograph of BDP.
Figure 13B:
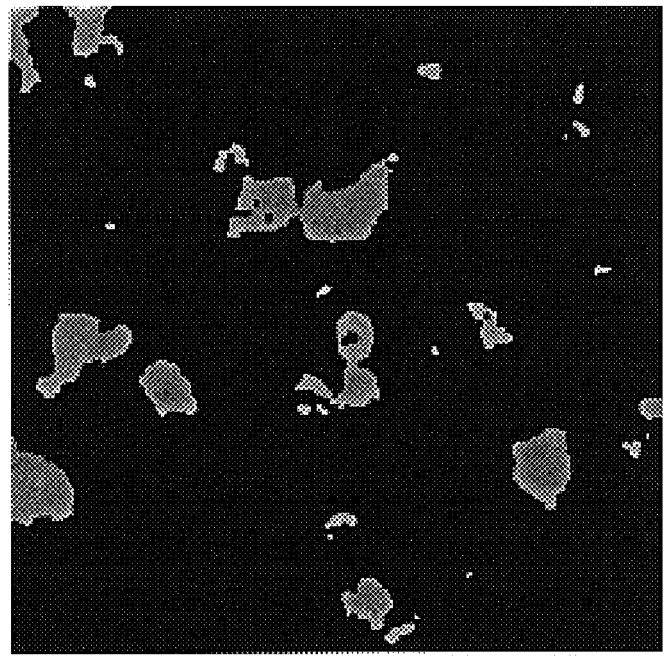
FIGS. 13A and 13B are replicas of FIGS. 12A and 12B. The graph was prepared by software analysis of the binarized image of FIG. 13B.
Figure 13A:
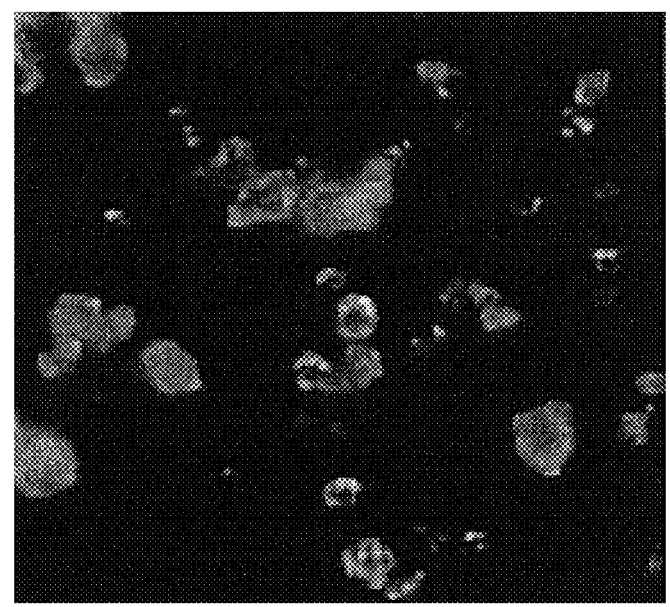
Figure 13C:
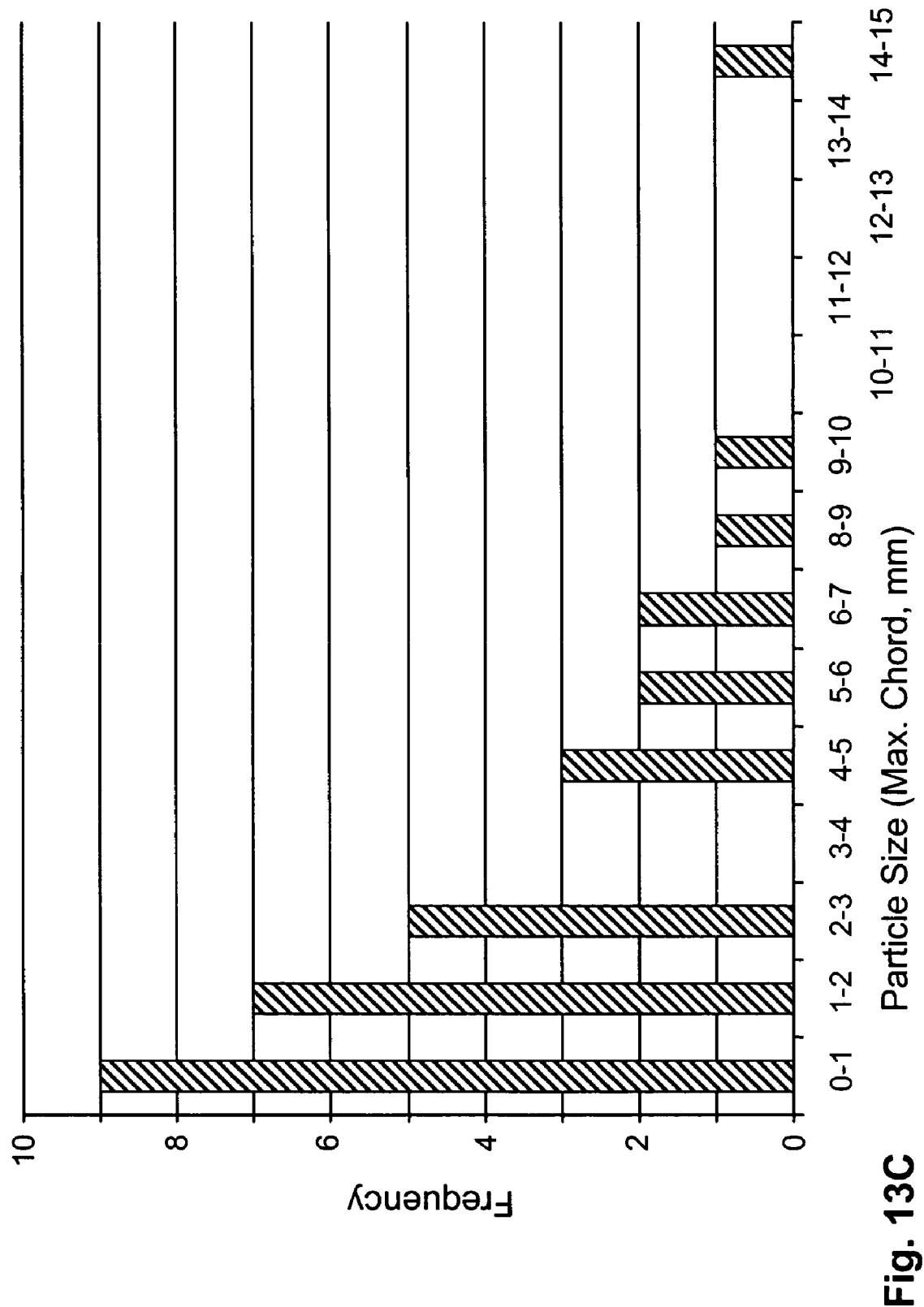
FIG. 13 consists of FIG. 13A, FIG. 13B and a particle maximum chord length distribution graph (FIG. 13C).
Figure 14B:
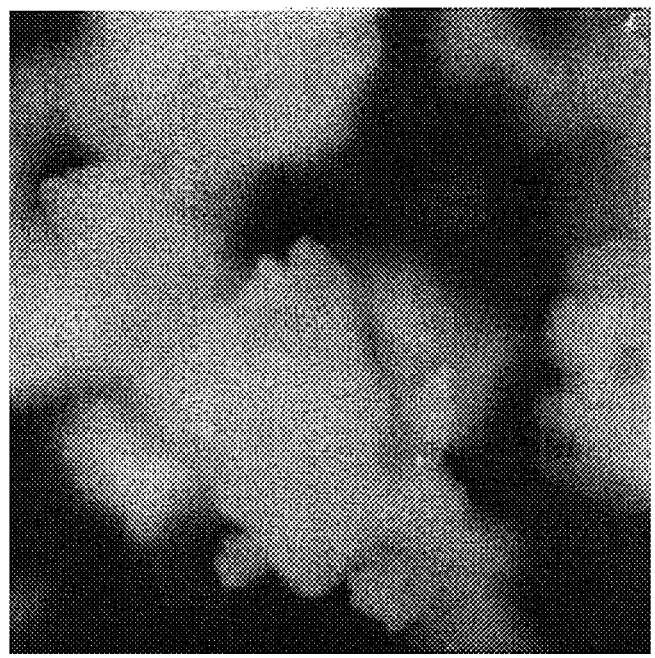
FIGS. 14A and 14B are brightfield reflectance and polarized light micrographs, respectively.
Figure 14A:
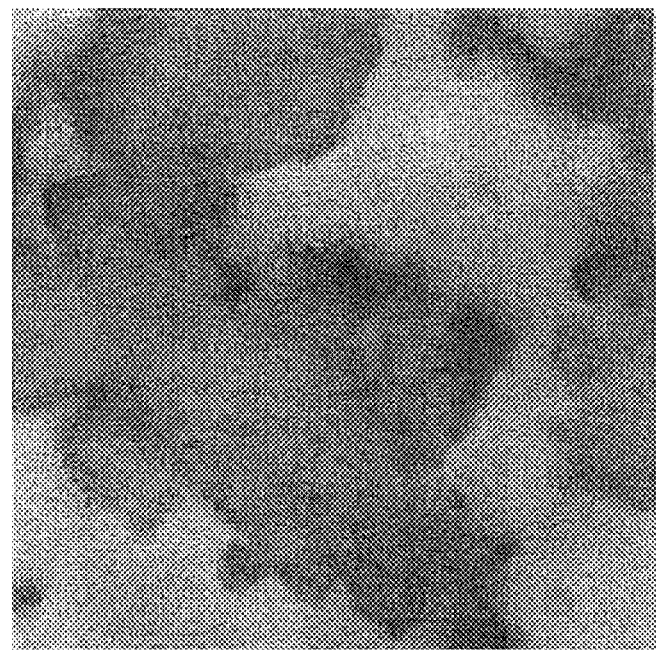
Figure 14C:
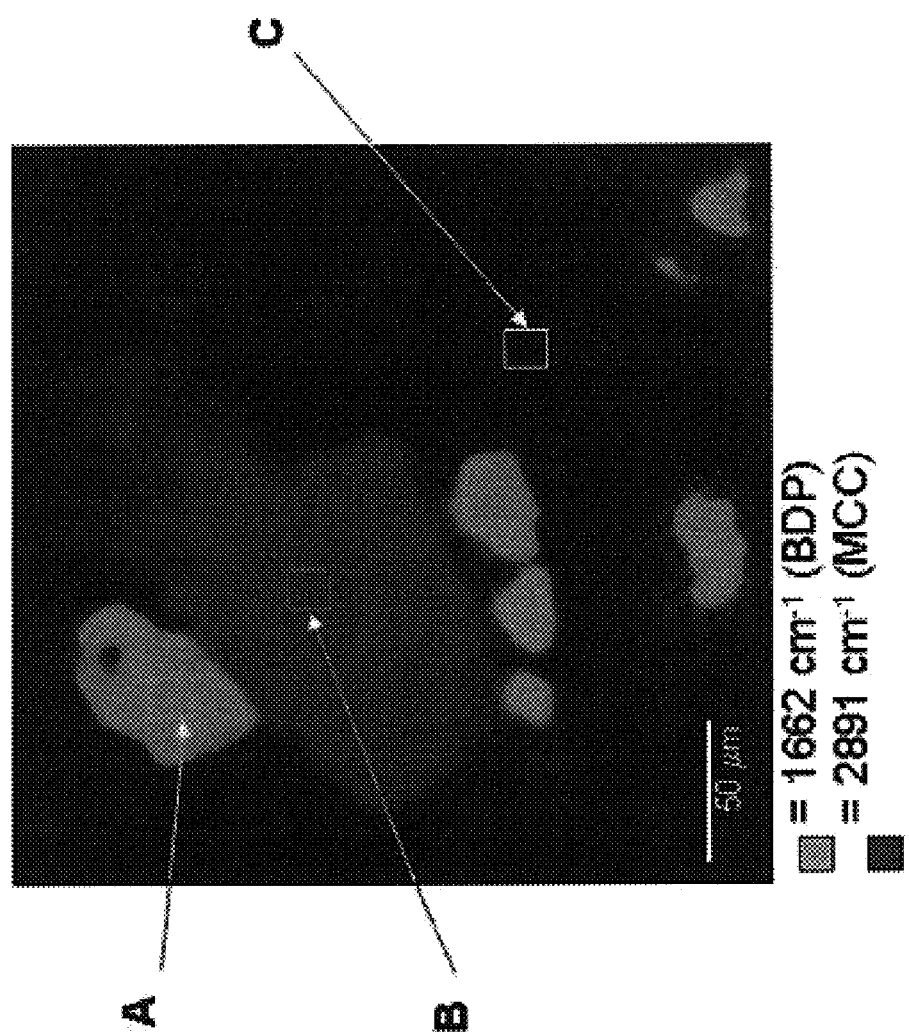
FIG. 14C is a color Raman chemical image of the mixture, in which areas A (corresponding to BDP), B (corresponding to MCC), and C (corresponding to the background) are indicated.
Figure 14D:
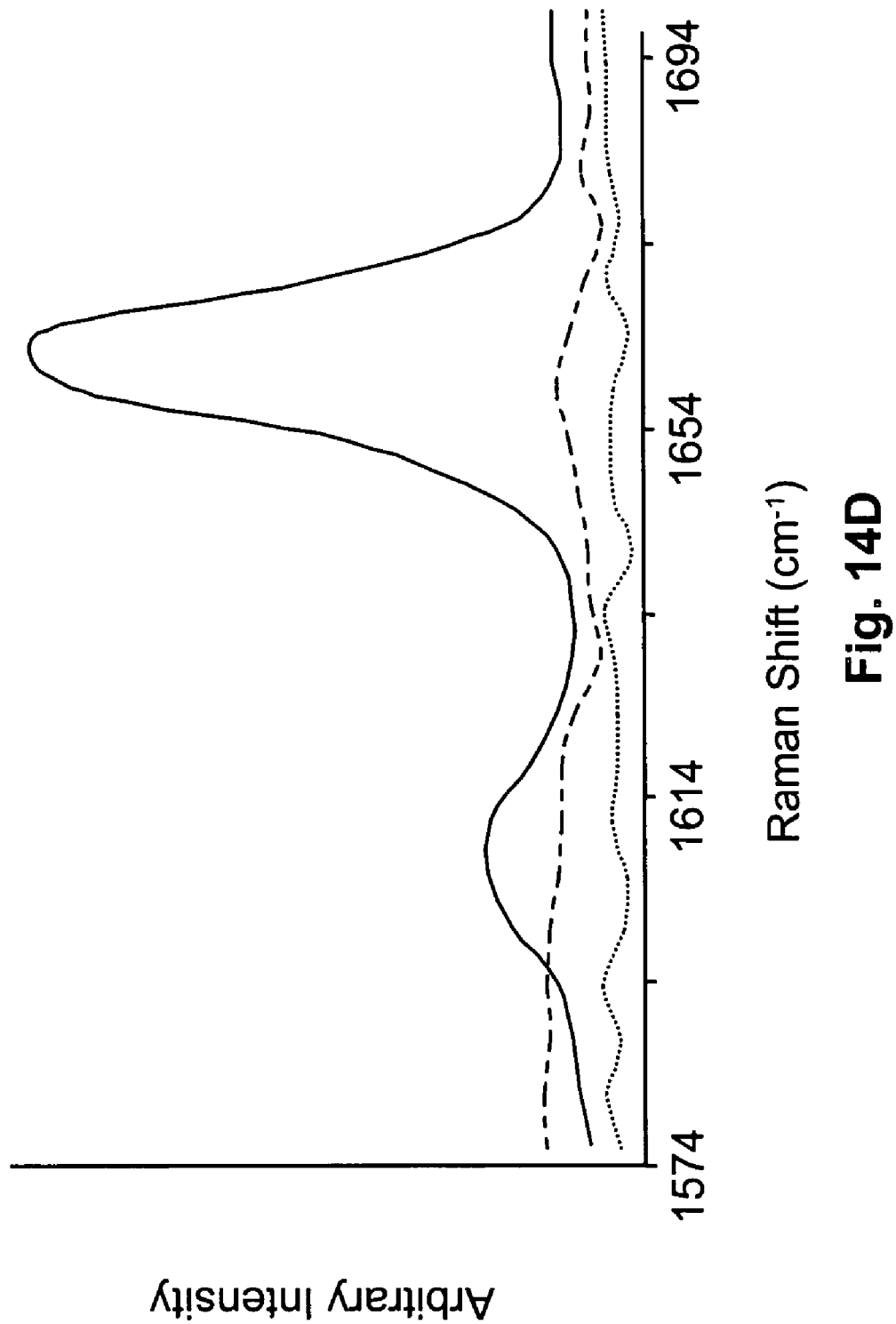

FIGS. 12 and 13 depict a polarized light micrograph and a corresponding binarized image of micronized BDP and geometric properties calculated for 31 particles calculated from the binarized image using a commercial software package. The mean BDP particle size was determined to be 3.02±3.16 micrometers in diameter. The PSD is shown graphically in FIG. 13.

FIGS. 14 through 16 relate to experiments performed with a blend of micronized BDP and MCC in the dry state. The sample was prepared by placing a mixture of BDP and MCC (approximately 20:80 BDP:MCC by volume) on a glass microscope slide. It is expected that the crude nature of the sample preparation resulted in formation of relatively large aggregates of BDP and MCC.

FIG. 14 depicts brightfield reflectance image and polarized light images (FIGS. 14A and 14B, respectively) and a composite Raman chemical image (FIG. 14C) of the BDP/MCC mixture. The polarized light image reveals the birefringent nature of both components in the mixture. The channels of the composite Raman chemical image corresponding to BDP (1 in FIGS. 14C through 14E) and MCC (2 in FIGS. 14C through 14E) are indicated. These results indicate that BDP and MCC domains and background areas (3 in FIGS. 14C through 14E) exhibit characteristic Raman spectral signatures.

Figure 15B:
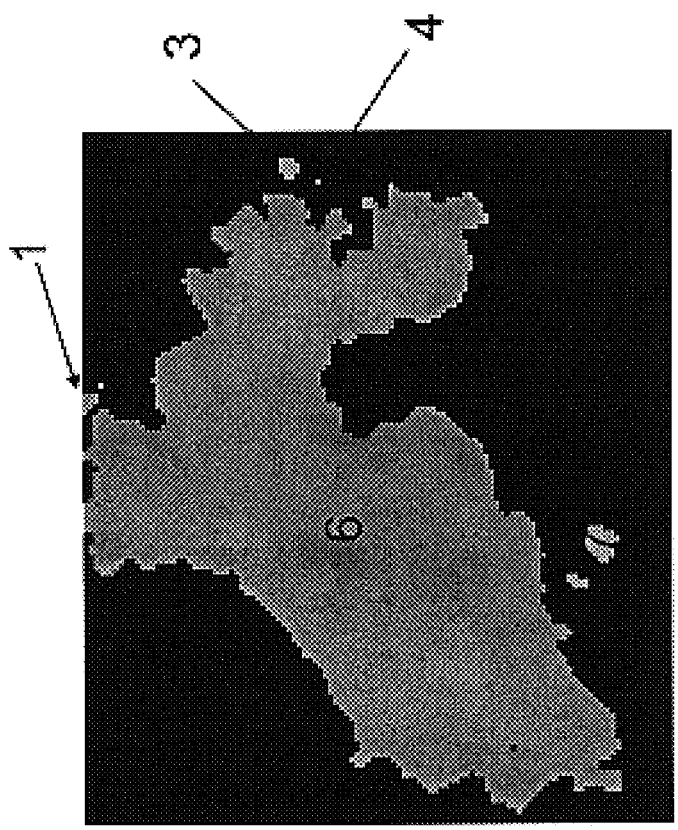
FIG. 15B is a binarized image of FIG. 15A. The data in the PSD table were prepared by software analysis of the binarized image of FIG. 15B.
Figure 15A:
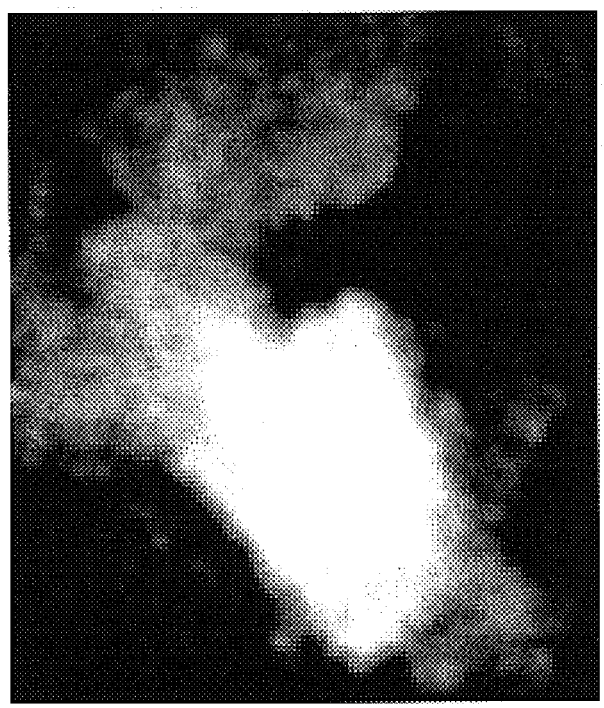
FIG. 15A is a grayscale Raman chemical image assessed at a Raman shift value characteristic of MCC.

FIG. 15 shows a grayscale Raman image (FIG. 15A), a binary image (FIG. 15B) and PSD table associated with the MCC aggregates in the field of view. Due to the large aggregate in the field of view surrounded by several, much smaller aggregates, the average MCC "particle" (more likely an agglomerate) size was 33.91±71.45 micrometers.

Figure 16B:
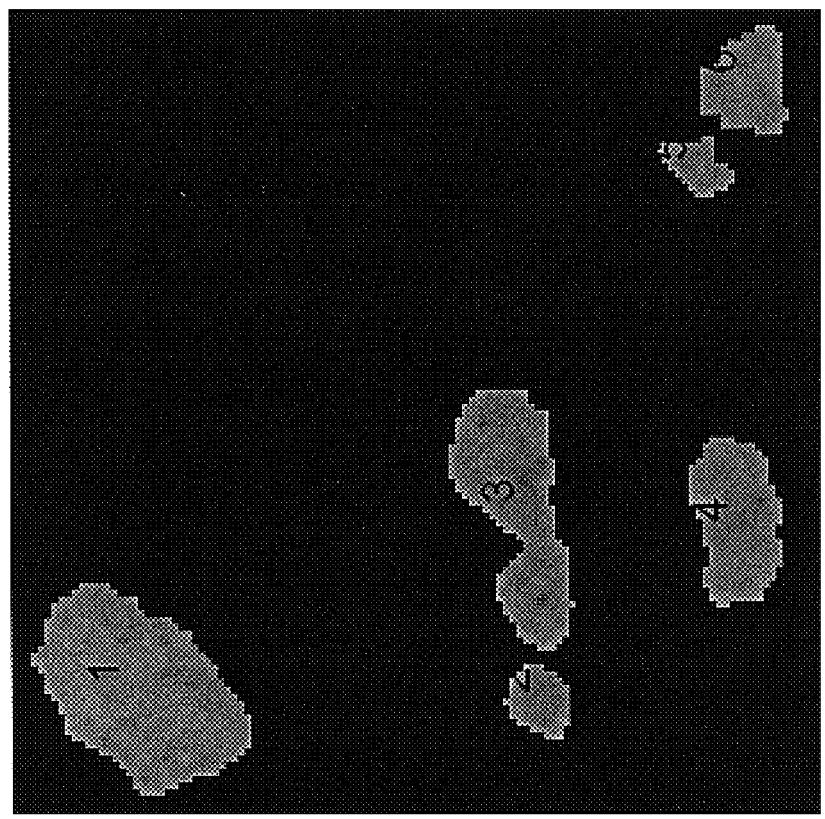
FIG. 16B is a binarized image of FIG. 16A. The data in the PSD table were prepared by software analysis of the binarized image of FIG. 16B.
Figure 16A:
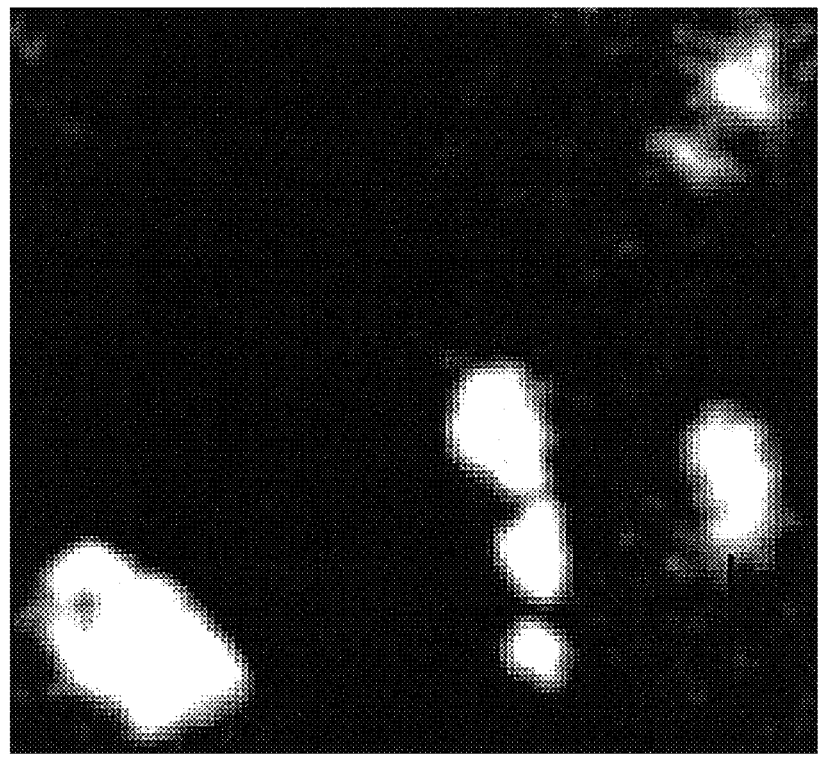
FIG. 16A is a grayscale Raman chemical image assessed at a Raman shift value characteristic of BDP.
Figure 17B:
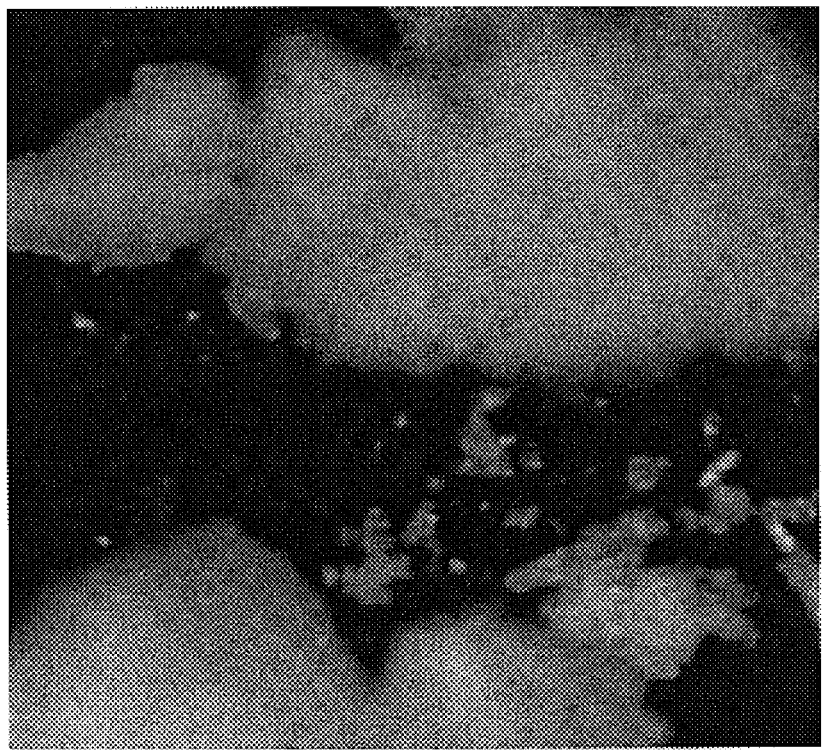
FIGS. 17A and 17B are brightfield reflectance and polarized light micrographs, respectively.
Figure 17A:
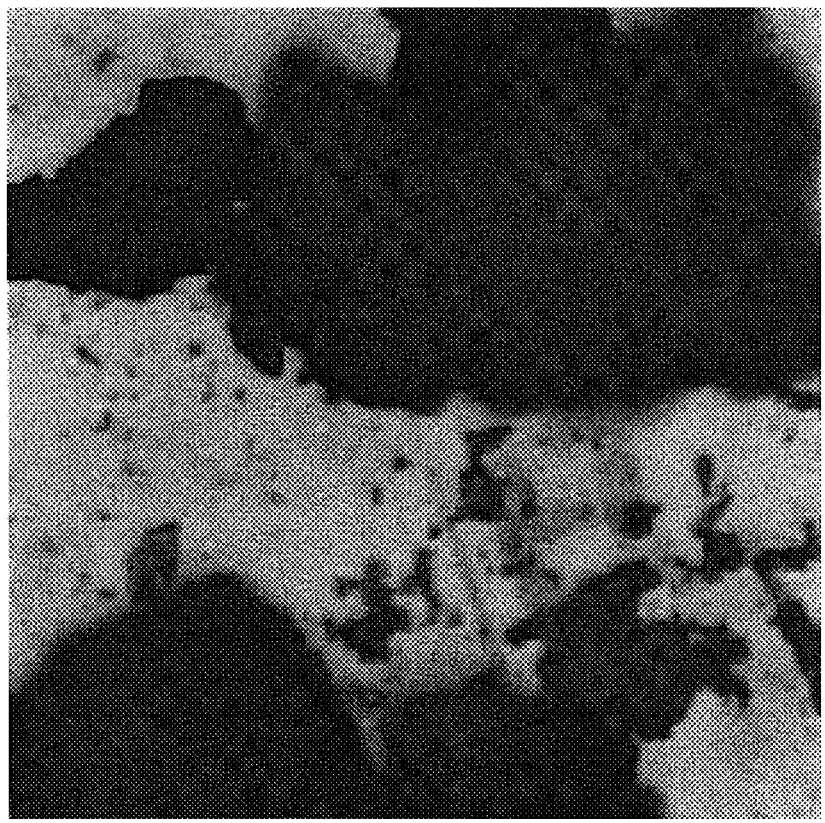
Figure 17D:
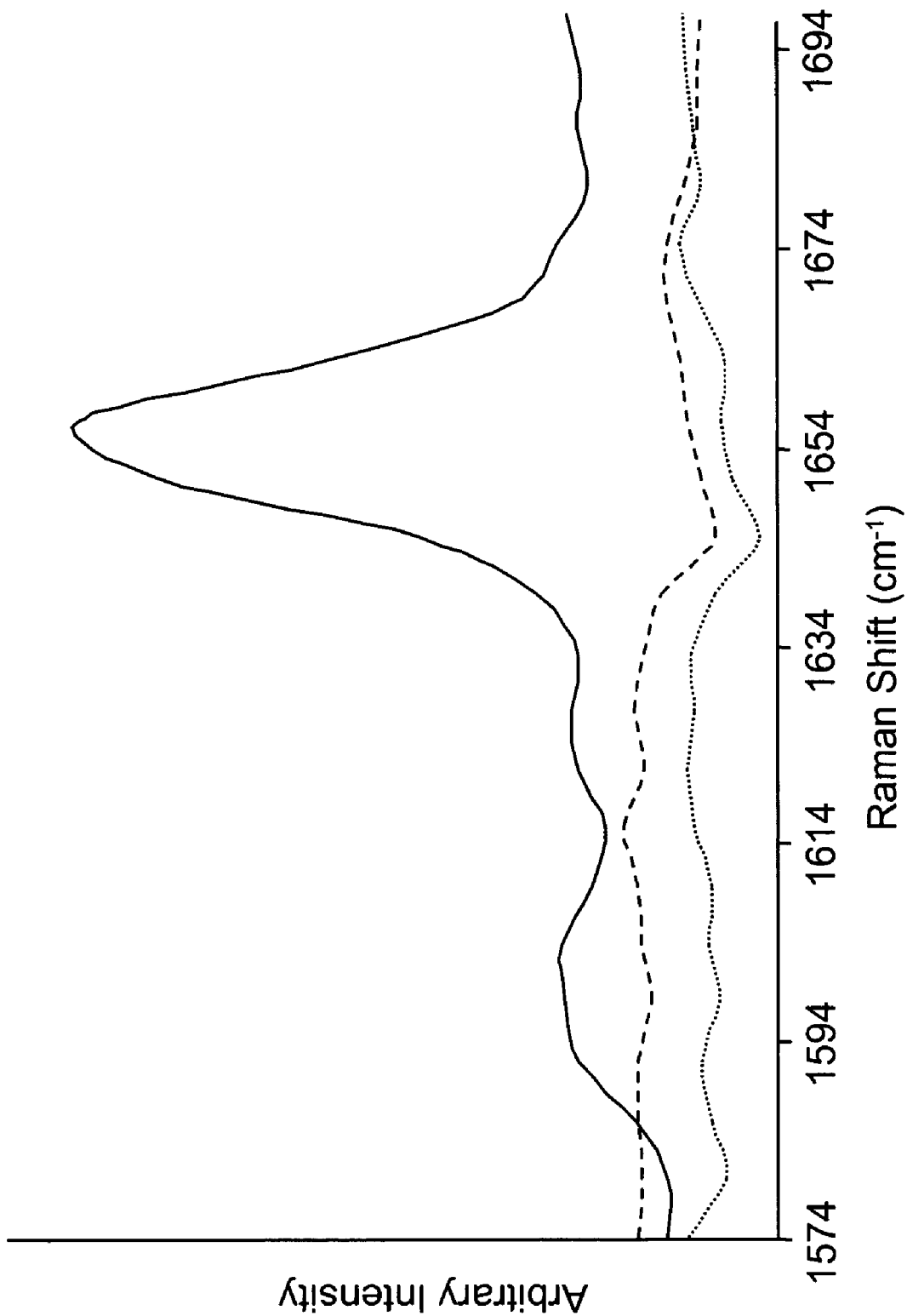
FIGS. 17D and 17E are Raman spectra obtained by Raman scattering analysis of regions A (solid line), B (dashed line), and C (dotted line) of FIG. 17C.
Figure 17E:
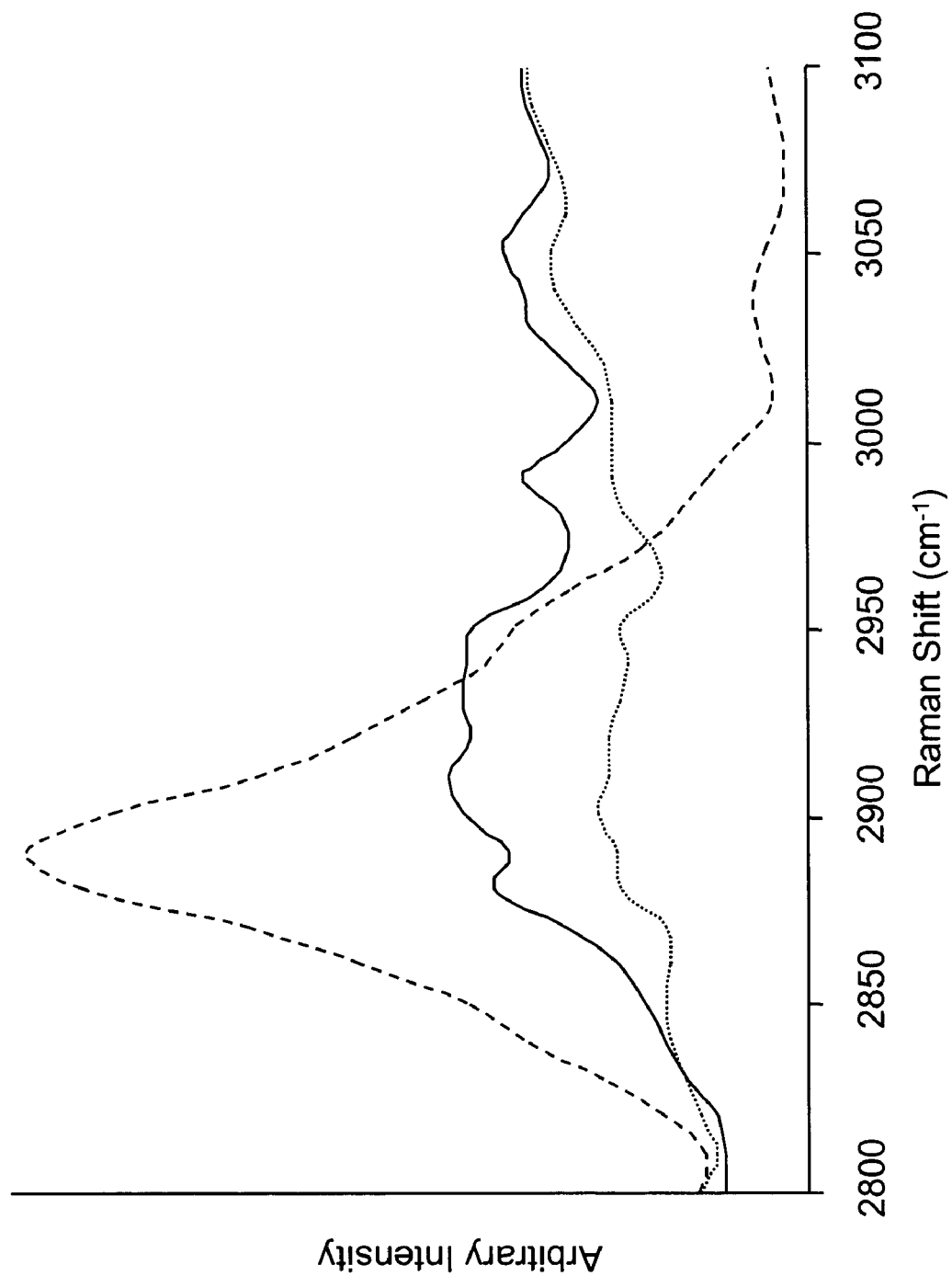

FIG. 16 shows a grayscale Raman image (FIG. 16A), a binary image (FIG. 16B) and a PSD table associated with the BDP aggregates in the field of view. The average BDP "particle" (more likely an agglomerate) size was determined to be 36.99±19.27 micrometers. These results illustrate the ability of the technology to differentiate and identify a drug substance from excipients and the utility of the software to assess particle size of individual domains that exist in the field of view.

FIGS. 17 through 19 demonstrate the ability of these methods to identify drug substance and determine particle size and PSD of drug substance in a blend of micronized BDP and MCC following the addition of water. A small aliquot (approximately 10 microliters) of distilled water was introduced into the dry BDP/MCC mixture used in the experiments corresponding to FIGS. 14 through 16 using a microsyringe manually guided while viewing through the FALCON Microscope with the CCD video camera. Manually controlling delivery of the water to the sample on a microscope scale was challenging. The addition of water caused particles to move out of the field of view while new ones moved into the field of view, which made it difficult to make an accurate comparison of particle statistics before and after the addition of water.

FIG. 17 shows a brightfield reflectance image (FIG. 17A), a polarized light image (FIG. 17B), and a composite Raman chemical image (FIG. 17C) of the BDP/MCC mixture following addition of water. The green and blue color channels of the composite Raman chemical image have been color-coded for BDP and MCC, respectively. The channels of the composite Raman chemical image corresponding to BDP (1 in FIGS. 17C through 17E) and MCC (2 in FIGS. 17C through 17E) are indicated. These results indicate that BDP and MCC domains and background areas (3 in FIGS. 17C through 17E) exhibit characteristic Raman spectral signatures.

Figure 18B:
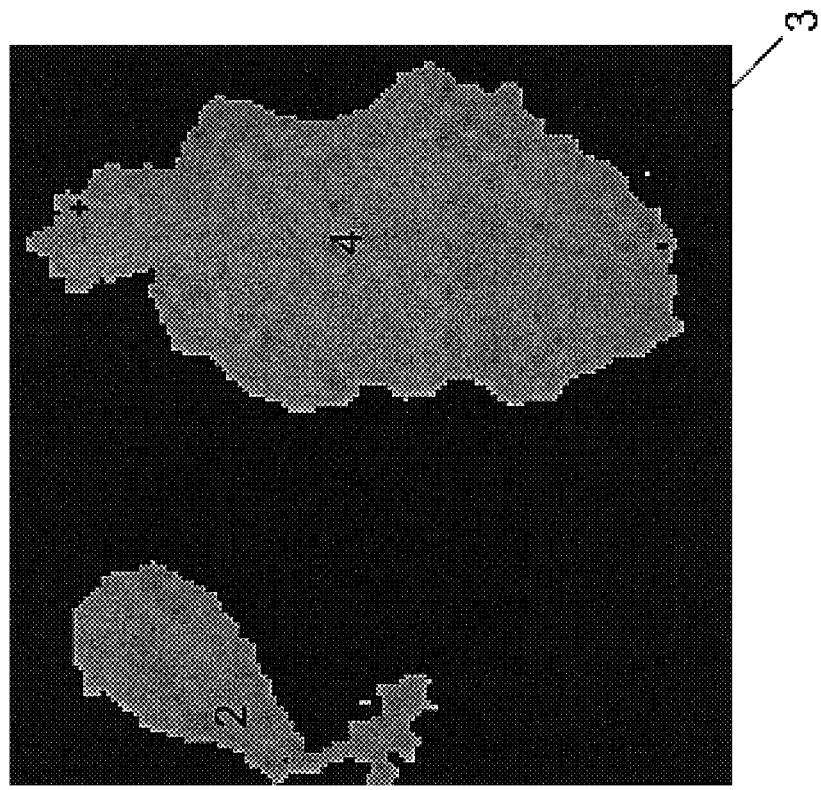
FIG. 18B is a binarized image of FIG. 18A. The data in the PSD table were prepared by software analysis of the binarized image of FIG. 18.
Figure 18A:
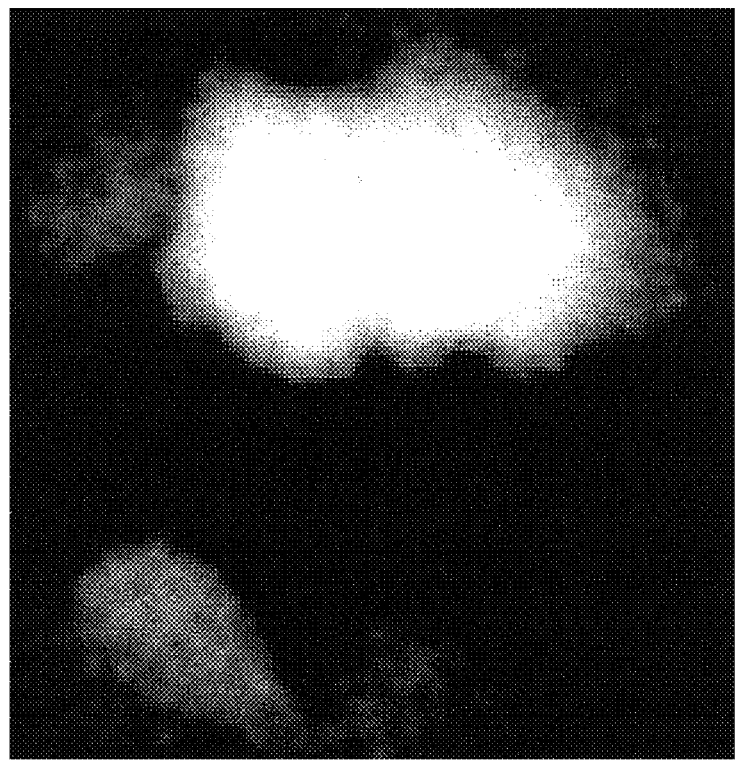
FIG. 18A is a grayscale Raman chemical image assessed at a Raman shift value characteristic of MCC following addition of water.

FIG. 18 shows a grayscale Raman image (FIG. 18A), a binary image (FIG. 18B) and PSD table associated with the MCC aggregates in the field of view following addition of water. Due to the large aggregate in the field of view surrounded by several, much smaller aggregates, the average MCC "particle" (more likely an agglomerate) size was 48.75±57.57 micrometers in diameter.

Figure 19B:
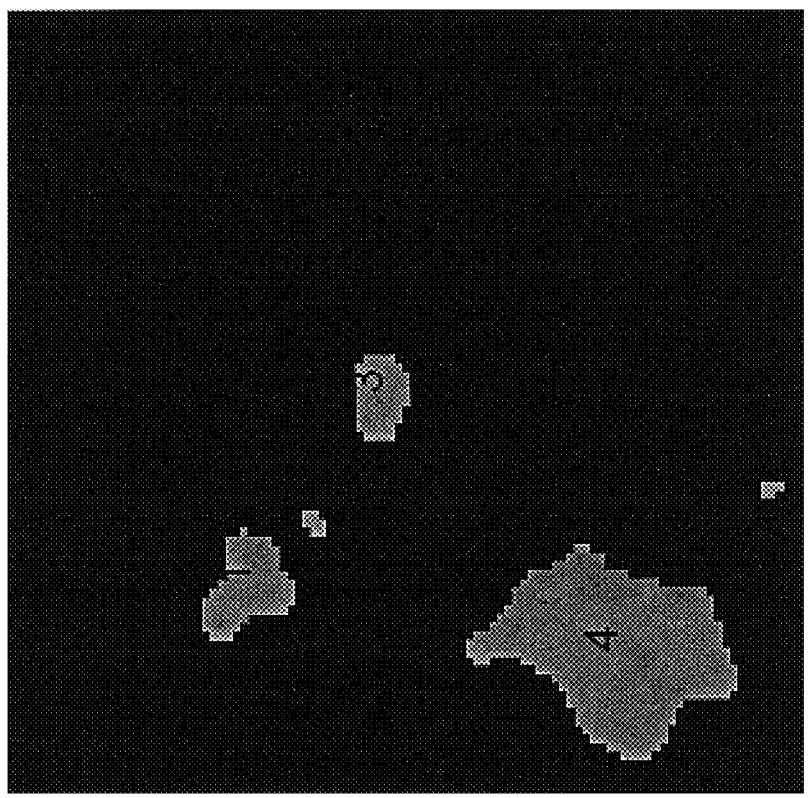
FIG. 19B is a binarized image of FIG. 19A. The data in the PSD table were prepared by software analysis of the binarized image of FIG. 19B.
Figure 19A:
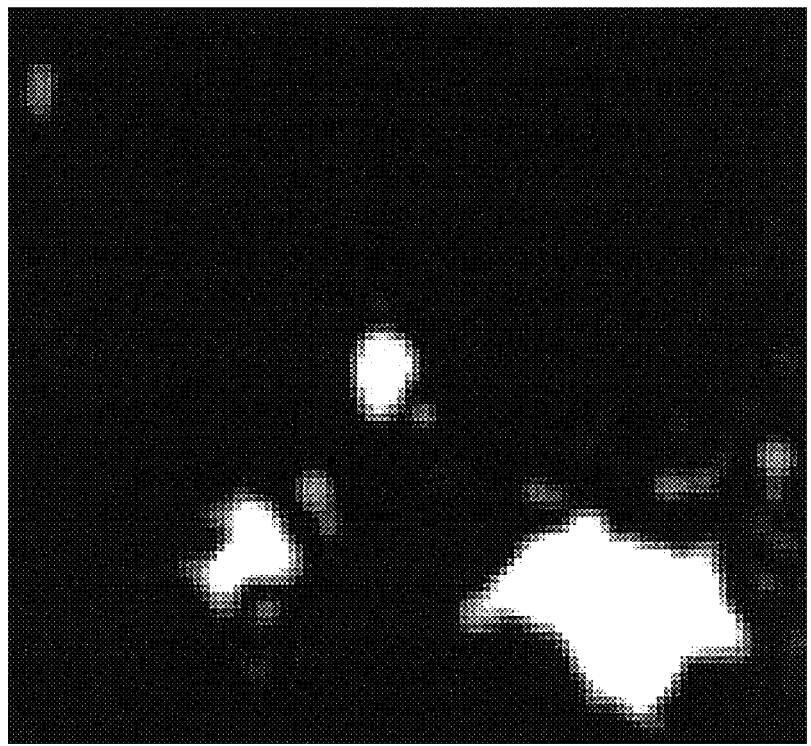
FIG. 19A is a grayscale Raman chemical image assessed at a Raman shift value characteristic of BDP following addition of water.

FIG. 19 shows a grayscale Raman image (FIG. 19A), a binary image (FIG. 19B) and PSD table associated with the BDP aggregates in the field of view. The average BDP "particle" (more likely an agglomerate) size was determined to be 13.80±14.25 micrometers in diameter.

Figure 20B:
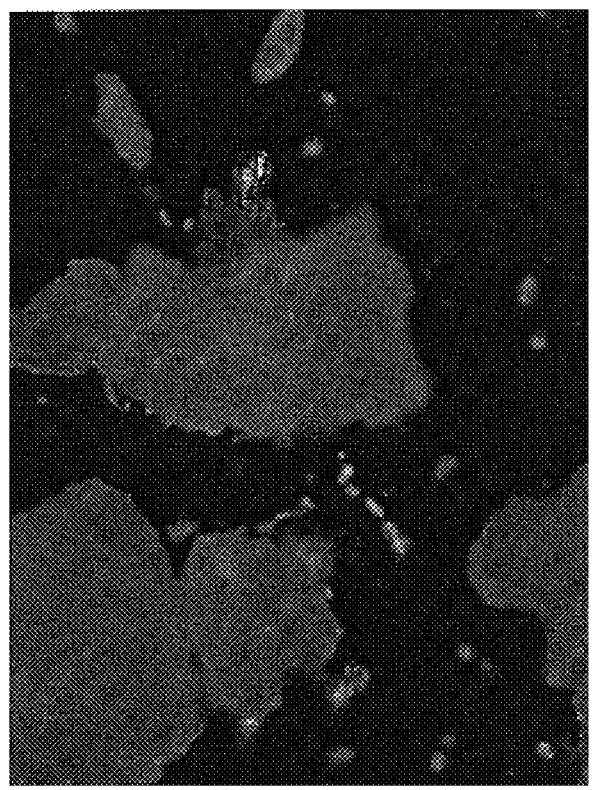
FIGS. 20A and 20B depicts a pair of polarized light micrographs of the MCC/BDP blend prior to the addition of water (FIG. 20A) and following addition of water (FIG. 20B).
Figure 20A:
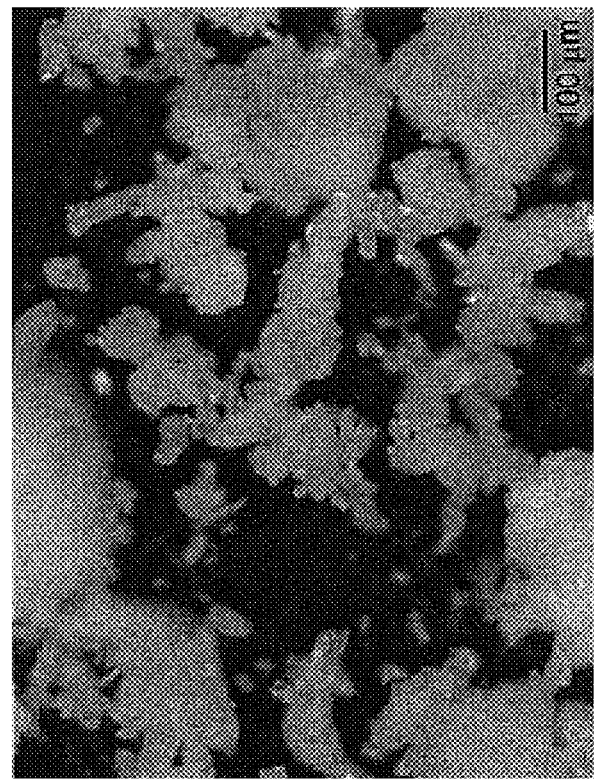
Figure 21B:
FIGS. 21A and 21B depict brightfield reflectance and polarized light micrographs, respectively.
Figure 21C:
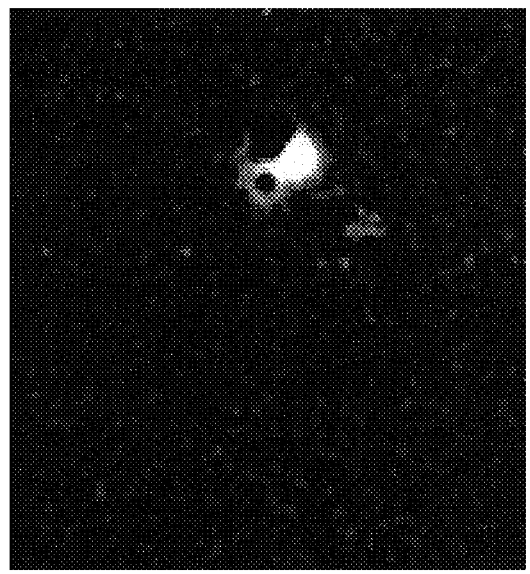
FIG. 21C is a Raman chemical image of the sample assessed at a Raman shift value characteristic of BDP.
Figure 21A:
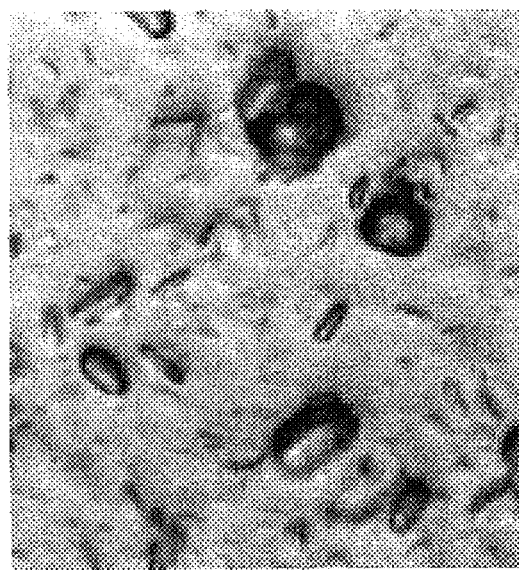
Figure 21D:
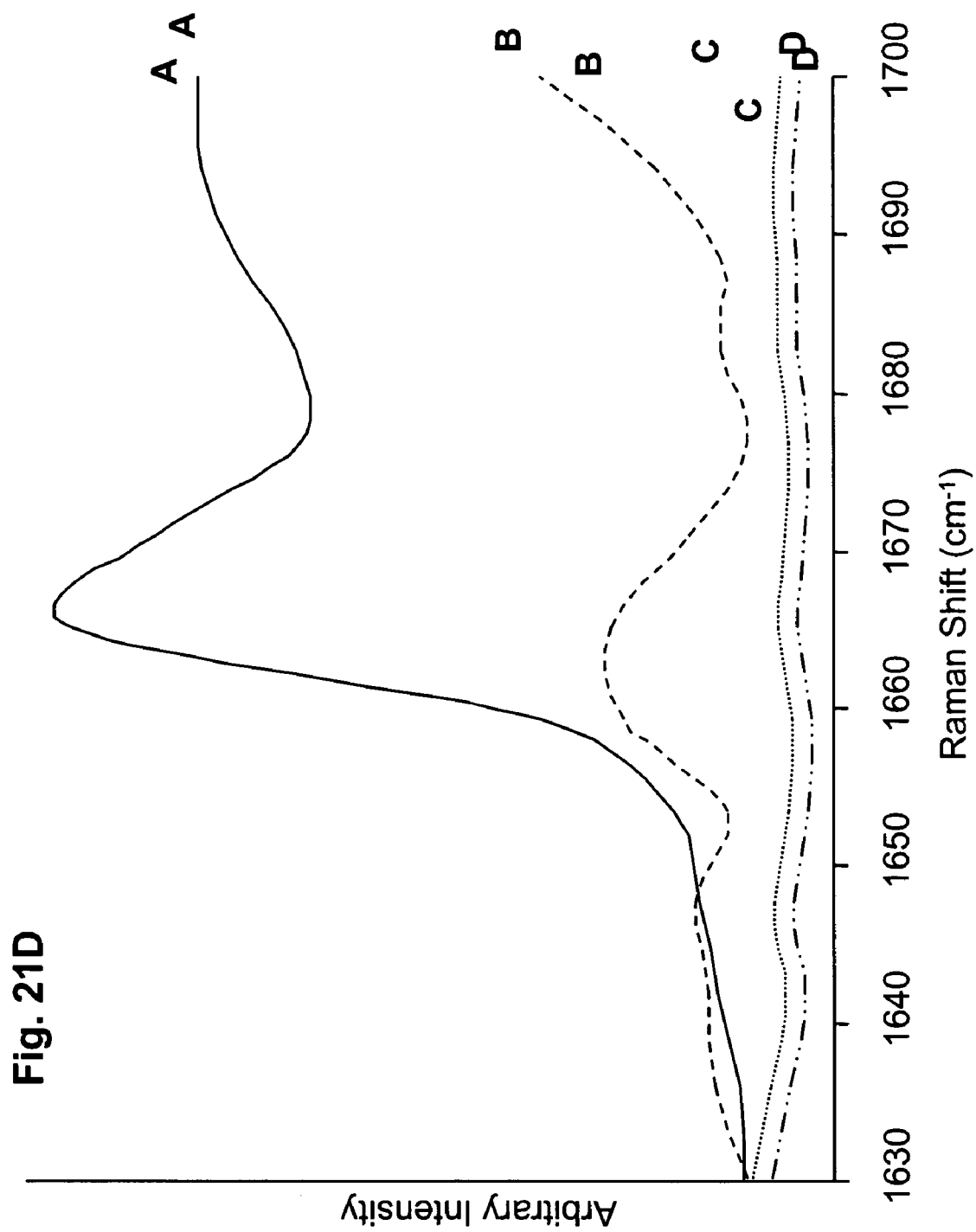
FIG. 21D depicts Raman spectra assessed in several boxed regions of FIG. 21B, including region A, corresponding to BECONASE AQ™.
Figure 21E:
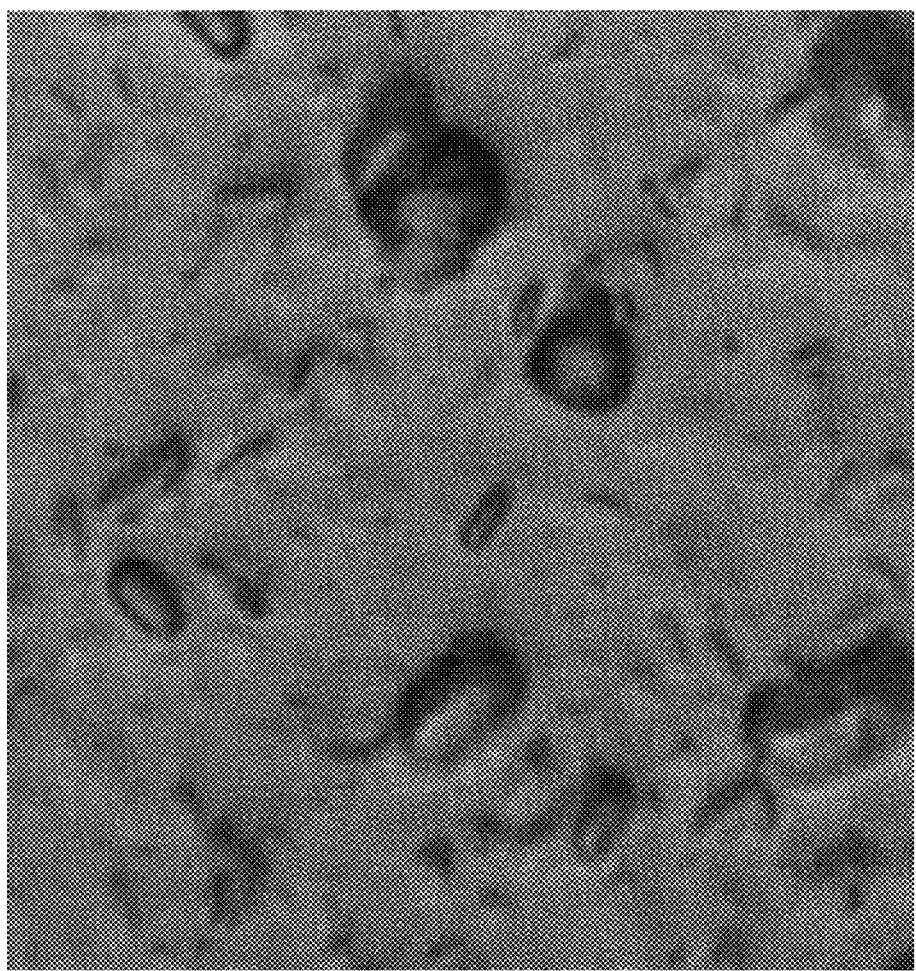
FIG. 21E depicts FIGS. 21A and 21C overlaid.
Figure 22B:
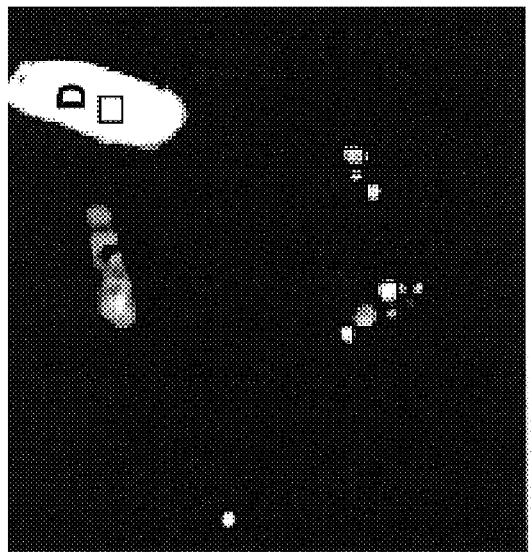
FIGS. 22A and 22B depict brightfield reflectance and polarized light micrographs, respectively.
Figure 22C:
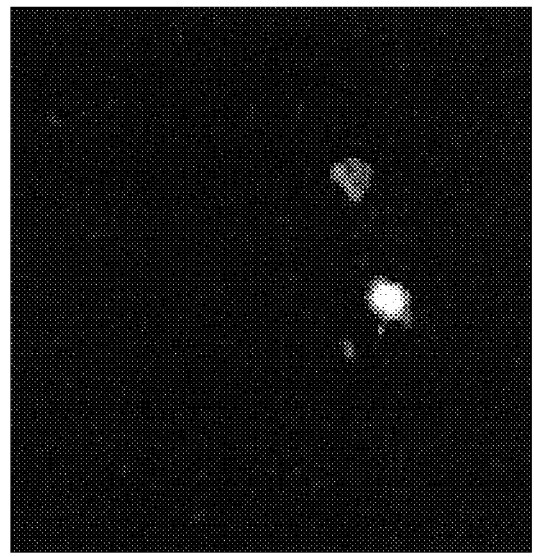
FIG. 22C is a Raman chemical image of the sample assessed at a Raman shift value characteristic of BDP.
Figure 22A:
Figure 22D:
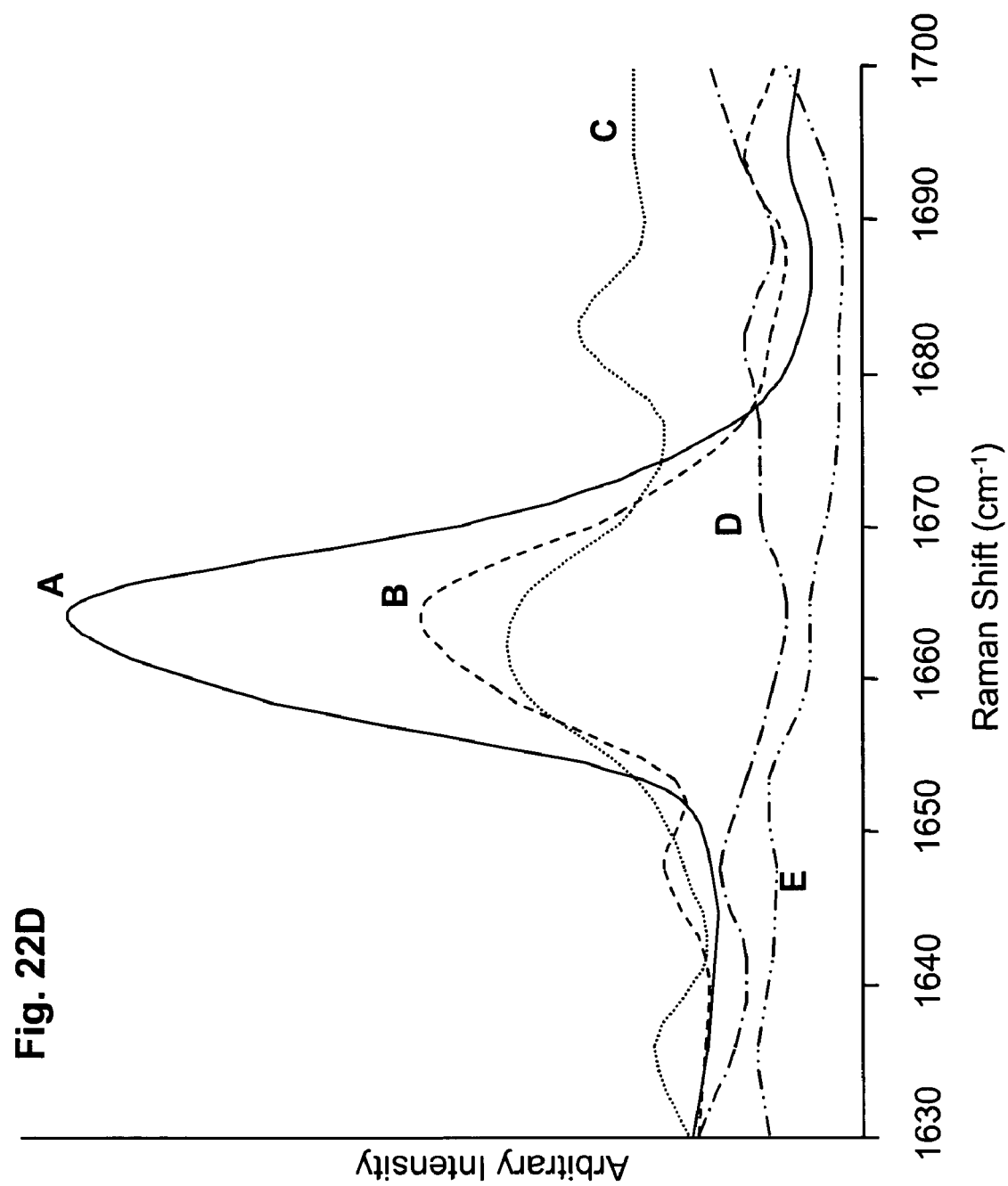
FIG. 22D depicts Raman spectra assessed in several boxed regions of FIG. 22B, including region A, corresponding to BECONASE AQ™.
Figure 22E:
FIG. 22E depicts FIGS. 22A and 22C overlaid.

FIG. 20 shows a polarized light image of the MCC/BDP blend prior to the addition of water (FIG. 20A) and a polarized light image of the MCC/BDP blend following addition of water (FIG. 20B).

To address issues associated with sample preparation (i.e., aggregate formation in the BDP/MCC blends) and the dynamic nature of an aqueous blend, RCI was performed on two nasal spray samples—one of which (BECONASE AQ™) contained the active pharmaceutical ingredient (BDP) and the other of which was a placebo sample. Samples were prepared by shaking, priming, and spraying each nasal spray sample onto respective aluminum-coated glass microscope slide positioned in an upright position approximately 6 inches away. The samples were then immediately turned right-side-up and allowed to dry. Aluminum-coated glass microscope slides were used to minimize background fluorescence arising from any rare-earth elements present in the glass substrates.

Figure 23E:
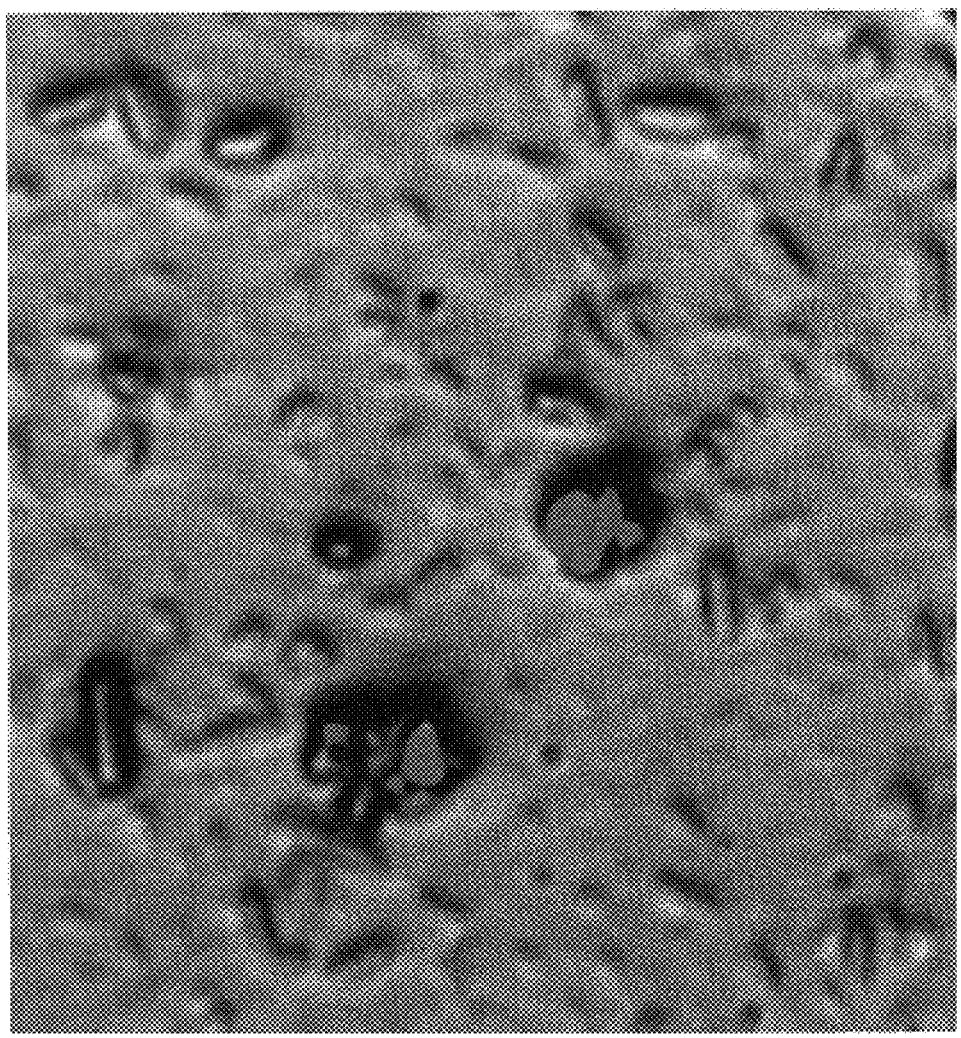
FIG. 23E depicts FIGS. 23A and 23C overlaid.
Figure 24D:
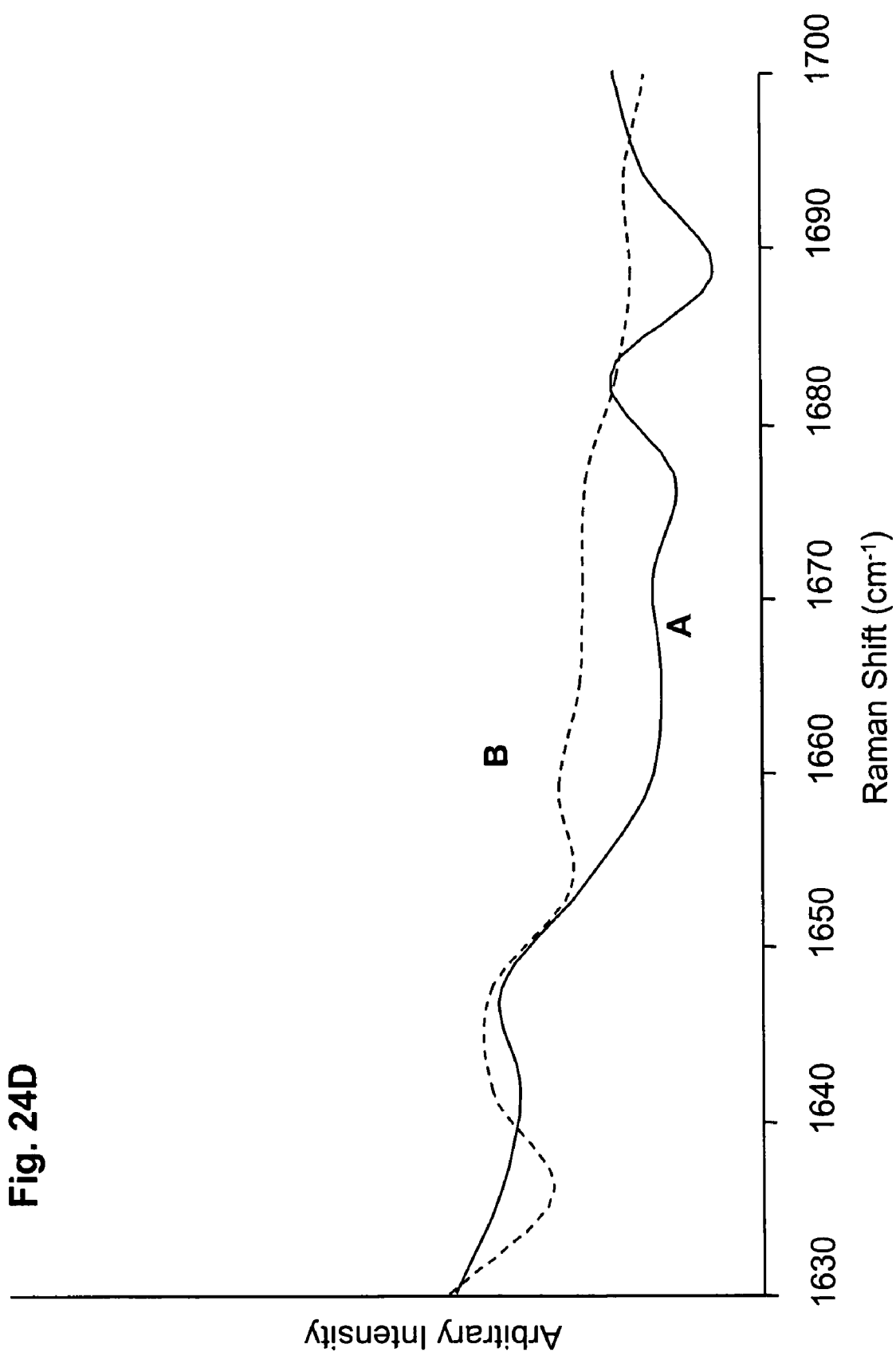
FIG. 24D depicts Raman spectra assessed in several boxed regions of FIG. 24B.
Figure 25D:
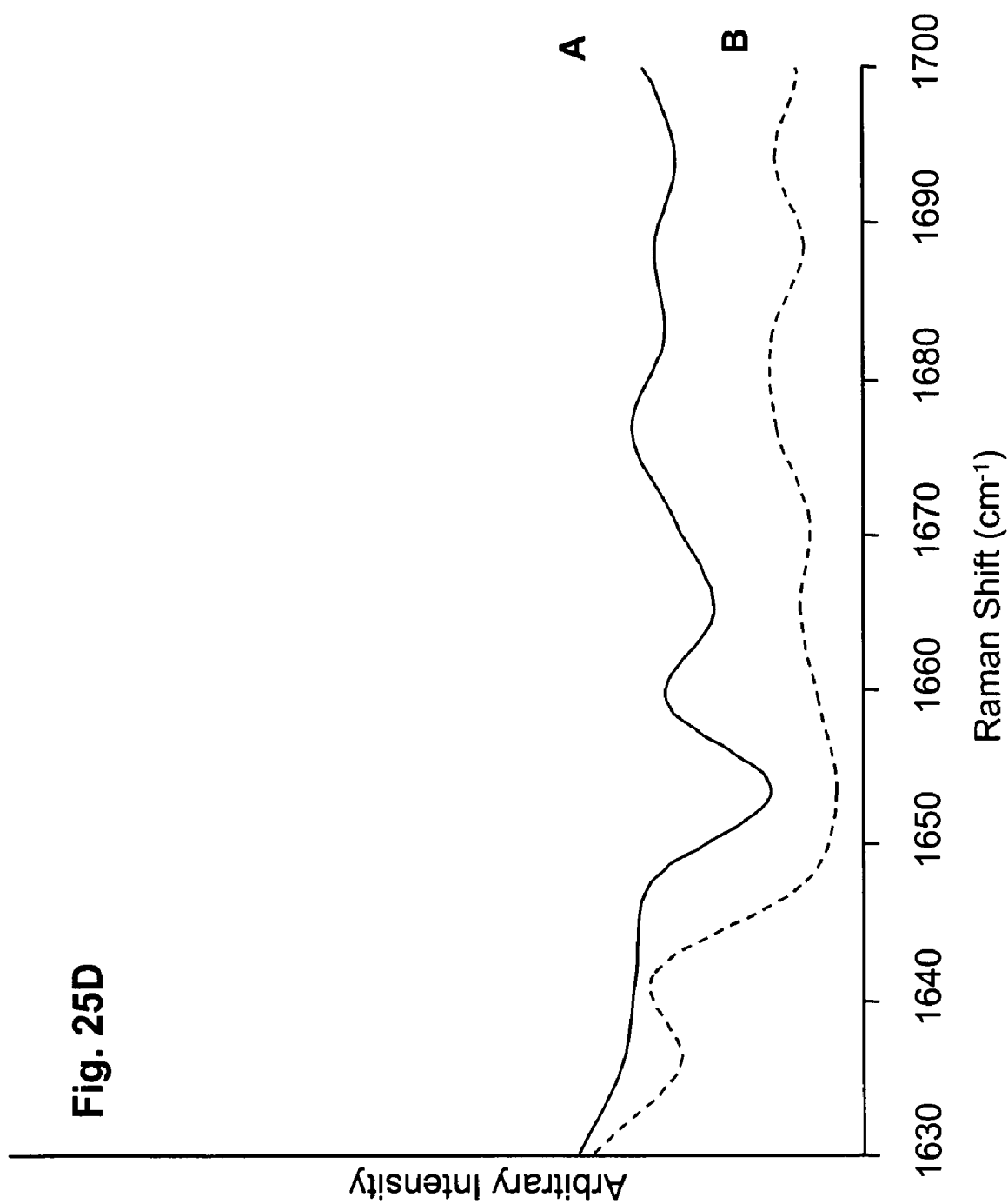
FIG. 25D depicts Raman spectra assessed in several boxed regions of FIG. 25B.
Figure 26B:
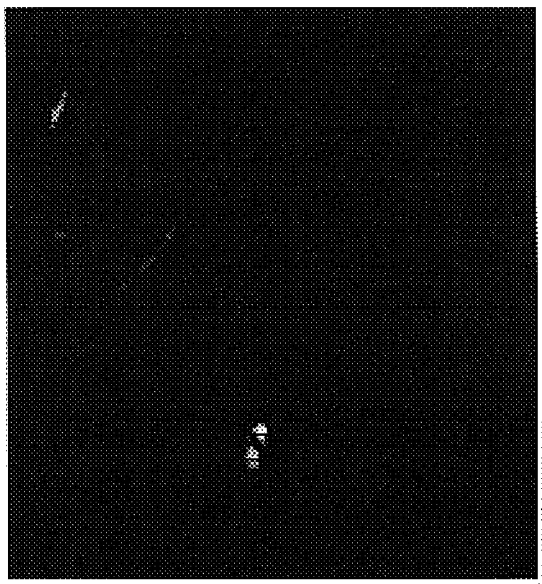
FIGS. 26A and 26B depict brightfield reflectance and polarized light micrographs, respectively.
Figure 26C:
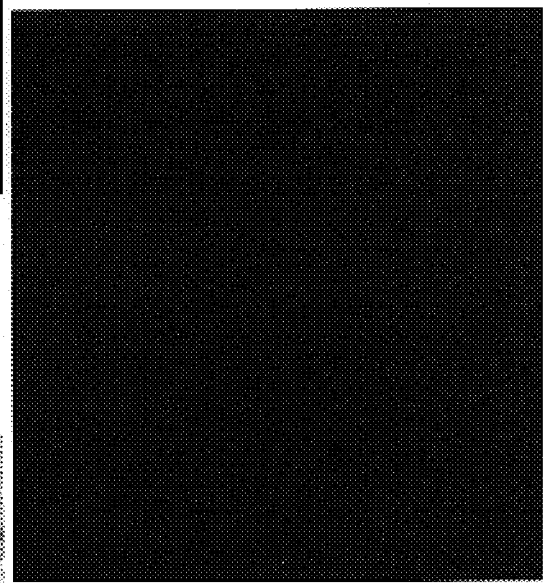
FIG. 26C is a Raman chemical image of the sample assessed at a Raman shift value characteristic of BDP.
Figure 26A:

FIGS. 21 through 23 are RCI results from 3 regions of interest (ROIs) from the BECONASE AQ™ nasal spray sample containing BDP. FIGS. 24-26 are RCI results from 3 ROIs from the placebo nasal spray sample. Each of FIGS. 21A, 22A, 23A, 24A, 25A, and 26A depicts a brightfield reflectance image of the respective sample. Each of FIGS. 21B, 22B, 23B, 24B, 25B, and 26B depicts a polarized light image of the respective sample. Each of FIGS. 21C, 22C, 23C, 24C, 25C, and 26C depicts a Raman chemical image of the respective sample. Each of FIGS. 21D, 22D, 23D, 24D, 25D, and 26D depicts Raman spectra of the regions indicated in the corresponding FIGS. 21C, 22C, 23C, 24C, 25C, and 26C. Each of FIGS. 21E, 22E, and 23E depicts an overlay of the brightfield and RCI images of corresponding FIGS. 21A/21C, 22A/22C, and 23A/23C.

The characteristic Raman properties of BDP could be detected in each of the BECONASE AQ-containing samples and that those BDP-specific Raman properties were not observed for other components in the sample. Brightfield/Raman overlay images indicated what appears to be adsorption of BDP to one or more excipients in the nasal spray sample. These results indicate that the methods described herein can be used to characterize properties of drug compositions beyond geometric properties and including such factors as particle agglomeration. Such agglomeration is important, because the association of an active ingredient with a second compound can reduce the ability of the active ingredient to dissolve, the effectiveness of the active ingredient, the ability of a particle including the active ingredient to travel to a body location, or another relevant pharmacological property of the active ingredient.

Figure 27C:
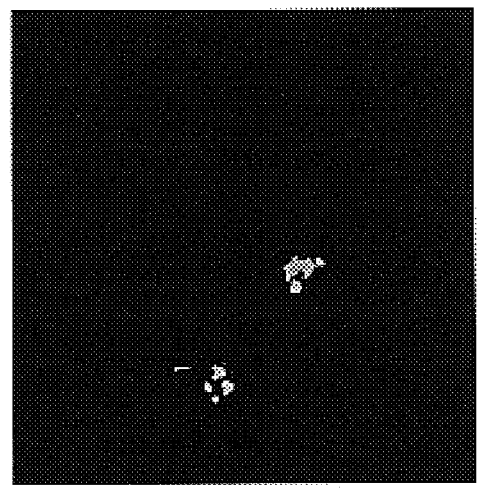
FIGS. 27A, 27B, and 27C depict binarized Raman chemical images assessed at a Raman shift characteristic of BPD at three regions of interest of the BECONASE AQ™ nasal spray samples depicted in FIGS. 21, 22, and 23. The data in the PSD table were prepared by software analysis of the binarized image of FIGS. 27A, 27B, and 27C (ROI 1, ROI 2, and ROI 3, respectively in the PSD table), and indicated that the mean particle size was 1.79±1.33 micrometers.
Figure 27B:
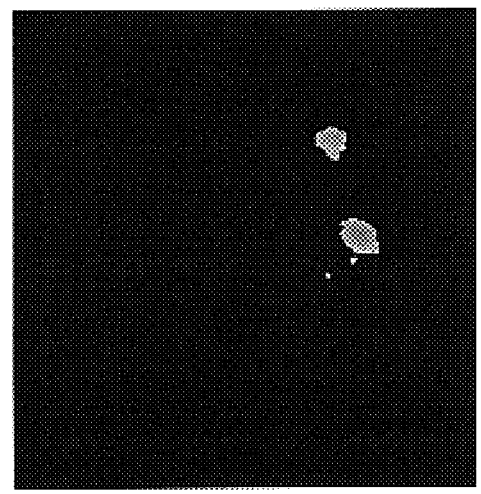
Figure 27A:
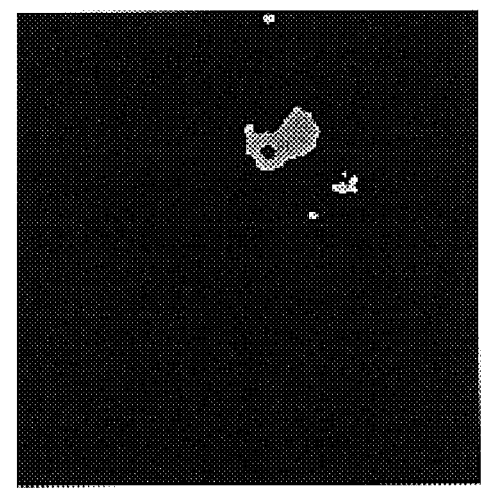
Figure 28:
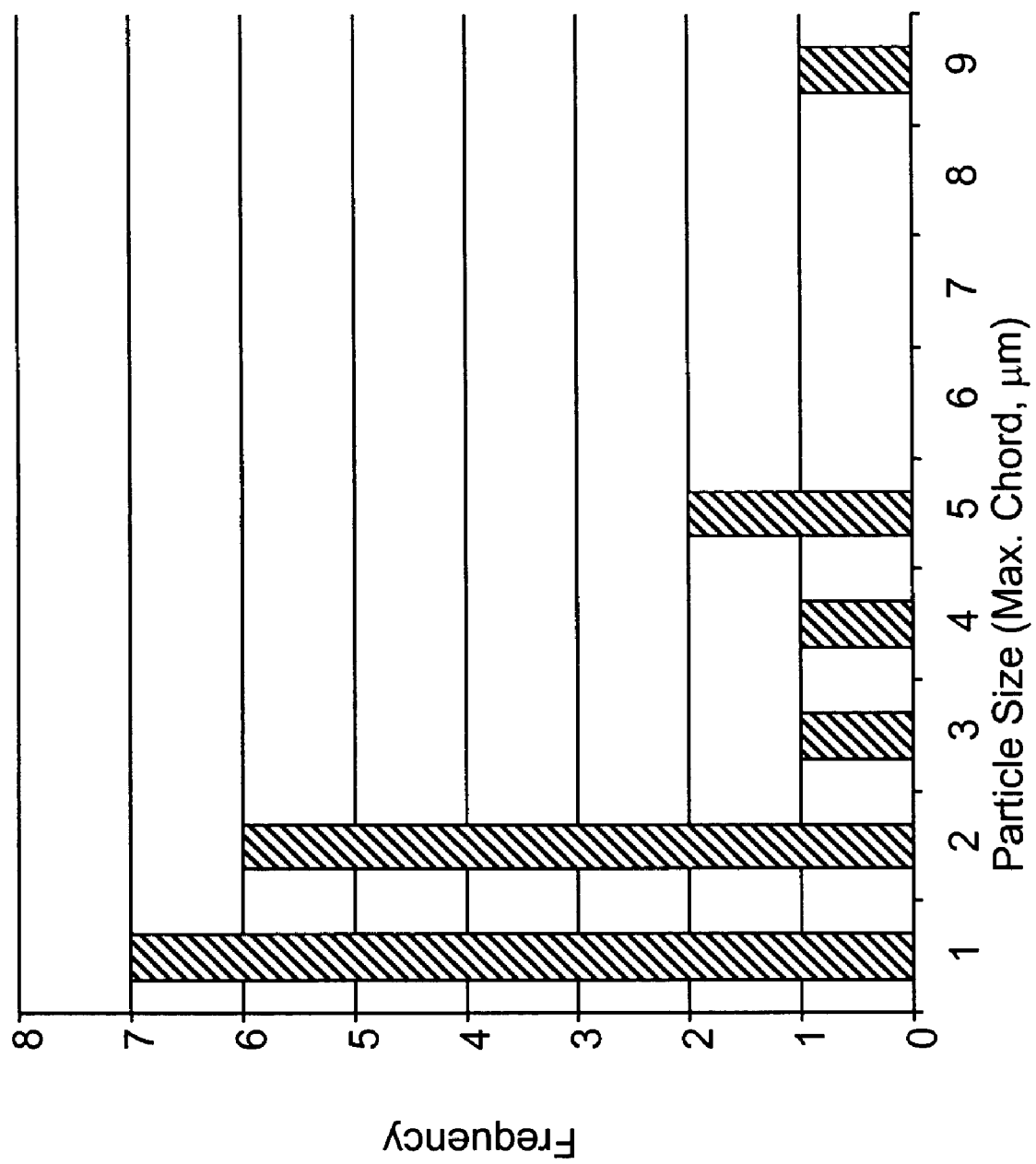
FIG. 28 is a PSD graph which depicts data prepared by software analysis of the binarized image of FIGS. 27A, 27B, and 27C.

FIGS. 27 and 28 relate to experiments in which particle size and PSD of BDP were assessed for the BECONASE AQ™ drug product. FIGS. 27A-27C and 28A-28C depict binary images and associated particle statistics for BDP particles detected by RCI in three ROIs of the dried BECONASE AQ™ sample. A PSD table is shown in FIG. 27 and a graphical representation of PSD is shown in FIG. 28.

The result of the experiments described in this example indicate that particle size, chemical identity, and PSD characteristics of corticosteroids in aqueous suspension of nasal sprays using RCI can be measured using the methods described herein. Raman dispersive spectral library results demonstrate the amenability of Raman spectroscopy and RCI to be used as characterization tools for aqueous suspensions of nasal sprays. RCI results demonstrated the ability to differentiate and identify the chemical make-up of multiple components in complex BDP sample and placebo mixtures. PSD measurements made on binary polarized light microscope images of the neat drug dispersed on a glass microscope slide revealed a mean particle size of 3.02±3.16 micrometers. PSD measurements performed on binary Raman images of BDP/MCC mixtures revealed mean particles sizes of 33.91±71.45 micrometers and 36.99±19.27 micrometers for MCC and BDP, respectively, before the addition of water and 48.75±57.57 micrometers and 13.80±14.25 micrometers for MCC and BDP, respectively, following the addition of water. The large mean PSDs relative to the pure, neat drug are a result of particulate conglomerations. The difference in the mean particle sizes before and after the addition are likely due to the movement of particles into and out of the field of view rather than changes to particle size resulting from the addition of water. PSD measurements performed on binary Raman images of the BDP distribution in BECONASE AQ™ nasal spray samples revealed a mean particle size of 1.79±1.33 micrometers. As expected, there were no BDP particles detected in the placebo. Brightfield/Raman overlay images revealed what appears to be the adsorption of BDP to one or more excipients in the nasal spray sample.

Example 2

Particle Size Standard Testing Blind Study

The experiments in this example were performed to demonstrate the validity of RCI for small particle sizing in a blinded study.

Six different polystyrene microsphere particle size standards were combined in a sample. Using optical microscopy and RCI, the mean particle size and associated standard deviations were determined for each size standard following a method consistent with the Duke Scientific (DS) method for size determination.

The DS method was performed as follows. Highly uniform microspheres, when placed on a flat surface such as a glass microscope slide, tended to form systematic hexagonal arrays. Using optical microscopy, the sizes were determined by measuring many polystyrene microspheres in a row and dividing by the number of spheres. The results were then verified by NIST. This method was developed due to the difficulty in determining the edge of the spherical particle especially when approaching the diffraction limit of light. In addition, this method is less susceptible to distorted measurements attributable to misshaped and undersized/oversized microspheres since these outliers tend to disrupt an ordered array which can be microscopically observed and avoided.

Standards were prepared by placing small drops of each of the size standard solutions on standard glass microscope slides, dispersing the solution evenly by sliding across it with another microscope slide and allowing the solution to dry. Optical microscopy and RCI data was collected for regions of interest for each size standard.

Figure 29B:
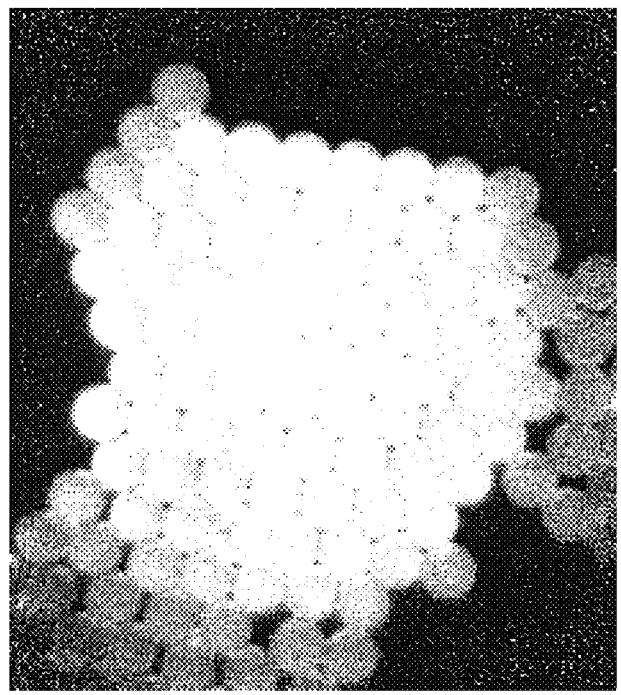
FIG. 29B depicts a Raman chemical image of the microspheres, assessed at a Raman chemical shift value characteristic of polystyrene.
Figure 29A:
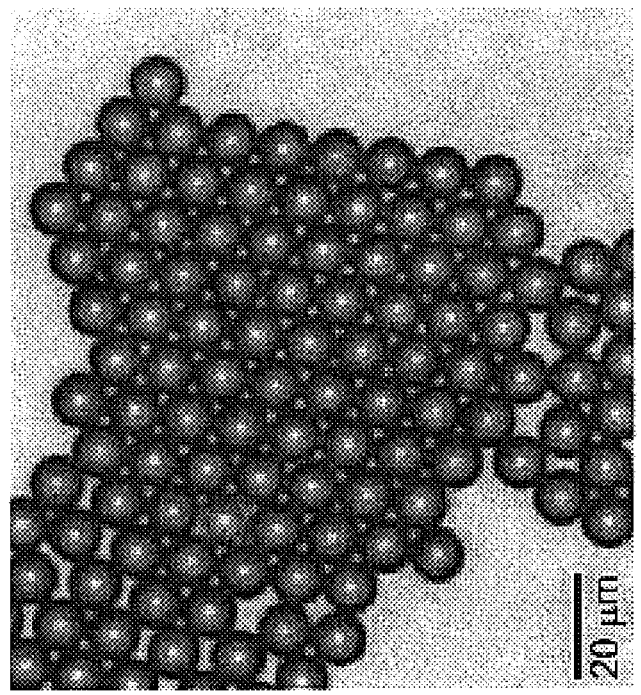
FIG. 29A depicts a brightfield reflectance micrograph of 10 micron NIST-traceable polystyrene microspheres.
Figure 29C:
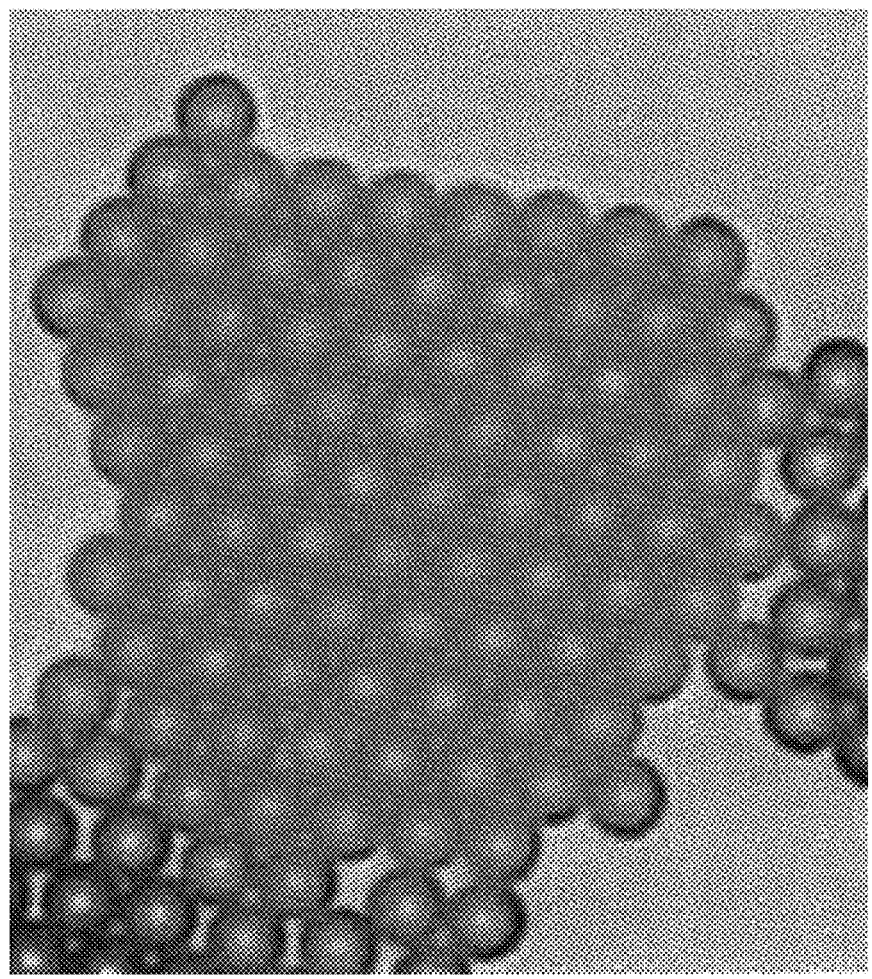
FIG. 29C is a color image of FIGS. 29A and 29B overlaid. The data depicted in FIG. 29C were used to determine sphere sizes (maximum chord sizes, in micrometers) shown in the table. The table also lists NIST traceable values for the six size standards assessed. The spheres indicated with an asterisk in the particle size standard table did not form arrays.

FIG. 29 shows a brightfield reflectance image (FIG. 29A), a Raman chemical image (FIG. 29B) and a brightfield/Raman overlay image (FIG. 29C) of the 10 micron NIST-traceable polystyrene microsphere particle size standards arranged in a hexagonally close-packed arrangement. Similar data was acquired for the remaining five size standards.

The table provided in Figure compares the results using the DS method to the NIST traceable values. The array method results on the RCI data are within statistical agreement to the accepted values for the NIST-traceable standards for those size standards in which a hexagonally close-packed arrangement was obtainable.

Example 3

NIR Chemical Imaging of Semiconductor Inclusions

The NIR chemical imaging devices and methods disclosed herein were used to characterize tellurium inclusion defects in cadmium zinc telluride (CdZnTe) semiconductor materials. Rapid, non-destructive inspection of large area wafers was performed in two and three spatial dimensions by collecting NIR image frames at multiple regions of interest throughout the wafer using an automated NIR imaging system. The NIR image frames were processed using background correction and image binarization algorithms. The binarized images were processed using known particle analysis algorithms to characterize the tellurium inclusions. Such data can be used in a wafer manufacturing process to pass or fail wafers prior to further processing of the wafers. Data visualization software was used to generate image data corresponding to the tellurium inclusions in two and three spatial dimensions.

Background

As the demand for high quality, low cost X-ray, gamma-ray and imaging detector devices increases, there is a need to improve the quality and production yield of semiconductor materials used in such devices. One effective strategy for improving semiconductor device yield is use of device characterization tools that can rapidly and non-destructively identify defects at a relatively early stage in the fabrication process. Early screening can elucidate the underlying cause(s) of defects and can also reduce downstream costs associated with processing defect-laden materials that are ultimately scrapped.

Compound semiconductors are challenging to fabricate. There are several steps along the manufacturing process in which defects can arise. The chemical nature of semiconductor defects can significantly affect performance of devices fabricated from the semiconductor. Device fabrication and device processing defects can be difficult and time consuming to measure during manufacturing. Unfortunately, defective devices are often left undiagnosed until latter stages in the manufacturing process because of the inadequacy of the metrology tools used to detect the defects. This results in low production yields and high costs.

CdZnTe is used for radiation detection in devices such as room temperature X-ray detectors, gamma-ray radiation detectors, and medical imaging devices. Examples of uses for CdZnTe-containing devices include nuclear diagnostics, digital radiography, high-resolution astrophysical X-ray and gamma-ray imaging, industrial web gauging, 'gamma camera' imaging, bone densitometry, and detection of fissionable materials. The cost and usefulness of such devices can be limited by availability of large, high-quality CdZnTe materials. CdZnTe materials can contain microscopic and macroscopic defects which interfere with the operation of devices made from the materials. Examples of defects commonly found in these materials include cracks, grain boundaries, twin boundaries, pipes, precipitates, and inclusions. Individual CdZnTe wafers are often graded based on the size and number of tellurium (Te) inclusion defects that are present in the wafer.

As used in this example (and as used by Rudolph and Muhlberg), tellurium inclusions are tellurium-rich domains that are in the size range from 1-50 micrometer and that result from morphological instabilities at the growth interface as tellurium-rich melt droplets are captured from the boundary layer ahead of the interface. Tellurium inclusions can impair the electronic properties of CdZnTe materials, degrading the performance of devices made from such materials as a consequence.

The current procedure used by low volume semiconductor manufacturers for characterizing tellurium inclusions in CdZnTe is labor intensive, susceptible to human error, and provides little information on inclusions in the 1-5 micrometer size range. In those methods, inclusions are viewed and counted manually by a human operator using an IR microscope platform. When an inclusion is identified that is suspected to exceed a specified size limit, a photograph is made. An overlay of a stage micrometer is laid over the photograph to determine the size. This analysis is relatively time consuming, often taking several minutes to characterize a region of interest from a large wafer.

The volumetric NIR chemical imaging device and method described in this example can be used for automated characterization of microscale tellurium inclusions in CdZnTe materials. The system takes advantage of the fact that CdZnTe is transparent at infrared wavelengths (>850 nm). When viewing CdZnTe with an infrared focal plane array (IR-FPA) through a NIR LC imaging spectrometer, tellurium inclusions appear as dark, absorbing domains. Wafers can be imaged in two and three spatial dimensions, capturing raw infrared images at each region of interest. Images can be automatically background equilibrated, binarized, and processed. The processed data provides statistical information useful for characterization of particulate inclusions, such as inclusion counts, size, density, area, and shape. The system provides a rapid method for characterizing tellurium inclusions as small as 0.5 micrometer substantially without the subjectivity associated with manual inspection.

The materials and methods used in this example are now described.

Samples

Tellurium-rich CdZnTe samples were produced by a commercial supplier (eV Products; Saxonburg, Pa.) for analysis. Samples containing high tellurium inclusion densities were purposely acquired to effectively demonstrate the capabilities of the automated tellurium inclusions mapping system. The CdZnTe materials were grown by the Horizontal Bridgeman (HB) method and contained a nominal zinc cation loading concentration of 4% and an average etch pit density of $4 \times 10^4$ per square centimeter. The materials displayed a face A <111> orientation and were polished on both sides. Sample thicknesses ranged from approximately 1 to 15 millimeters. No further sample preparation was necessary for the automated tellurium inclusion mapping analysis.

Data Collection

Volumetric maps of the tellurium inclusions in the CdZnTe samples were obtained by placing the sample on the XYZ-translational stage of the automated mapping system. NIR image frames were captured through the LC imaging spectrometer at a wavelength that maximized the Te precipitate contrast relative to the surrounding CdZnTe matrix in the X-Y direction at multiple regions of interest across the samples. Depth profiling was achieved by translating the sample focus under the microscope at user-defined increments. This process was then repeated in an iterative fashion until the entire wafer had been characterized.

Data Processing

Once imaging data was collected, CHEMIMAGE(™, ChemImage Corporation, Pittsburgh, Pa.) software version 4.12 was used to process the data. For each wafer, the software generates a background-corrected grayscale image, a binarized image using the threshold value selected for each frame of the image, a montage view of the binarized image and particle statistics. The particle statistics table includes information such as particle counts, particle sizes, particles densities, and a number of geometrical parameters such as particle area and particle aspect ratios.

The results of the experiments in this example are now described.

NIR Imaging

Figure 31:
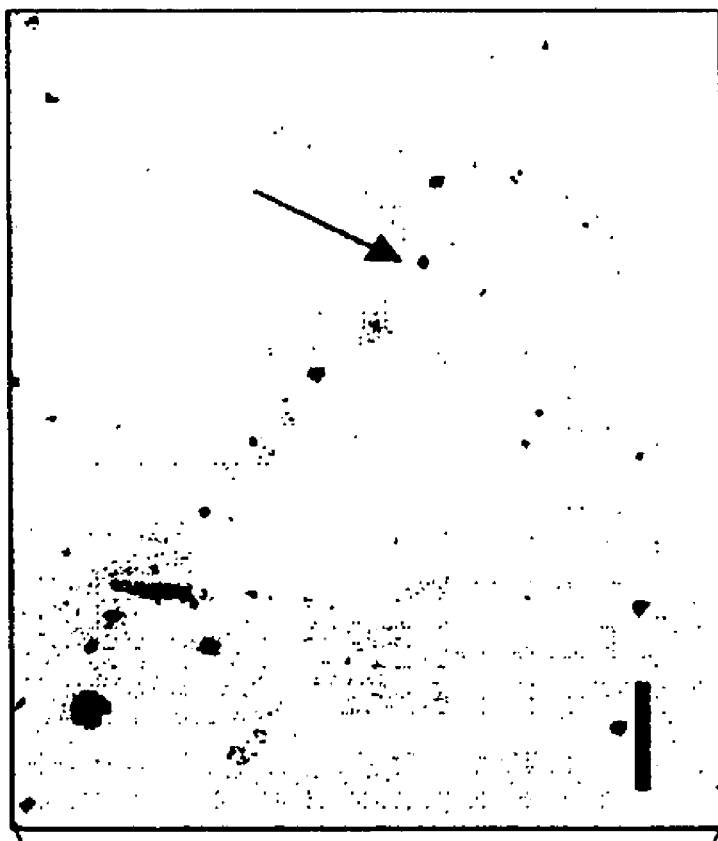
FIG. 31 is an NIR microscopic transmittance image of a CdZnTe semiconductor material decorated with tellurium inclusions.
Figure 30:
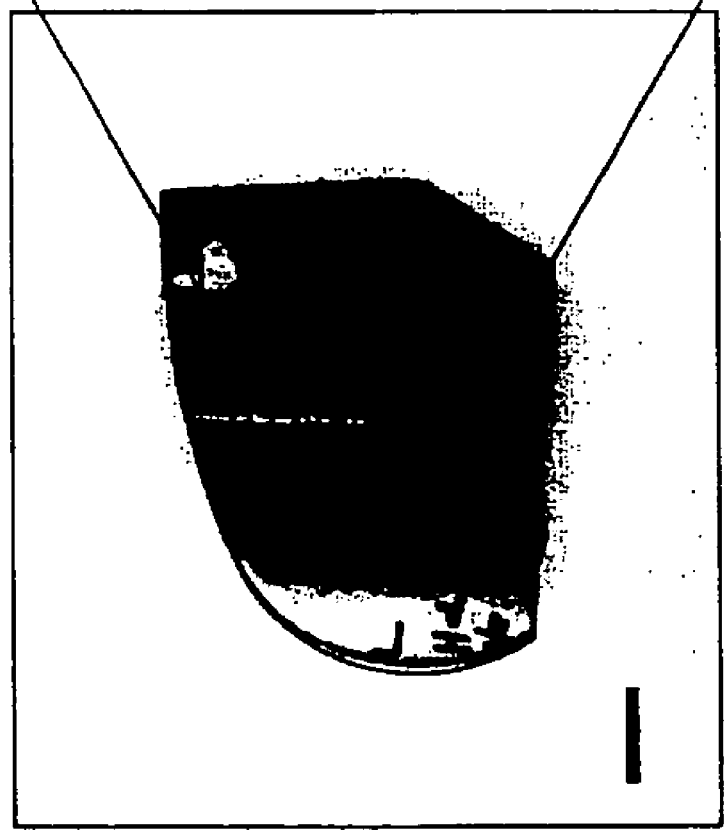
FIG. 30 is a digital brightfield image of a CdZnTe semiconductor material decorated with tellurium inclusions.

A digital macro brightfield image of a CdZnTe semiconductor material with numerous tellurium inclusions is shown in FIG. 30 and a raw NIR microscopic transmittance image of a CdZnTe semiconductor material with numerous tellurium inclusions is shown in FIG. 31. The left half of the wafer has been polished. The tellurium inclusions appear as dark spots in the microscopic NIR image. The raw NIR microscopic image was acquired using the automated near-infrared tellurium inclusion volumetric mapping system.

Background Correction and Image Binarization

The automated particle analysis begins by applying a background correction preprocessing routine to the raw image frames. One of the biggest problems with the raw images collected is the gradually varying background across each image frame. As a result, a particle in one area of a frame may have a higher intensity value than the background of another area of that frame.

FIG. 32 illustrates the difficulty associated with selecting an appropriate threshold value for an image with a widely varying background. In FIG. 32, regions 1 (the larger boxed area) and 2 have mean relative intensity values of approximately 2600 and 1950, respectively, as assessed using the software intensity averaging function.

Figure 32B:
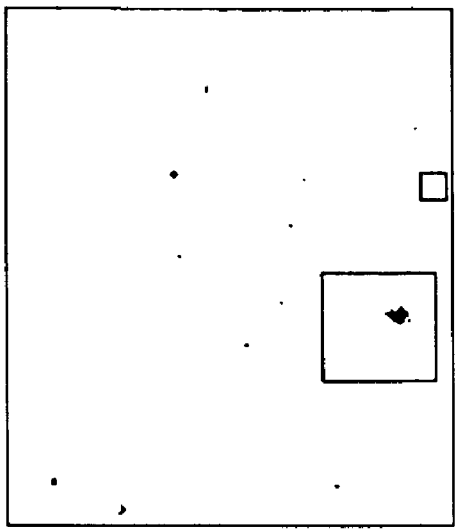
FIG. 32B is an NIR image frame of the sample of FIG. 32A in which the threshold value for the image was set too low.
Figure 32D:
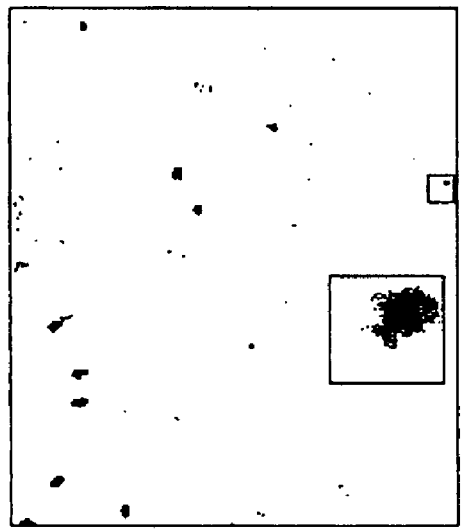
FIG. 32D is an NIR image frame of the sample of FIG. 32A in which the threshold value for the image was set to an intermediate level.
Figure 32A:
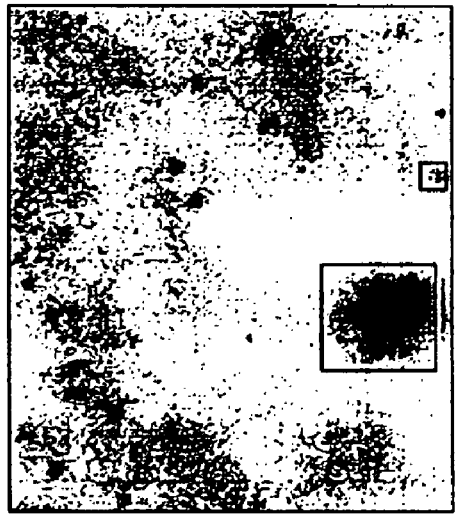
FIG. 32A is a raw NIR image frame of a CdZnTe wafer sample.
Figure 32C:
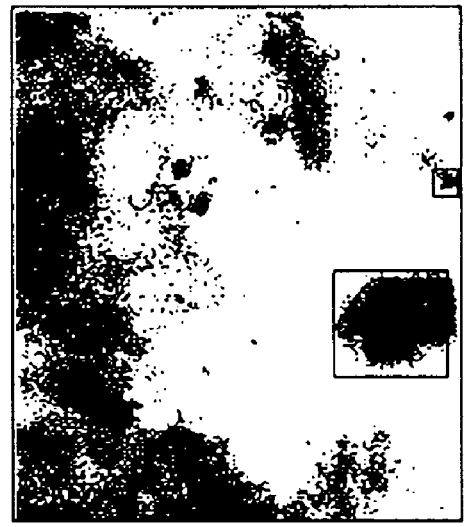
FIG. 32C is an NIR image frame of the sample of FIG. 32A in which the threshold value for the image was set too high.

The whole of region 1 is primarily a particle (i.e., a tellurium inclusion) whereas region 2 is primarily background with a small particle in the center. FIG. 32A is a raw NIR image frame collected from a single region of interest in a CdZnTe wafer. At illumination wavelengths longer than approximately 850 nanometers, CdZnTe is transparent and tellurium inclusions are opaque. A NIR image of the sample appears light in portions that do not contain tellurium precipitates and dark where precipitates occur. In FIG. 32B, the threshold value was set low enough (value=1520) that the particle in region 2 was correctly identified, but most of the remaining particles could not be observed. In FIG. 32C, the threshold value was set high enough (value=2470) that all particles are detected; however, a large area of the frame was incorrectly identified as one very large particle. In FIG. 32D, the threshold value was set to an intermediate value (value=1960). Under those conditions, many of the particles were correctly identified, but the particle in region 2 was identified as being larger than it actually was.

To address the issue of selecting an appropriate threshold value, a background correction step was used to cause the background to be essentially constant across a given image frame. The procedure applied a moving window across the image frame and smoothed the resulting background before subtracting it from the frame. Other operations such as low pass filtering and selective removal of bad camera pixels were also applied.

The second step in the automated particle analysis was selection of a threshold value resulting in the binarized image which best reflected the number and size of particles actually present in the sample being imaged. A human operator would typically approach this problem by trying multiple threshold values and comparing the resulting binarized images to the actual image to see which binarized image best matched their perception of the particles in the actual image. The algorithm used in this example with the NIR chemical imaging microscope system took essentially the same approach. A series of threshold values were used to generate binarized images. Each binarized image was submitted to a routine that finds the particles present in the image. A set of particle morphology rules was developed to determine the point at which the threshold value identifies the particles consistent with results obtained by a trained human operator. This threshold value was then further refined with using derivative operations.

Figure 33A:
FIG. 33A is the original raw image of four adjacent regions of interest on a CdZnTe wafer.
Figure 33B:
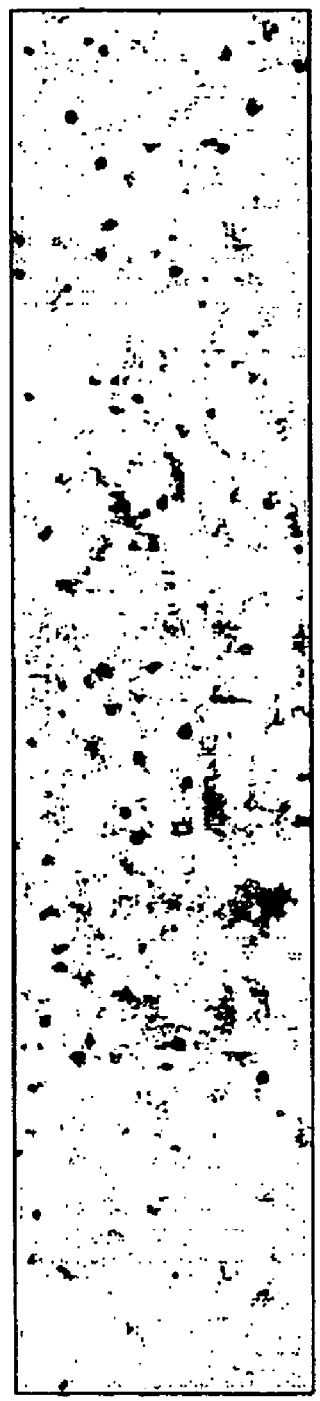
FIG. 33B is the background-corrected image corresponding to the four adjacent regions of interest of the CdZnTe wafer of FIG. 33A.
Figure 33C:
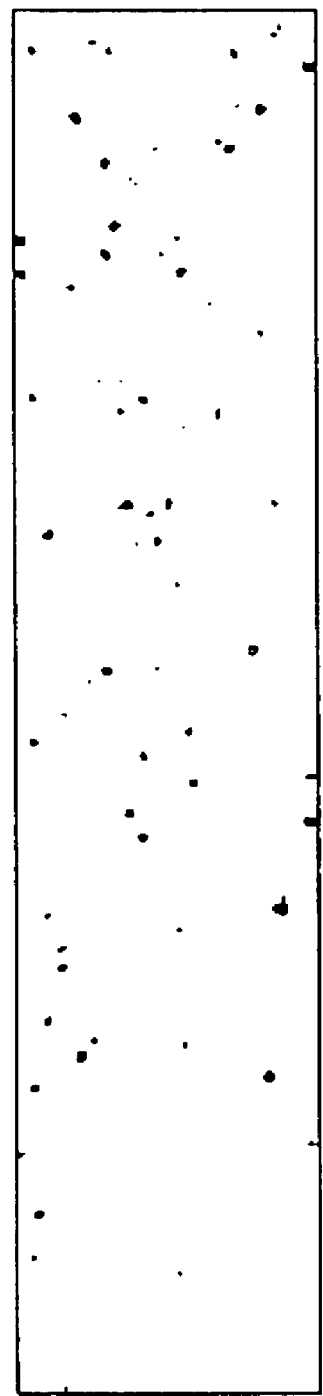
FIG. 33C is the binarized image corresponding to the four adjacent regions of interest of the CdZnTe wafer of FIG. 33A.

FIGS. 33A, 33B, and 33C are montage views of raw, background-corrected, and binarized NIR image frames, respectively, corresponding to four adjacent regions of interest from a CdZnTe wafer. Visual inspection of these images suggests that the particle analysis adequately identifies the particles in an automated fashion.

Volumetric Reconstruction and Visualization

It is of particular interest to the semiconductor manufacturing industry to view defects, including tellurium inclusions in this example, in a three-dimensional, volumetric view. Individual binarized image frames generated at discrete axial planes of focus were reconstructed into a volumetric view, allowing users to view the tellurium inclusions in three-dimensional space.

Figure 34:
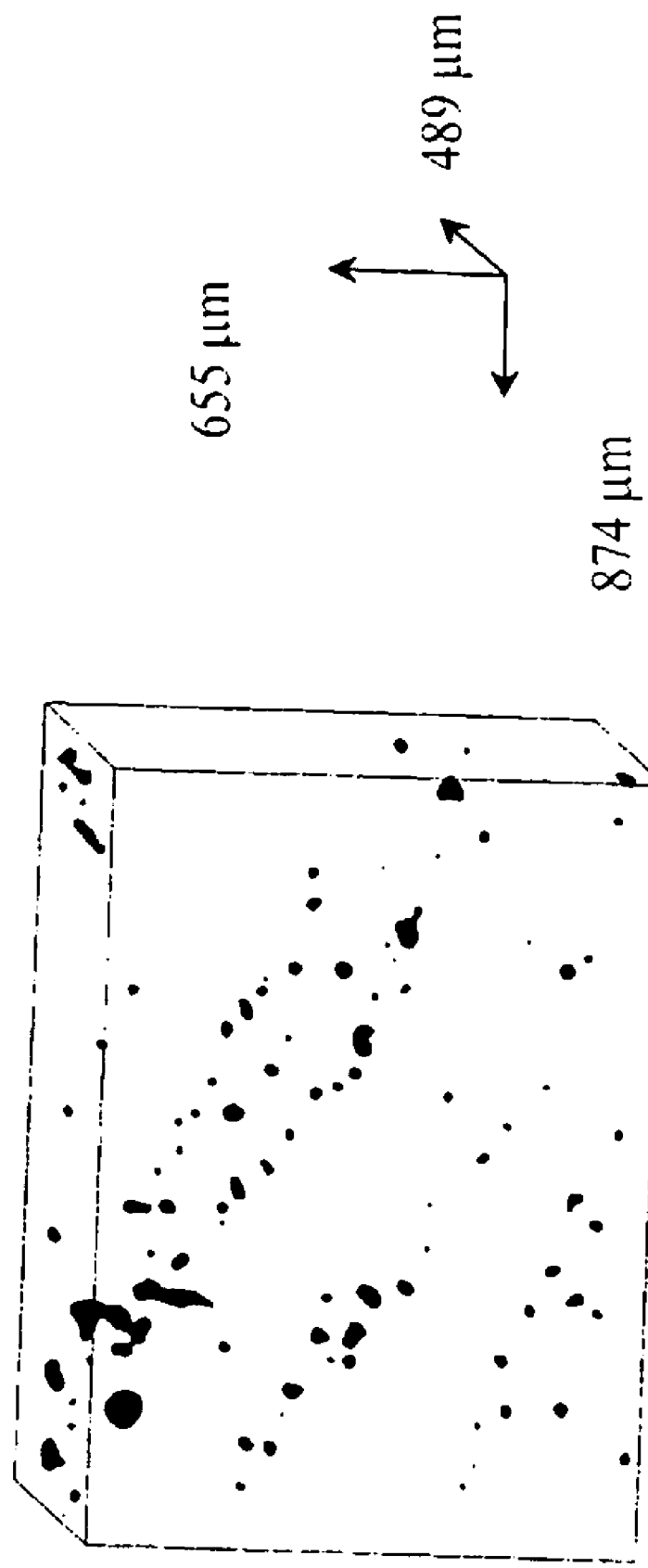
FIG. 34 is a three-dimensional view of tellurium inclusions in a CdZnTe wafer.

FIG. 34 is a three-dimensional, volumetric view of tellurium inclusions in CdZnTe that was generated from 50 individual image slices. FIG. 34 was constructed using a nearest neighbors computational approach for volume reconstruction. Potentially improved results could be obtained using more sophisticated strategies that deconvolve the entire image volume using iterative deconvolution approaches. The staring time of the sensor used to gather the volumetric data was less than 1 second. The total acquisition time for the data generated in this figure was under a minute. The inclusions tend to form in planes described as veils. These veils are believed to be subgrain boundaries within the CdZnTe material. Grain boundaries provide low energy nucleation sites for the inclusions to form during the growth process.

Table 1 provides tabulated statistical information on the volumetric data shown in FIG. 34.

TABLE 1

Particle Statistics

| | Slice Number and Depth (micrometers) | | | | | |
|---|---|---|---|---|---|---|
| | 0 (0) | 10 (89.77) | 20 (189.52) | 30 (289.26) | 40 (389.01) | 50 (488.75) |
| # of Inclusions | 25 | 30 | 27 | 24 | 25 | 36 |
| Mean Diameter (micrometers) | 12.12 | 11.38 | 12.75 | 15.70 | 12.89 | 13.73 |
| Density (Inclusions per square centimeter) | 4368 | 5241 | 4717 | 4193 | 4368 | 6289 |
| Area (square micrometers) | 97.48 | 73.78 | 91.67 | 119.25 | 96.29 | 98.15 |
| Perimeter (micrometers) | 40.40 | 37.32 | 43.27 | 50.72 | 41.93 | 43.98 |
| Shape Factor | 0.60 | 0.60 | 0.58 | 0.53 | 0.60 | 0.55 |
| Maximum Chord Length (micrometers) | 12.12 | 11.38 | 12.75 | 15.70 | 12.89 | 13.73 |
| Feret 1 Diameter (micrometers) | 9.17 | 9.56 | 11.33 | 12.64 | 10.48 | 10.16 |
| Feret 2 Diameter (micrometers) | 10.26 | 9.01 | 10.10 | 12.18 | 10.37 | 11.60 |
| Aspect Ratio | 1.02 | 1.19 | 1.16 | 1.08 | 1.02 | 0.95 |

Defects such as tellurium inclusions affect the electrical properties in CdZnTe semiconductor materials, degrading end-product device performance. Having the ability to rapidly and non-invasively identify and quantify tellurium inclusion defects at one or more stages in the semiconductor fabrication process provides manufacturers with information that enables them to optimize the manufacturing process and reduce production costs. The automated NIR volumetric mapping system described in this example is capable of providing such information. The system provided qualitative and quantitative information about tellurium inclusions present in CdZnTe wafers in two and three spatial dimensions. This system has improved spatial resolution (about 0.5 micrometer) compared to systems currently used by many semiconductor manufacturers and virtually eliminates the subjectivity associated with inclusion counting and sizing measurements made by humans. Whole wafers can be characterized in minutes.

In this example, the devices and methods described in this application have been demonstrated in connection with the characterization of semiconductors. However, those devices and methods can also be used to characterize other materials such as food and agricultural products, paper products, pharmaceutical materials, polymers, thin films, and in medical samples and materials.

Example 3

NIR and Raman Chemical Imaging of a Pharmaceutical Tablet

In the experiments described in this example, chemical image data was collected for a pressed tablet containing aspirin and lactose. The chemical image data could be used to describe the distribution of these two components in the tablet.

Figure 36B:
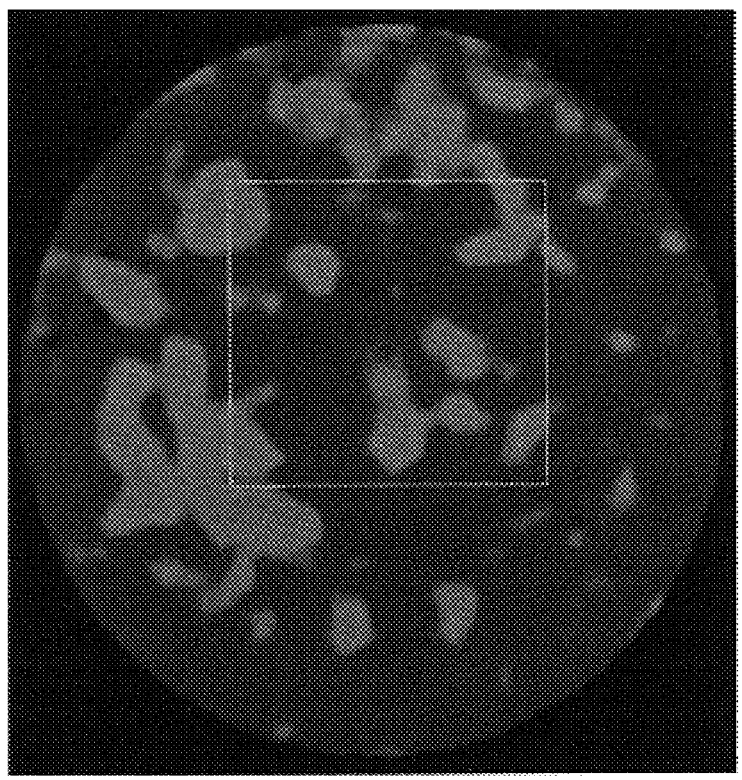
FIGS. 36B, 36C, and 36D are chemical images of the same tablet, in which lactose-containing portions of the tablet are shaded blue and aspirin-containing portions of the tablet are shaded green.
Figure 36A:
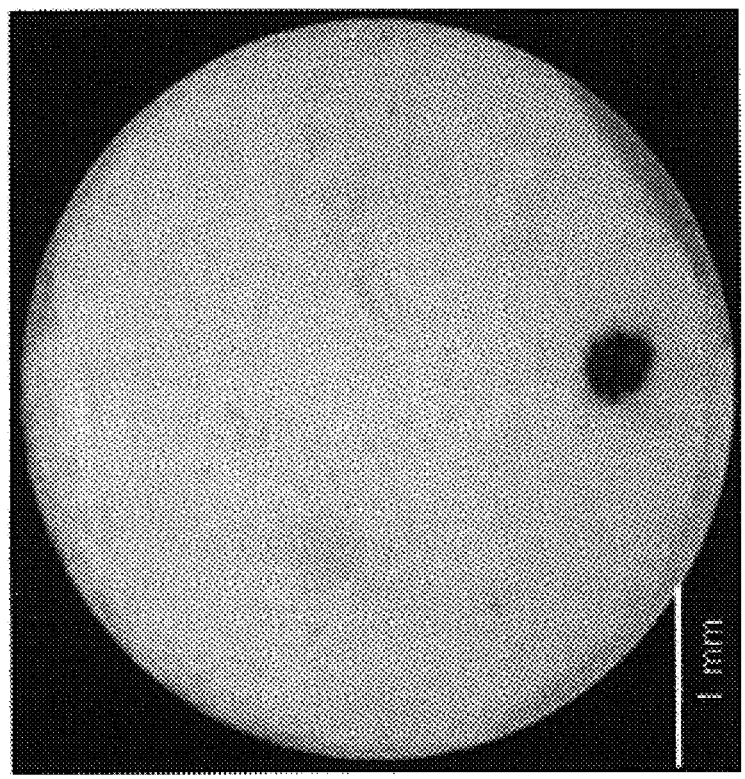
FIG. 36A is a visual image of an aspirin- and lactose-containing tablet made using a digital camera. The dark spot was a locating indicium made with a pen.
Figure 36D:
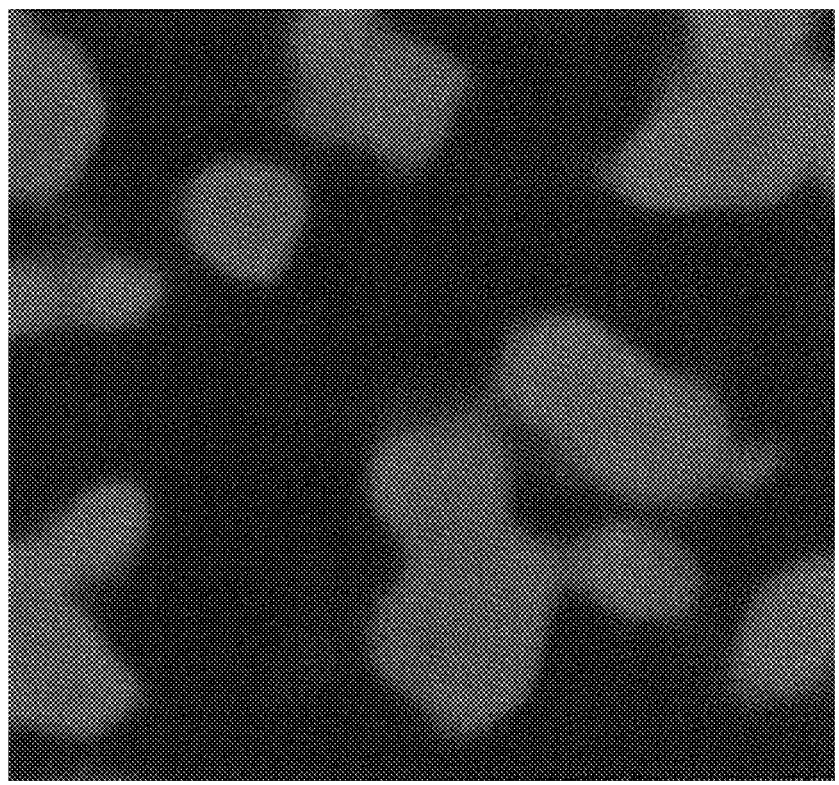
Figure 36C:
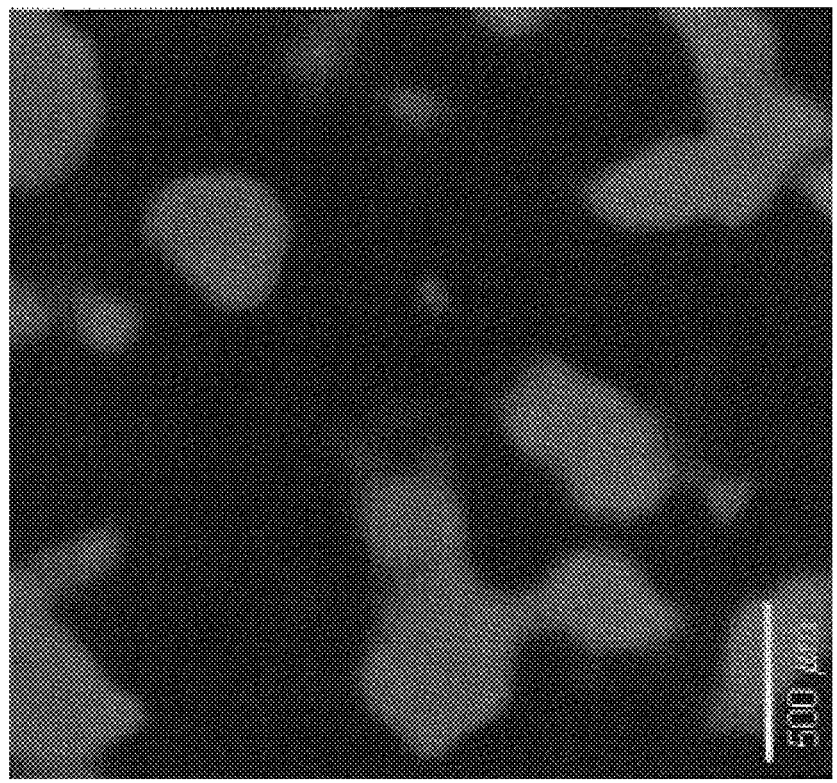
Figure 36E:
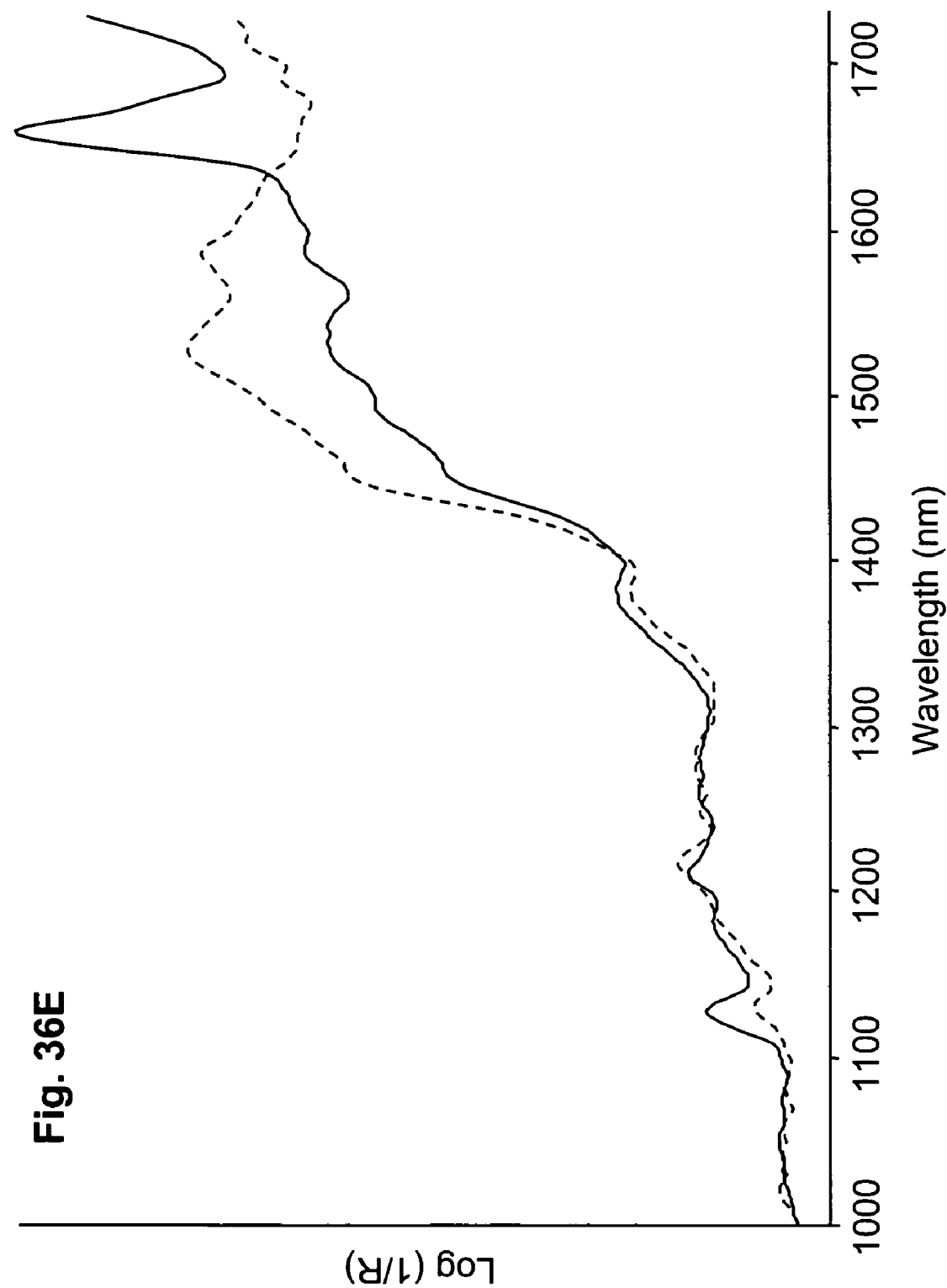
FIG. 36E is a comparison of the NIR absorption spectra (inverse reflectance plotted against wavelength) of aspirin (solid line) and lactose (dashed line).
Figure 36F:
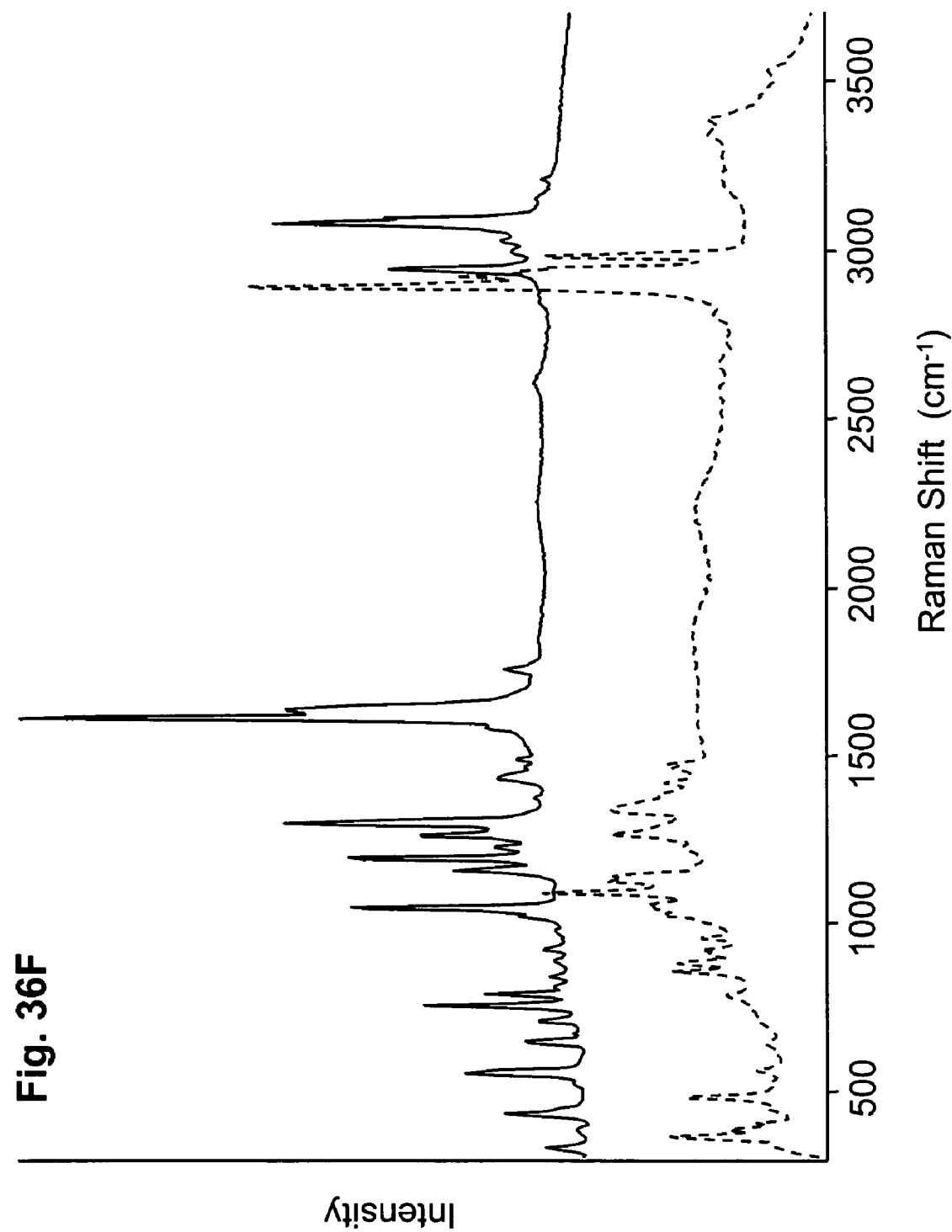
FIG. 36F is a comparison of the Raman spectra of aspirin (solid line) and lactose (dashed line).

Acetylsalicylic acid (aspirin) and lactose were independently assessed by dispersive Raman spectroscopy and NIR spectroscopy to determine their spectral characteristics. The relevant NIR and Raman spectra are shown in FIGS. 36E and 36F, respectively.

A CONDOR(™, ChemImage Corporation, Pittsburgh, Pa.) NIR chemical imaging macroscope was used to gather NIR chemical imaging data from the tablet. Based on the NIR spectral information gathered using pure aspirin and lactose, regions of the tablet containing aspirin were selected based on their exhibition of NIR absorption at about 1660 nanometers, and regions of the tablet containing lactose were selected based on their exhibition of NIR absorption at about 1530 nanometers. A false color image in which regions of the tablet containing aspirin are shaded green and regions of the tablet containing lactose are shaded blue is shown in FIG. 36C.

A tablet was placed on a surface. A FALCON(™, ChemImage Corporation, Pittsburgh, Pa.) Raman chemical imaging microscope was used to gather Raman chemical imaging information from the tablet. Based on the Raman spectral information gathered using pure aspirin and lactose, regions of the tablet containing aspirin were selected based on their exhibition of a Raman shift at about 1605 $cm^{-1}$, and regions of the tablet containing lactose were selected based on their exhibition of a Raman shift at about 2889 $cm^{-1}$. A false color image in which regions of the tablet containing aspirin are shaded green and regions of the tablet containing lactose are shaded blue is shown in FIG. 36D.

The experiments described in this example demonstrate that chemical imaging methods based on NIR and Raman spectral properties can be used to distinguish aspirin and lactose. By analogy, any two compounds that can be distinguished by a spectroscopic method can be differentiated by a chemical imaging method based on that spectroscopic method.

The disclosure of every patent, patent application, and publication cited herein is hereby incorporated herein by reference in its entirety.

While this invention has been disclosed with reference to specific embodiments, it is apparent that other embodiments and variations of this invention can be devised by others skilled in the art without departing from the true spirit and scope of the invention. The appended claims include all such embodiments and equivalent variations.

What is claimed is:

1. A method of determining a geometric property of a particle of a substance in a sample, the method comprising:
   irradiating the sample;
   tuning an imaging spectrometer over a range of wavelengths to generate an infrared image of the sample at a wavelength characteristic of the substance;
   applying to the infrared image of the sample one or more of the following: a univariate image processing technique, and a multivariate image processing technique to thereby generate a two-dimensional image or a three-dimensional image;

measuring the geometric property of the particle of the substance in the sample using the two-dimensional image or the three-dimensional image to thereby generate a numerical value for the geometric property;

and reporting said numerical value of the geometric property of the particle.

2. The method of claim 1, wherein the infrared image is a near infrared image.

3. The method of claim 1, wherein the infrared image is an image of a microscopic field.

4. The method of claim 1, further comprising simultaneously determining the geometric property of multiple particles of the substance in the sample.

5. The method of claim 1, wherein the geometric property is characteristic of the size of the particle.

6. The method of claim 1, comprising generating an infrared image of the sample at multiple infrared wavelengths characteristic of the substance.

7. The method of claim 1, further comprising comparing a first image and a second image of the sample at a wavelength characteristic of a compound other than the substance.

8. The method of claim 7, wherein the second image is a near infrared image.

9. The method of claim 7, wherein the first and second images are combined in an aligned manner.

10. The method of claim 7, comprising determining the geometric properties of the particle of the substance and of a particle of the compound in the sample.

11. The method of claim 1, wherein the infrared image is the two-dimensional image.

12. The method of claim 11, wherein the geometric property is selected from the group consisting of the area, the perimeter, a Feret diameter, the maximum chord length, a shape factor, and an aspect ratio of the particle.

13. The method of claim 1, wherein the infrared image is the three-dimensional image.

14. The method of claim 13, wherein the geometric property is selected from the group consisting of the volume, the surface area, a Feret diameter, the maximum chord length, a shape factor, and an aspect ratio of the particle.

15. The method of claim 1, wherein the particle is irradiated with substantially monochromatic light.

16. The method of claim 1, wherein the particle is immobilized prior to generating the image.

17. A method of determining a geometric property of a particle of a substance in a sample, the method comprising irradiating the sample, generating a near infrared image of the sample at a wavelength characteristic of the substance, wherein the near infrared image is generated using a near infrared radiation chemical imaging system comprising: a) an illumination source for illuminating an area of the sample using light in the near infrared radiation wavelength; b) a device for collecting a spectrum of near infrared wavelength radiation light transmitted from the illuminated area in a focal plane and producing a collimated beam therefrom; c) a near infrared imaging spectrometer for filtering a near infrared radiation image of the collimated beam; and d) a detector for collecting the filtered near infrared image and generating the near infrared image;

applying to the infrared image of the sample one or more of the following: a univariate image processing technique, and a multivariate image processing technique to thereby generate a two-dimensional image or a three-dimensional image;

measuring the geometric property of the particle of the substance in the sample using the two-dimensional image or the three-dimensional image to thereby generate a numerical value for the geometric property; and reporting said numerical value of the geometric property of the particle.

18. A method of determining geometric properties of multiple particles of a substance in a sample, the method comprising:

irradiating the sample;

tuning an imaging spectrometer over a range of wavelengths to generate an infrared image of the sample at a wavelength characteristic of the substance;

identifying the multiple particles of the substance by assessing the infrared image at the wavelength characteristic of the substance;

generating an optical image of the multiple particles in the substance, wherein the optical image is generated by a spectroscopic method other than infrared spectroscopy;

measuring the geometric properties of the multiple particles in the substance using the optical image; and reporting the geometric properties of the multiple particles.

19. A method of assessing geometric properties and compositions of a particle agglomerate comprised of first particles of a first substance and second particles of a second substance in a sample, the method comprising:

irradiating the sample;

tuning an imaging spectrometer over a range of wavelengths to generate a first infrared image of the sample at a first wavelength characteristic of the first substance and a second infrared image of the sample at a second wavelength characteristic of the second substance;

comparing the first infrared image with the second infrared image of the sample at said second wavelength characteristic of the second substance to differentiate the composition of the first particles of the first substance from the composition of the second particles of the second substance;

generating an optical image of the first particles of the first substance and the second particles of the second substance, wherein the optical image is generated by a spectroscopic method other than infrared spectroscopy measuring the geometric properties of the first particles of the first substance and the second particles of the second substance in the sample using the optical image; and reporting the composition and geometric properties of the first particles of the first substance and the composition and geometric properties of the second particles of the second substance.

20. The method of claim 19, further comprising:

identifying a composition of the particle agglomerate of the substance by assessing the first infrared image at the first wavelength characteristic of the first substance and the second infrared image at the second wavelength characteristic of the second substance;

generating an optical image of the particle agglomerate in the sample, wherein the optical image is generated by a spectroscopic method other than infrared spectroscopy;

measuring the geometric properties of the particle agglomerate in the substance using the optical image; and reporting the geometric property of the particle agglomerate.

21. A method of determining a geometric property of a particle of a substance in a sample, the method comprising: irradiating the sample; generating a near infrared image of the sample at a wavelength characteristic of the substance, wherein the near infrared image is generated using a near infrared radiation chemical imaging system comprising: a) an illumination source for illuminating an area of the sample using light in the near infrared radiation wavelength; b) a device for collecting a spectrum of near infrared wavelength radiation light reflected from the illuminated area in a focal plane and producing a collimated beam therefrom; c) a near infrared imaging spectrometer for filtering a near infrared radiation image of the collimated beam; and d) a detector for collecting the filtered near infrared image and generating a near infrared image;

applying to the infrared image of the sample one or more of the following: a univariate image processing technique, and a multivariate image processing technique to thereby generate a two-dimensional image or a three-dimensional image;

measuring the geometric property of the particle of the substance in the sample using the two-dimensional image or the three-dimensional image to thereby generate a numerical value for the geometric property; and reporting said numerical value of the geometric property of the particle.

22. A method of determining a geometric property of a particle of a substance in a sample, the method comprising: irradiating the sample; generating a near infrared image of the sample at a wavelength characteristic of the substance, wherein the near infrared image is generated using a near infrared radiation chemical imaging system comprising: a) an illumination source for illuminating an area of the sample using light in the near infrared radiation wavelength; b) a device for collecting a spectrum of near infrared wavelength radiation light emitted from the illuminated area in a focal plane and producing a collimated beam therefrom; c) a near infrared imaging spectrometer for filtering a near infrared radiation image of the collimated beam; and d) a detector for collecting the filtered near infrared image and generating a near infrared image;

applying to the infrared image of the sample one or more of the following: a univariate image processing technique, and a multivariate image processing technique to thereby generate a two-dimensional image or a three-dimensional image;

measuring the geometric property of the particle of the substance in the sample using the two-dimensional image or the three-dimensional image to thereby generate a numerical value for the geometric property; and reporting said numerical value of the geometric property of the particle.

23. A method of determining a geometric property of a particle of a substance in a sample, the method comprising: irradiating the sample; generating a near infrared image of the sample at a wavelength characteristic of the substance, wherein the near infrared image is generated using a near infrared radiation chemical imaging system comprising: a) an illumination source for illuminating an area of the sample using light in the near infrared radiation wavelength; b) a device for collecting a spectrum of near infrared wavelength radiation light elastically scattered from the illuminated area in a focal plane and producing a collimated beam therefrom; c) a near infrared imaging spectrometer for filtering a near infrared radiation image of the collimated beam; and d) a detector for collecting the filtered near infrared image and generating a near infrared image;

applying to the infrared image of the sample one or more of the following: a univariate image processing technique, and a multivariate image processing technique to thereby generate a two-dimensional image or a three-dimensional image;

measuring the geometric property of the particle of the substance in the sample using the two-dimensional image or the three-dimensional image to thereby generate a numerical value for the geometric property; and reporting said numerical value of the geometric property of the particle.

* * * * *